United States Patent
Yamazaki et al.

(10) Patent No.: US 10,204,571 B2
(45) Date of Patent: Feb. 12, 2019

(54) LIGHT-EMITTING DEVICE, ELECTRONIC DEVICE, AND DRIVING METHOD THEREOF

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Hajime Kimura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 274 days.

(21) Appl. No.: 14/488,935

(22) Filed: Sep. 17, 2014

(65) Prior Publication Data

US 2015/0077615 A1    Mar. 19, 2015

(30) Foreign Application Priority Data

Sep. 19, 2013   (JP) .................................. 2013-193723

(51) Int. Cl.
*G09G 3/36* (2006.01)
*H04N 5/232* (2006.01)
(Continued)

(52) U.S. Cl.
CPC ......... *G09G 3/3607* (2013.01); *G09G 3/3233* (2013.01); *G09G 3/3648* (2013.01);
(Continued)

(58) Field of Classification Search
CPC ........... H04N 5/23293; H04N 5/23216; H04N 1/0411; H04N 5/2228; G06F 1/1643; G06F 1/1692; G06F 3/0412; G06F 3/0416; G06F 3/0488; G06F 3/04886; G08B 13/19684; G02F 1/1365; G02F 1/1368;
(Continued)

(56) References Cited

U.S. PATENT DOCUMENTS 6,229,506 B1 * 5/2001 Dawson ............... G09G 3/3233
345/82
6,339,447 B1 * 1/2002 Kurahashi .......... H04N 1/00267
348/333.06
(Continued)

FOREIGN PATENT DOCUMENTS

JP   2004-350208 A   12/2004
JP   2005-333521 A   12/2005
(Continued)

*Primary Examiner* — Grant Sitta
(74) *Attorney, Agent, or Firm* — Fish & Richardson P.C.

(57) ABSTRACT

Provided is a display device or the like which can illuminate a subject with high-luminance illumination light. Another embodiment of the present invention provides a display device which can be used as a light source for a subject, or a display device which can be used as a light source for a subject, can display images and texts, and can switch these functions. The transistor of the light-emitting device is configured to operate in a saturation region in a period during which the light-emitting device displays text or an image, and is configured to operate in a linear region in a period during which the light-emitting device emits illumination light to a subject.

26 Claims, 34 Drawing Sheets

(51) Int. Cl.
*G09G 3/3233* (2016.01)
*G09G 3/3266* (2016.01)

(52) U.S. Cl.
CPC ....... *H04N 5/23293* (2013.01); *G09G 3/3266* (2013.01); *G09G 2300/0809* (2013.01); *G09G 2300/0842* (2013.01); *G09G 2300/0861* (2013.01); *G09G 2320/0233* (2013.01); *G09G 2320/0257* (2013.01)

(58) Field of Classification Search
CPC ........... G02F 1/13439; G02F 1/136209; G02F 1/136227; G02F 2001/136218; G02F 2001/136222; G02F 2001/136231; G02F 2001/13625; G02F 2201/122; G02F 2202/10; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G09G 2300/048; G09G 3/00; G09G 2300/0421; G09G 2300/0426; G09G 2300/043; G09G 2310/0264; G09G 2310/027; G09G 2310/0272; G09G 2310/0275; G09G 2310/0278; G09G 2320/00; G09G 2320/02; G09G 2320/0204; G09G 2320/0228; G09G 2320/0233; G09G 3/3607; G09G 3/3233; G09G 3/3648; G09G 2300/0861; G09G 3/3266; G09G 2300/0842; G09G 2320/0257; G09G 2300/0809
USPC ..................... 345/204, 690, 87, 76
See application file for complete search history.

(56) References Cited

U.S. PATENT DOCUMENTS

| | | | | |
|---|---|---|---|---|
| 6,501,466 B1* | 12/2002 | Yamagishi | ........... | G09G 3/3241 345/204 |
| 6,784,936 B1* | 8/2004 | Fukushima | ........ | H04N 5/23293 348/333.01 |
| 6,933,979 B2* | 8/2005 | Gonzales | .............. | G06F 3/0421 348/333.12 |
| 7,015,968 B2* | 3/2006 | Ong | .................. | H04N 1/00127 348/370 |
| 7,113,154 B1* | 9/2006 | Inukai | .................. | G09G 3/2022 345/76 |
| 7,141,934 B2* | 11/2006 | Osame | ................ | G09G 3/3233 315/169.3 |
| 7,173,586 B2* | 2/2007 | Osame | ................ | G09G 3/3233 345/76 |
| 7,218,294 B2* | 5/2007 | Koyama | .............. | G09G 3/3233 313/504 |
| 7,414,599 B2 | 8/2008 | Chung et al. | | |
| 7,429,985 B2 | 9/2008 | Kimura et al. | | |
| 7,598,927 B2 | 10/2009 | Yamazaki et al. | | |
| 7,663,691 B2* | 2/2010 | Ciudad | ................ | H04N 5/2354 348/216.1 |
| 8,199,249 B2 | 6/2012 | Ciudad et al. | | |
| 8,319,714 B2 | 11/2012 | Kojima et al. | | |
| 8,487,841 B2 | 7/2013 | Kimura et al. | | |
| 8,550,907 B2 | 10/2013 | Yamazaki et al. | | |
| 8,605,205 B2* | 12/2013 | Ledbetter | ............. | H04N 5/2256 348/207.1 |
| 9,390,641 B2* | 7/2016 | Ikeda | ..................... | G09G 1/005 |
| 9,646,531 B2* | 5/2017 | Yamazaki | ............ | G09G 3/3266 |
| 2002/0047839 A1* | 4/2002 | Kasai | ................... | G09G 3/3233 345/211 |
| 2003/0098829 A1* | 5/2003 | Chen | ..................... | G09G 3/3241 345/82 |
| 2003/0122805 A1* | 7/2003 | So | ........................ | G09G 3/3258 345/204 |
| 2003/0146888 A1* | 8/2003 | Yamazaki | ............ | G09G 3/2022 345/82 |
| 2004/0239799 A1* | 12/2004 | Suzuki | ................. | H04N 5/2256 348/370 |
| 2004/0263440 A1* | 12/2004 | Kimura | ................ | G09G 3/2011 345/76 |
| 2005/0012686 A1* | 1/2005 | Osame | ..................... | H01L 51/52 345/39 |
| 2005/0067971 A1* | 3/2005 | Kane | ..................... | G09G 3/3233 315/169.3 |
| 2005/0242746 A1* | 11/2005 | Miyagawa | ........... | G09G 3/3233 315/169.3 |
| 2008/0307307 A1* | 12/2008 | Ciudad | .................... | G06T 13/80 715/719 |
| 2009/0175555 A1* | 7/2009 | Mahowald | ......... | H04N 5/23232 382/274 |
| 2010/0194961 A1* | 8/2010 | Patel | ........................ | H04N 5/20 348/333.01 |
| 2011/0205144 A1 | 8/2011 | Kimura et al. | | |
| 2013/0050233 A1* | 2/2013 | Hirsch | .................... | G06F 3/038 345/589 |
| 2014/0192098 A1 | 7/2014 | Kimura et al. | | |
| 2014/0219646 A1* | 8/2014 | Hooton | .................. | G03B 15/03 396/176 |
| 2014/0347555 A1 | 11/2014 | Hirakata et al. | | |
| 2015/0003034 A1 | 1/2015 | Nakamura et al. | | |
| 2015/0055118 A1 | 2/2015 | Yamazaki et al. | | |

FOREIGN PATENT DOCUMENTS

| | | |
|---|---|---|
| JP | 2007-110717 A | 4/2007 |
| JP | 2012-078851 A | 4/2012 |

* cited by examiner

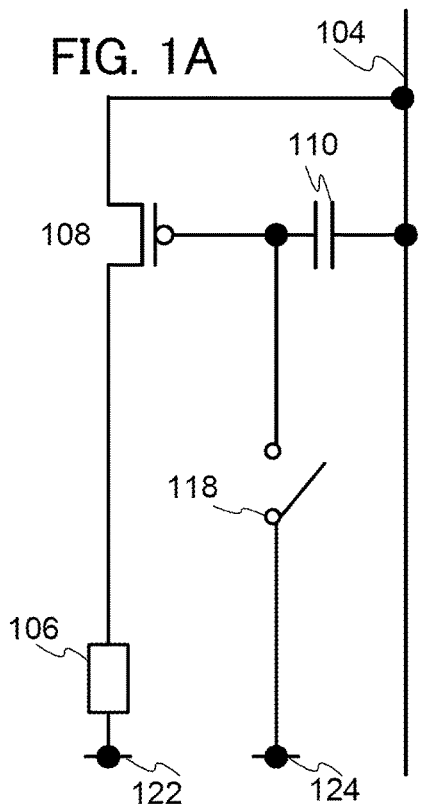
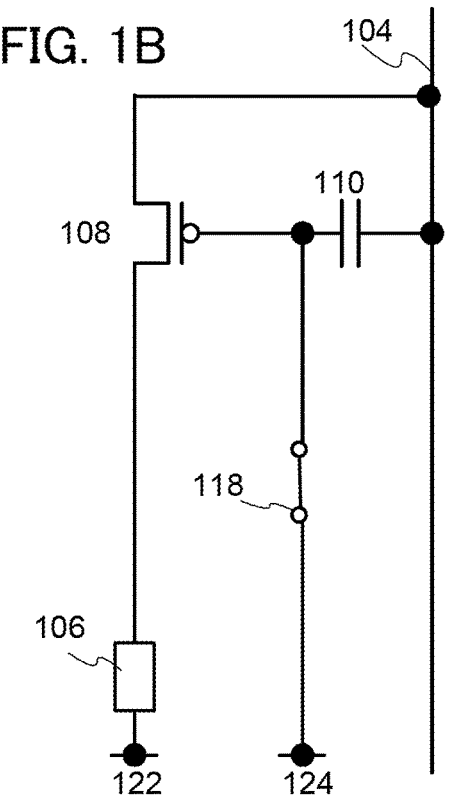
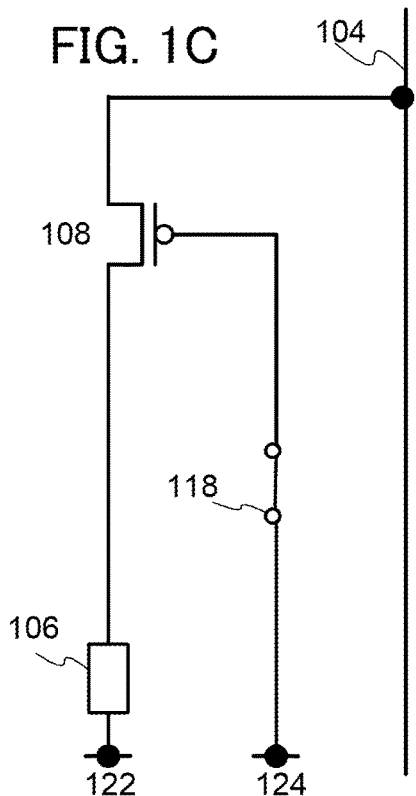
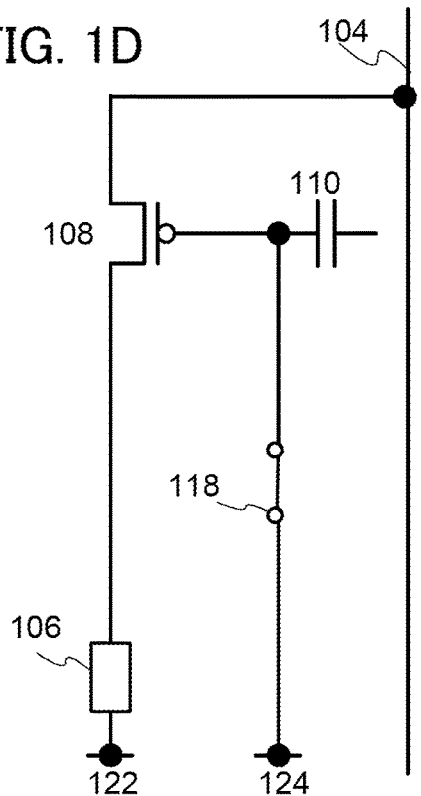

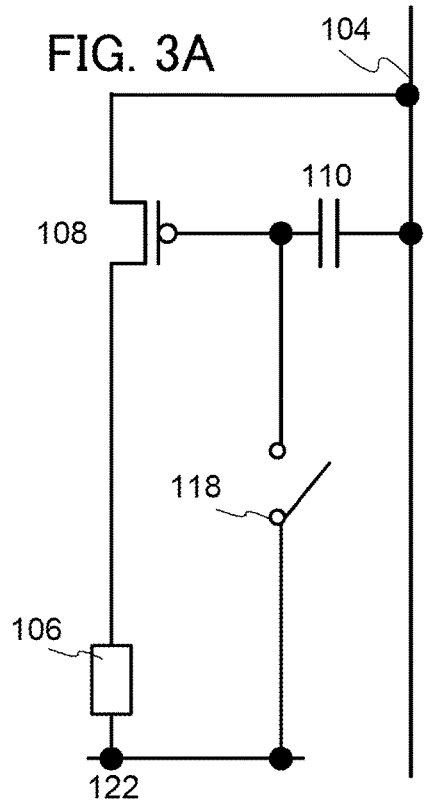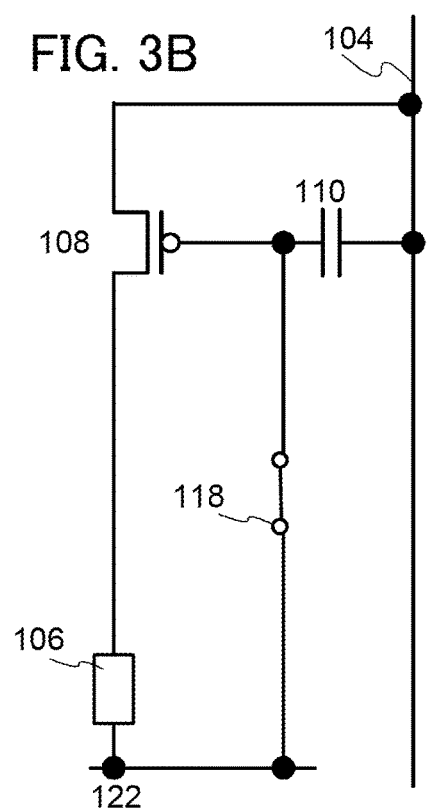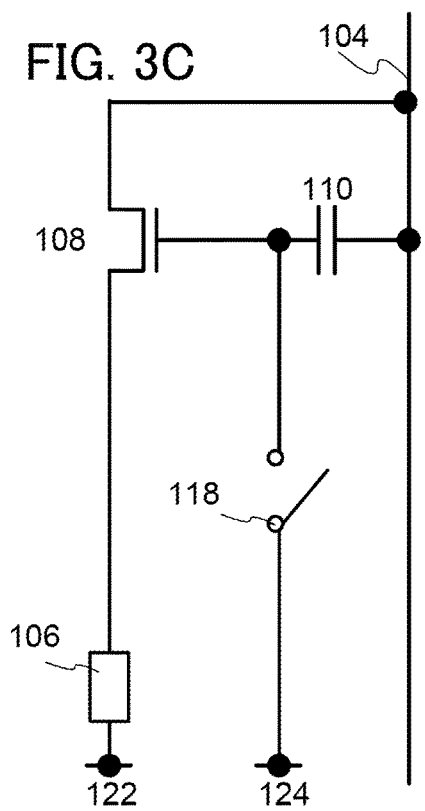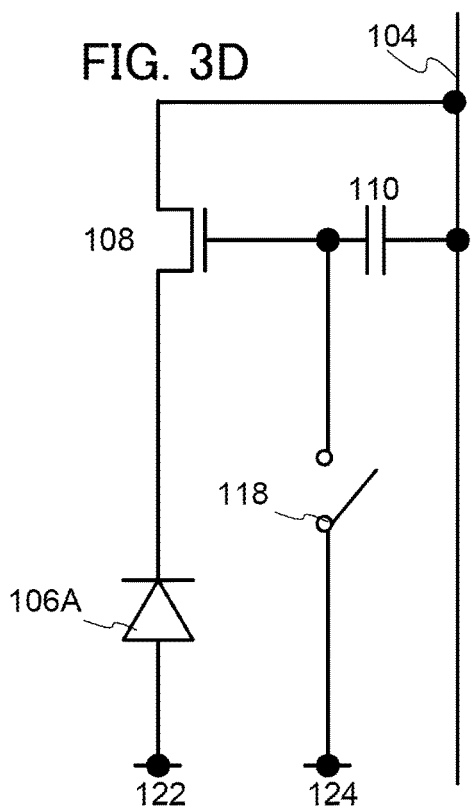

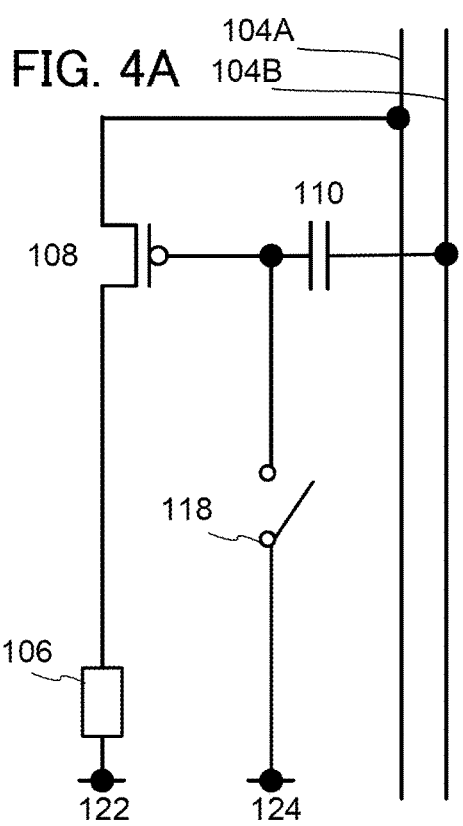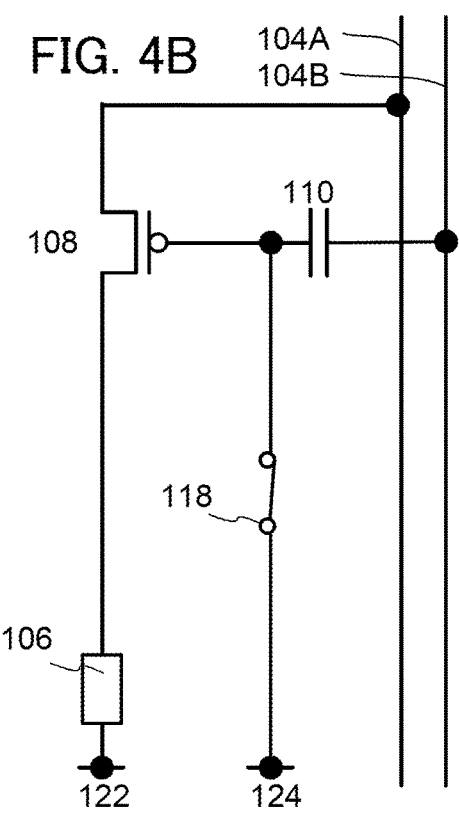

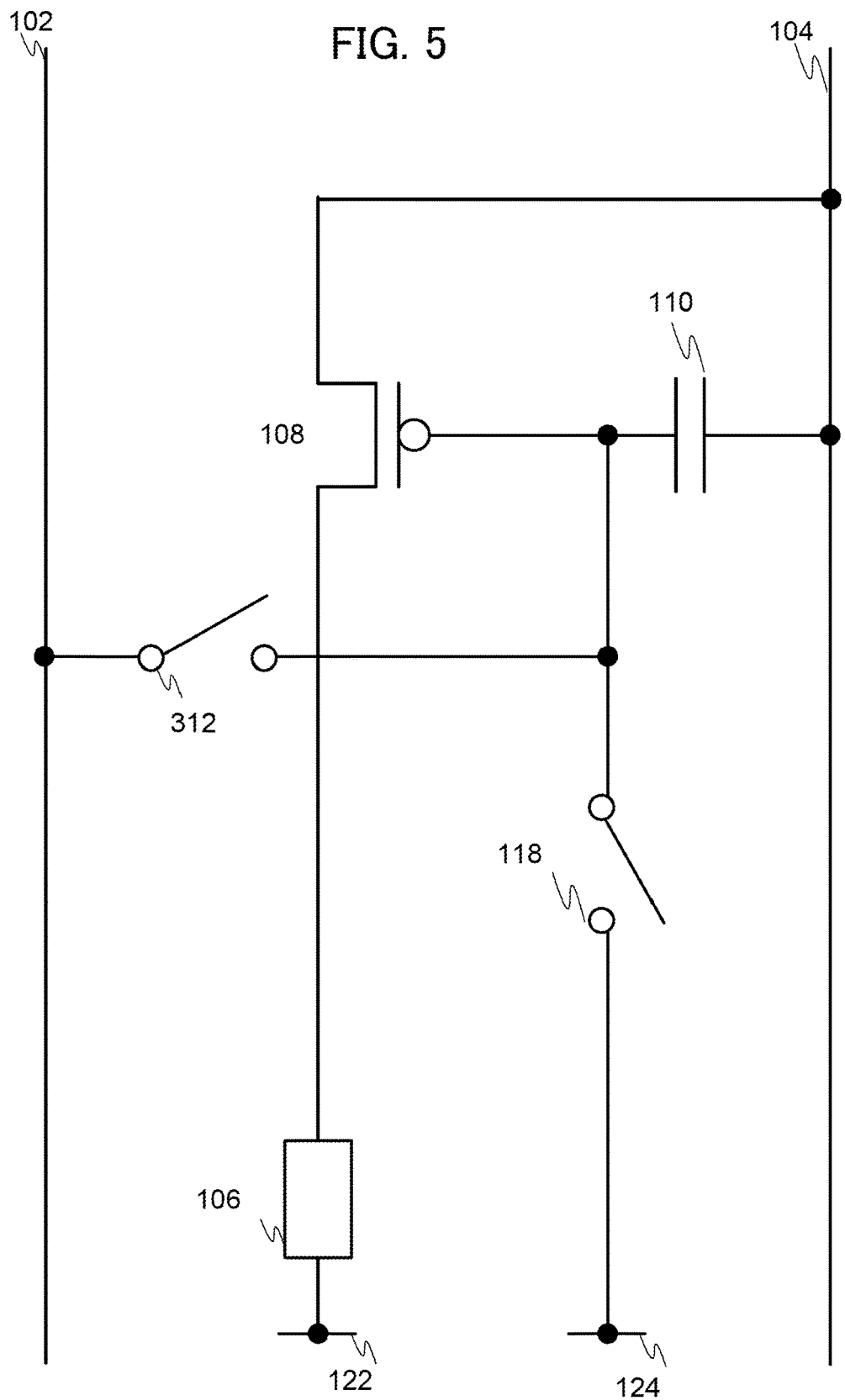

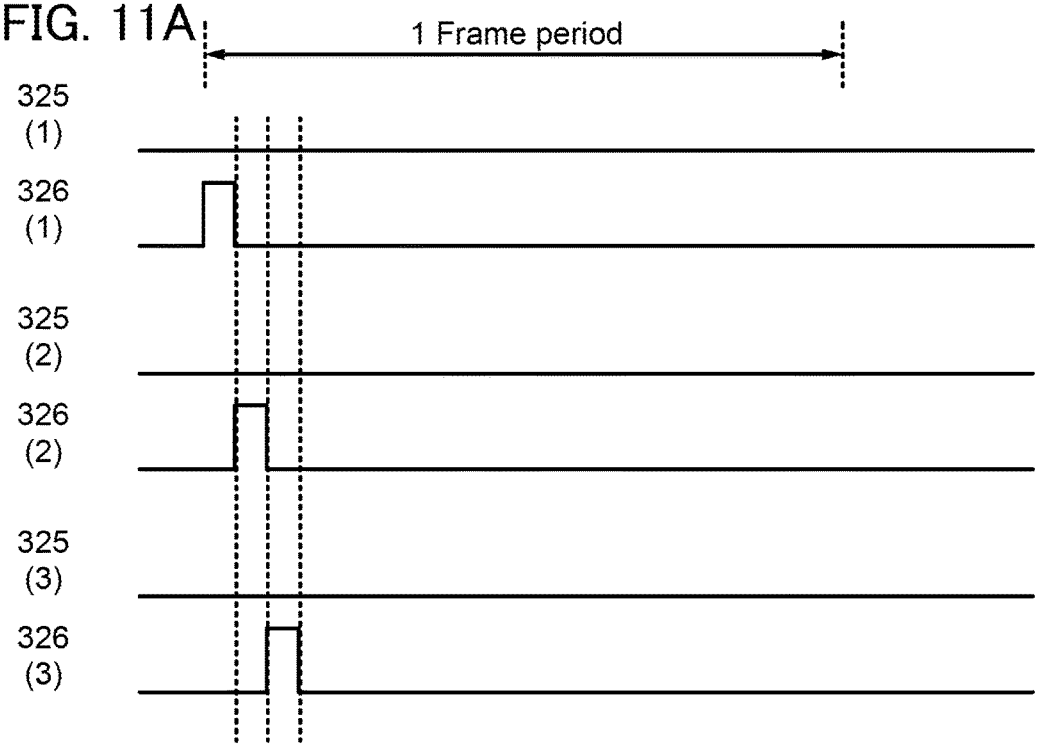
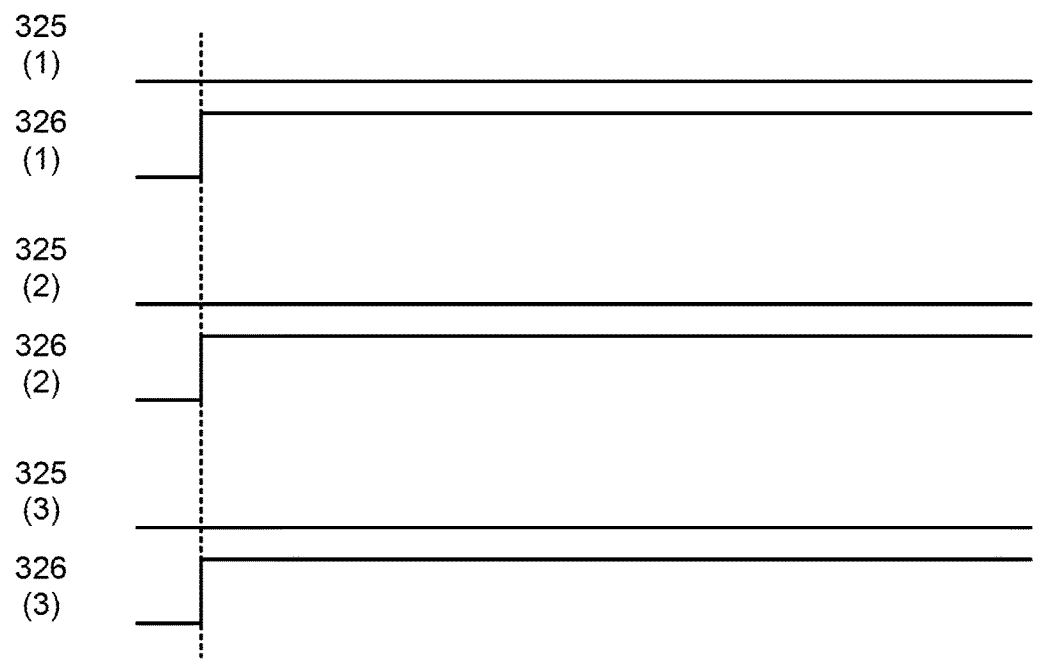

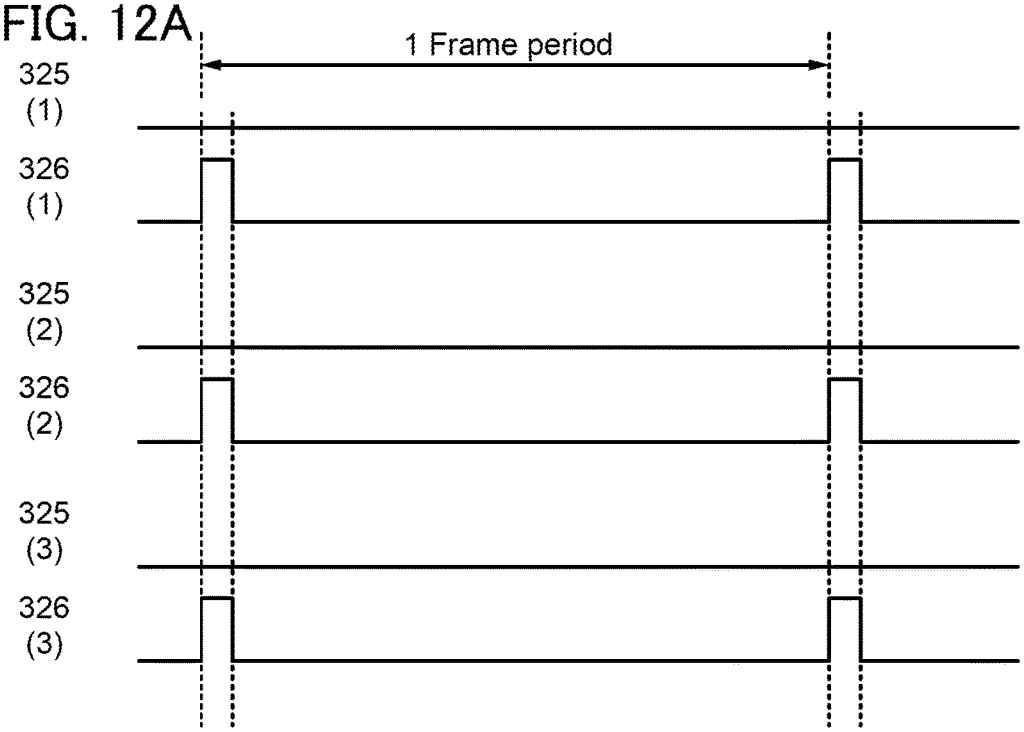
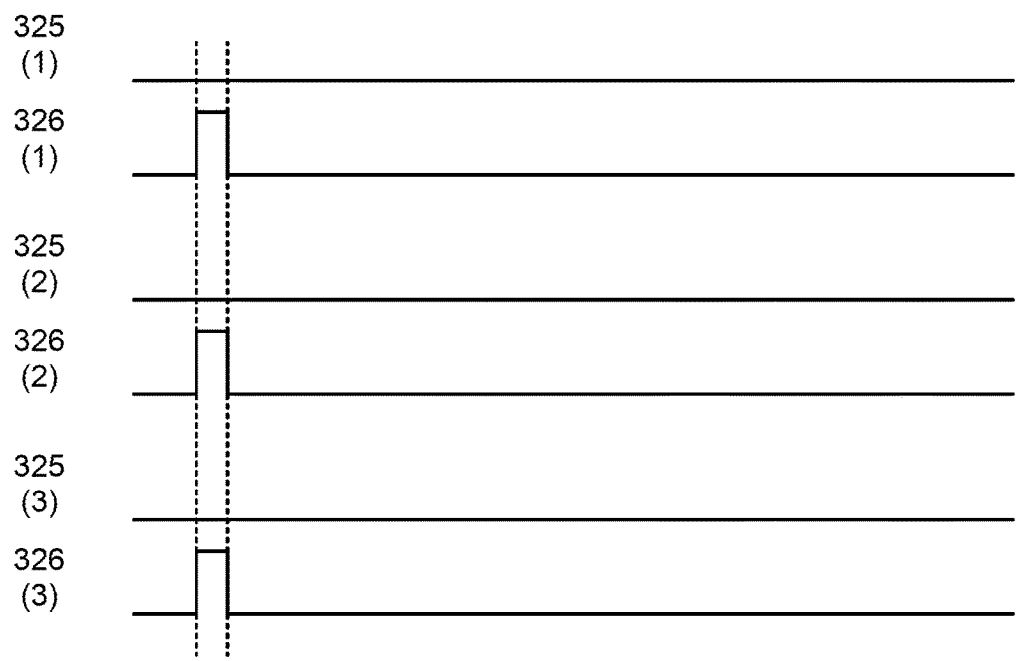

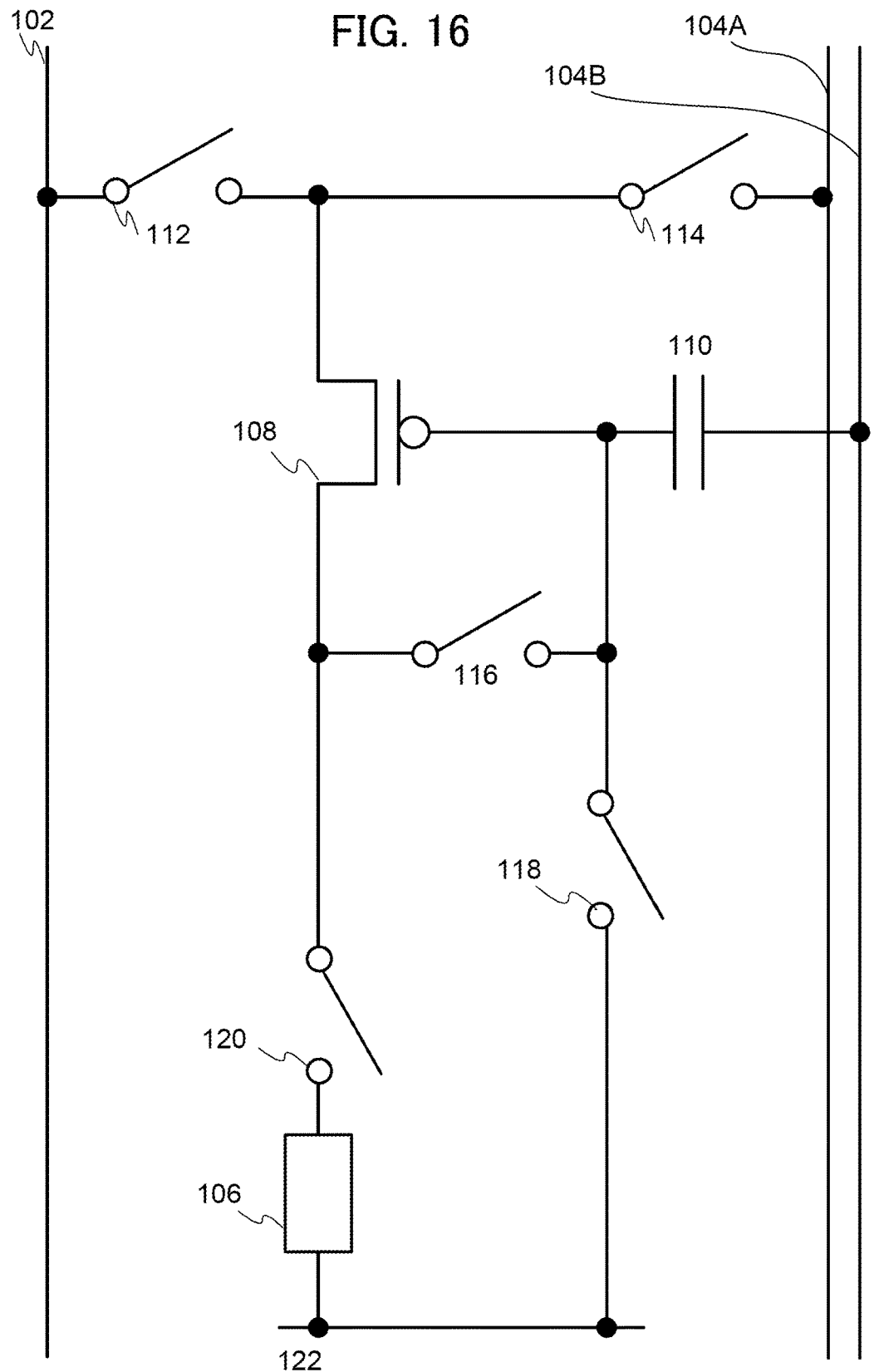

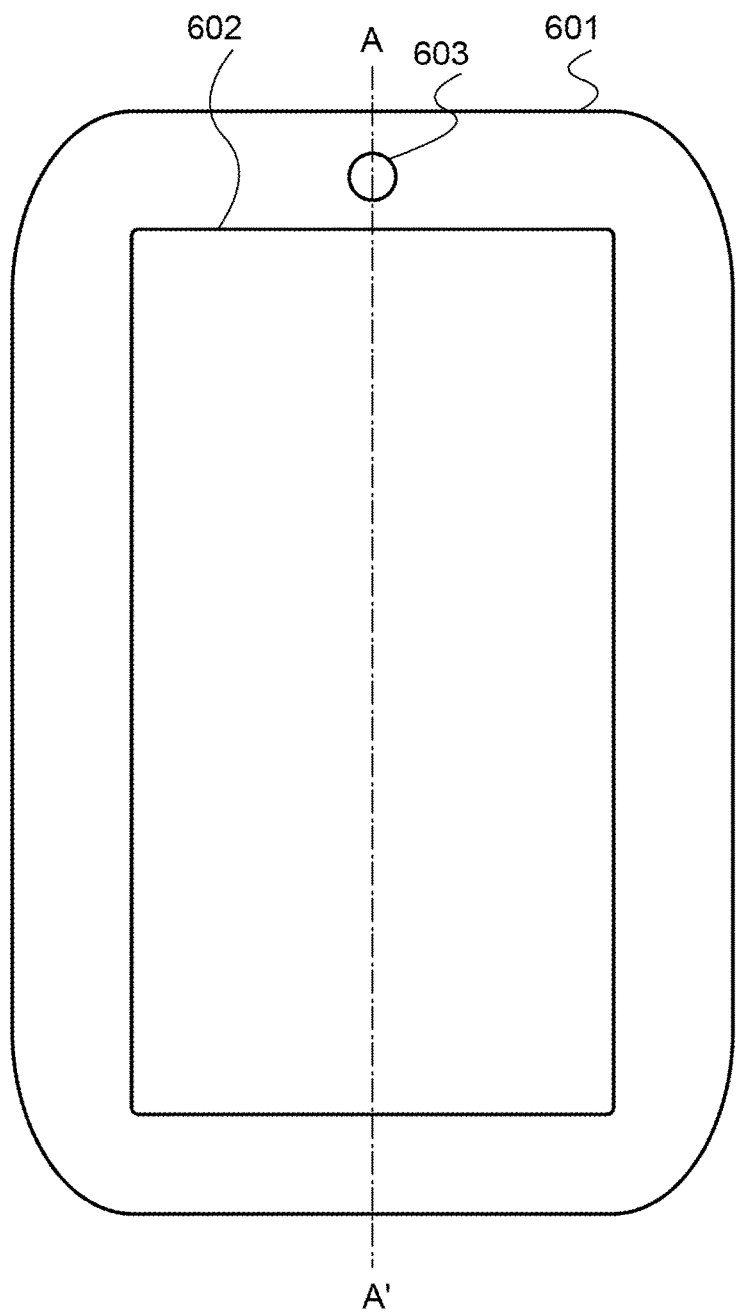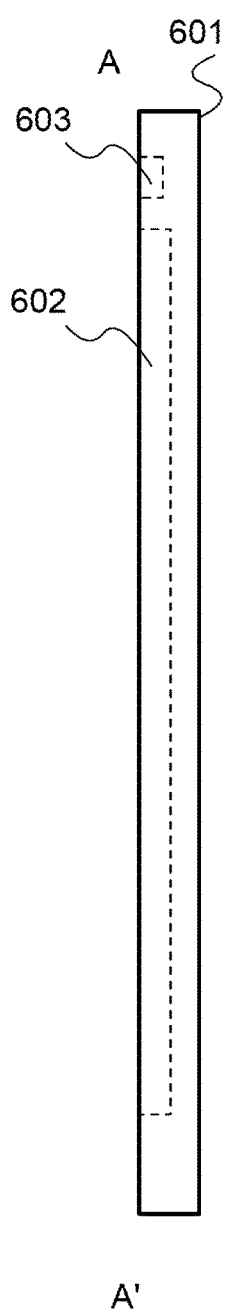

FIG. 30A
FIG. 30B
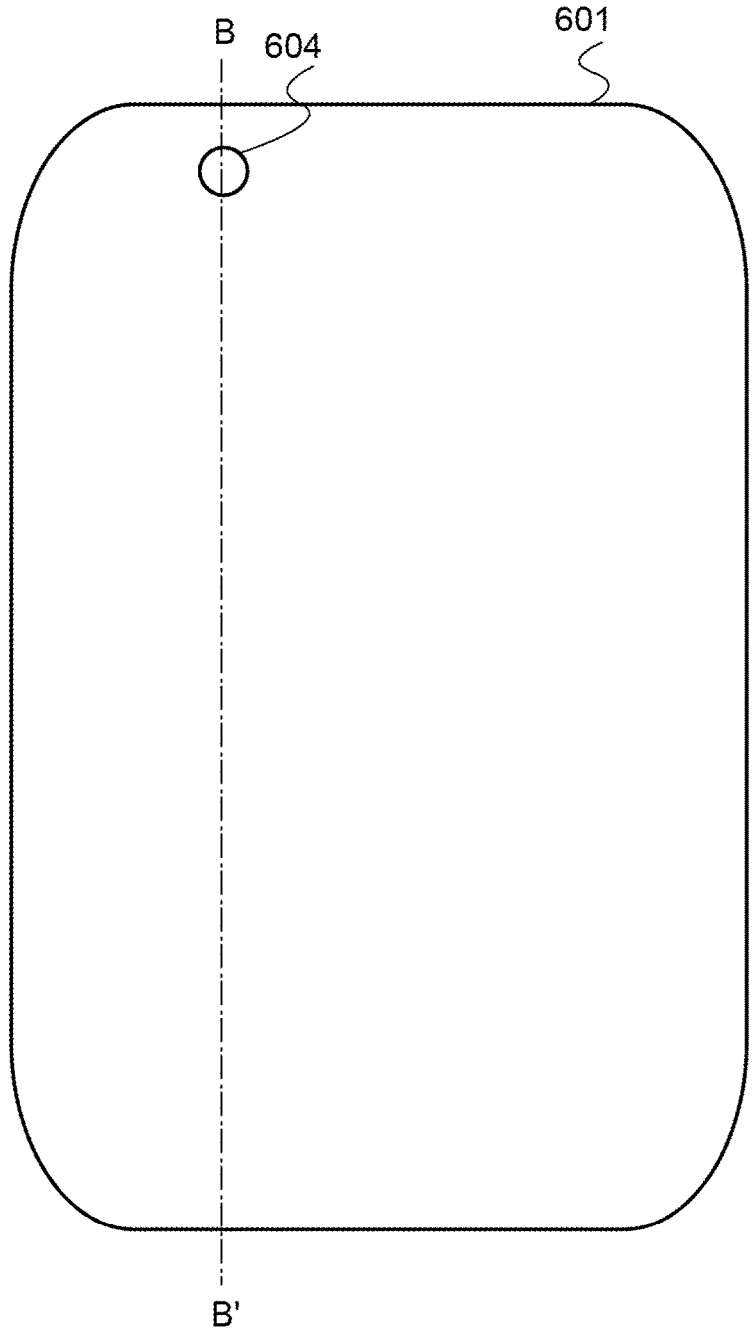
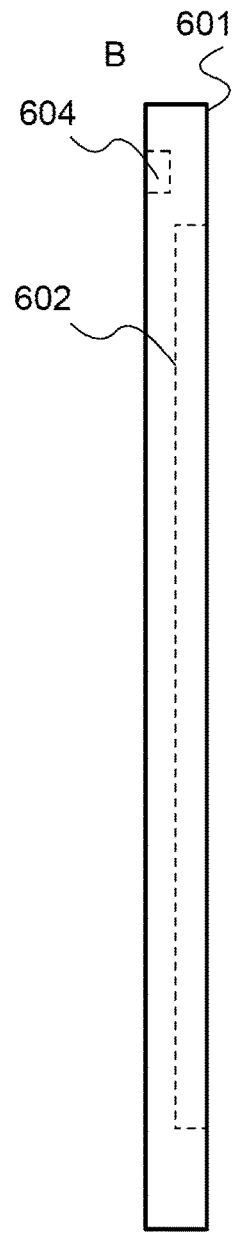

LIGHT-EMITTING DEVICE, ELECTRONIC DEVICE, AND DRIVING METHOD THEREOF

BACKGROUND OF THE INVENTION

1. Field of the Invention

The present invention relates to an object, a method, or a manufacturing method. The present invention relates to a process, a machine, manufacture, or a composition of matter, particularly to a semiconductor device, a display device, a light-emitting device, a lighting device, an imaging device, a security device, a driving method thereof, or a manufacturing method thereof. In particular, one embodiment of the present invention relates to a light source of an imaging device or a driving method thereof.

2. Description of the Related Art

Electronic devices having a camera function and imaging elements such as image sensors have been developed. In particular, a portable electronic device having a camera function is actively developed. The portable electronic device has a display on its front surface. Users take pictures using an image sensor, looking at the large display on the back surface of the electronic device.

Recently, an electronic device including an image sensor not only on the back surface but also on the front surface of the electronic device has been developed. That is, an image sensor and a display are provided on the same surface, and a user's face looking at the display or the like is photographed with the image sensor on the front of the electronic device (see Patent Document 1). In addition, when the electronic device is used as a video phone, a user's face is photographed with the image sensor and the image can be sent to an intended party while viewing an image of the intended party on the display.

Note that the illuminance of the subject is sometimes low in taking with an image sensor. In this case, the subject is illuminated with a light source such as a flash or a strobe to increase the illuminance of the subject, so that images can be taken well (see Patent Document 2). A portable electronic device often includes a flash for illuminating a subject in addition to an image sensor. Patent Document 1 discloses an electronic device in which a display portion has a display function and a lighting function for a subject and these functions can be switched.

REFERENCE

Patent Document

[Patent Document 1] Japanese Published Patent Application No. 2004-350208
[Patent Document 2] Japanese Published Patent Application No. 2007-110717

SUMMARY OF THE INVENTION

A liquid crystal display device is often used for a display portion of an electronic device. Furthermore, a display device (or a light-emitting device) using a light-emitting element such as an organic EL (electroluminescence) element has been developed for a display portion of an electronic device. However, the deterioration of the characteristics of light-emitting elements in a light-emitting device reduces display uniformity and image burn-in or the like might occur.

For this reason, the light-emitting element operates so that constant current flows, that is, the light-emitting element operates with a constant current drive in order to prevent change in the value of current flowing into the light-emitting element even when the voltage-current characteristics of the light-emitting element deteriorate.

However, in the case of the constant current drive, a transistor for controlling the current value of the light-emitting element is driven in a saturation region; thus, a voltage between a source and a drain of the transistor is increased. Furthermore, in the case of using a light-emitting element as a light source such as a flash or a strobe, the luminance of the light-emitting element needs to be high, and large current needs to be flown into the light-emitting element. At this time, an extremely high voltage is needed as the source-drain voltage of the transistor for controlling the current value of the light-emitting element and power consumption is thus increased.

In the case where the light-emitting element is used as a light source such as a flash and a strobe with a normal luminance, which is the luminance for displaying, the luminance is not sufficient to illuminate a subject.

In view of the above, an object of one embodiment of the present invention is to provide a display device or the like which can illuminate a subject with high-luminance illumination light. Another object of one embodiment of the present invention is to provide a display device or the like which can be used as a light source for a subject. Another object of one embodiment of the present invention is to provide a display device or the like which can be used as a light source for a subject, can display images and texts, and can switch these functions. Another object of one embodiment of the present invention is to provide a display device or the like which can be used for security. Another object of one embodiment of the present invention is to provide a display device or the like with low power consumption. Another object of one embodiment of the present invention is to provide a display device or the like in which an operation region of a transistor is changed depending on the purpose when a light-emitting element is driven. Another object of one embodiment of the present invention is to provide a novel display device or the like. Another object of one embodiment of the present invention is to provide a novel lighting device or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a light-emitting device including a pixel, and the pixel includes a transistor and a light-emitting element. The transistor is configured to control the amount of current flowing into the light-emitting element. The transistor is configured to operate in a saturation region in a period during which the light-emitting device displays text or an image. The transistor is configured to operate in a linear region in a period during which the light-emitting device emits illumination light to a subject.

Another embodiment of the present invention is an electronic device including a light-emitting device and a camera portion, and the light-emitting device includes a pixel. The pixel includes a transistor and a light-emitting element. The transistor is configured to control the amount of current flowing into the light-emitting element. The transistor is configured to operate in a saturation region in a period during which the light-emitting device displays text or an image. The transistor is configured to operate in a linear region in a period during which the light-emitting device emits illumination light to a subject whose image is taken with the camera portion.

Another embodiment of the present invention is the electronic device in which the camera portion is configured to take the subject in a period during which the light-emitting device emits the illumination light to the subject.

Another embodiment of the present invention is a driving method of a light-emitting device including a pixel. The pixel includes a transistor and a light-emitting element. The transistor has a function of controlling the amount of current flowing into the light-emitting element. In a first operation mode, the light-emitting device displays text or an image and the transistor is configured to operate in a saturation region. In a second operation mode the light-emitting device emits illumination light to a subject and the transistor is configured to operate in a linear region.

Another embodiment of the present invention is a driving method of a electronic device including a light-emitting device and a camera portion. The light-emitting device includes a pixel, and the pixel includes a transistor and a light-emitting element. The transistor has a function of controlling the amount of current flowing into the light-emitting element. In a first operation mode, the light-emitting device displays text or an image and the transistor is configured to operate in a saturation region. In a second operation mode the light-emitting device emits illumination light to a subject whose image is taken with the camera portion and the transistor is configured to operate in a linear region.

Another embodiment of the present invention is the driving method of the electronic device in which the camera portion takes the subject in the operation second mode.

One embodiment of the present invention can provide a display device or the like which can illuminate a subject with high-luminance illumination light. Another embodiment of the present invention can provide a display device or the like which can be used as a light source for a subject. Another embodiment of the present invention can provide a display device or the like which can be used as a light source for a subject, can display images and texts, and can switch these functions. Another embodiment of the present invention can provide a display device or the like which can be used for security. Another embodiment of the present invention can provide a display device or the like with low power consumption. Another embodiment of the present invention can provide a display device or the like in which an operation region of a transistor is changed depending on the purpose when a light-emitting element is driven. Another embodiment of the present invention can provide a novel display device or the like. Another embodiment of the present invention can provide a novel lighting device or the like.

Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

FIGS. 1A to 1D illustrate a method for driving a light-emitting device of one embodiment of the present invention.

FIGS. 3A to 3D illustrate a method for driving a light-emitting device of one embodiment of the present invention.

FIGS. 4A and 4B illustrate a method for driving a light-emitting device of one embodiment of the present invention.

FIG. 5 illustrates a circuit configuration of a light-emitting device of one embodiment of the present invention.

FIGS. 11A and 11B are timing charts of a light-emitting device of one embodiment of the present invention.

FIGS. 12A and 12B are timing charts of a light-emitting device of one embodiment of the present invention.

FIG. 16 illustrates a circuit configuration of a light-emitting device of one embodiment of the present invention.

FIGS. 29A and 29B illustrate an electronic device of one embodiment of the present invention.

FIGS. 30A and 30B illustrate an electronic device of one embodiment of the present invention.

DETAILED DESCRIPTION OF THE INVENTION

Figure 2A:
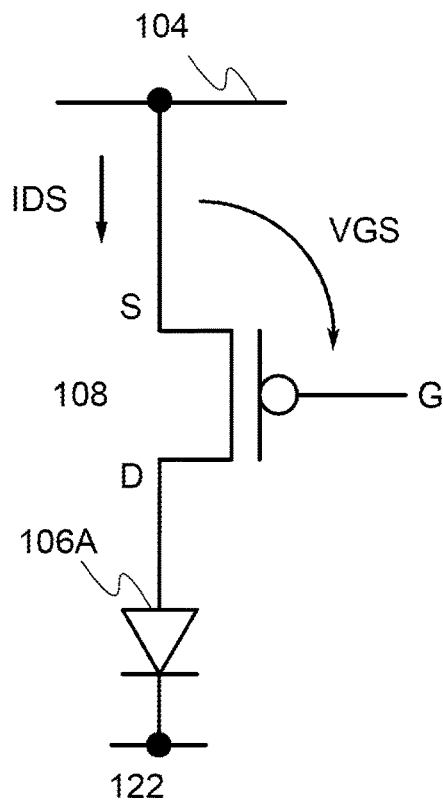
FIGS. 2A and 2B illustrate operation of a light-emitting device of one embodiment of the present invention.

Hereinafter, embodiments will be described with reference to drawings. Note that the embodiments can be implemented with various modes. It will be readily appreciated by those skilled in the art that modes and details can be changed in various ways without departing from the spirit and scope of the present invention. The present invention therefore should not be construed as being limited to the description of the implementations. Note that in structures of the invention described below, the same portions or portions having similar functions are denoted by the same reference numerals, and description thereof is not repeated.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

The invention excluding content which is not specified in the drawings and texts in this specification can be constituted. Alternatively, when the range of a value (e.g., the maximum and minimum values) is described, the range may be freely narrowed or a value in the range may be excluded, so that the invention can be specified by a range part of which is excluded. In this manner, it is possible to specify the scope of the present invention so that a conventional technology is excluded, for example.

As a specific example, a diagram of a circuit including a first transistor to a fifth transistor is illustrated. In that case, it can be specified that the circuit does not include a sixth transistor in the invention. It can be specified that the circuit does not include a capacitor in the invention. It can also be specified that the circuit does not include a sixth transistor with a particular connection structure in the invention. Furthermore, it can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, a description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from the invention. For example, it can be specified that the case where the voltage is higher than or equal to 13 V is excluded from the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention.

As another specific example, a description "a voltage is preferred to be 10 V" is given. In that case, for example, it can be specified that the case where the voltage is higher than or equal to −2 V and lower than or equal to 1 V is excluded from the invention. For example, it can be specified that the case where the voltage is higher than or equal to 13 V is excluded from the invention.

As another specific example, a description "a film is an insulating film" is given to describe properties of a material. In that case, for example, it can be specified that the case where the insulating film is an organic insulating film is excluded from the invention. For example, it can be specified that the case where the insulating film is an inorganic insulating film is excluded from the invention.

As another specific example, a description of a stacked-layer structure, "a film is provided between A and B" is given. In that case, for example, it can be specified that the case where the film is a stacked film of four or more layers is excluded from the invention. For example, it can be specified that the case where a conductive film is provided between A and the film is excluded from the invention.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, even when such portions are not specified, one aspect of the present invention can be clear and it can be determined that one aspect of the present invention is disclosed in this specification and the like in some cases. In particular, in the case where the number of portions to which the terminal is connected might be plural, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one aspect of the present invention can be clear and it can be determined that one aspect of the present invention is disclosed in this specification and the like in some cases. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, in a diagram or a text described in one embodiment, it is possible to take out part of the diagram or the text and constitute an embodiment of the invention. Thus, in the case where a diagram or a text related to a certain portion is described, the context taken out from part of the diagram or the text is also disclosed as one embodiment of the invention, and one embodiment of the invention can be constituted. Thus, for example, in a diagram or a text including one or more of active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like, it is possible to take out part of the diagram or the text and constitute one embodiment of the invention. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where M<N) from a cross-sectional view in which N layers (N is an integer) are provided. As another example, it is possible to constitute one embodiment of the invention by taking out M elements (M is an integer, where M<N) from a flow chart in which N elements (N is an integer) are provided.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted.

Note that size, the thickness of layers, or regions in the drawings are exaggerated for simplicity in some cases. Therefore, embodiments of the present invention are not limited to such a scale.

In this specification and the like, a transistor is an element having at least three terminals: a gate, a drain, and a source. The transistor has a channel region between the drain (a drain terminal, a drain region, or a drain electrode) and the source (a source terminal, a source region, or a source electrode), and current can flow through the drain, the channel region, and the source. Here, since the source and the drain of the transistor change depending on the structure, the operating condition, and the like of the transistor, it is difficult to define which is a source or a drain. Therefore, a portion functioning as a source or a drain is not called a source or a drain in some cases. In that case, for example, one of the source and the drain is referred to as a first terminal, a first electrode, or a first region and the other of the source and the drain is referred to as a second terminal, a second electrode, or a second region in some cases.

Note that a transistor may be an element having at least three terminals of a base, an emitter, and a collector. In that case also, one of the emitter and the collector is referred to as a first terminal, a first electrode, or a first region, and the other of the emitter and the collector is referred to as a second terminal, a second electrode, or a second region in some cases. Note that in the case where a bipolar transistor is used as a transistor, a gate can be rephrased as a base.

In this specification and the like, when it is explicitly described that X and Y are connected, the case where X and Y are electrically connected, the case where X and Y are functionally connected, and the case where X and Y are directly connected are included therein. Accordingly, another element may be provided between elements having a connection relation illustrated in drawings and texts, without limitation on a predetermined connection relation, for example, the connection relation illustrated in the drawings and the texts.

Here, X and Y each denote an object (e.g., a device, an element, a circuit, a line, an electrode, a terminal, a conductive film, a layer, or the like).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down dc-dc converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X the source (or the first terminal or the like) of the transistor, the drain (or the second terminal or the like) of the transistor, and Y are electrically connected to each other in this order", "a source (or a first terminal or the like) of a transistor is electrically connected to X a drain (or a second terminal or the like) of the transistor is electrically connected to Y, and X the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope. When the connection order in a circuit configuration is defined by an expression similar to the above examples, a source (or a first terminal or the like) and a drain (or a second terminal or the like) of a transistor can be distinguished from each other to specify the technical scope. Note that these expressions are examples and there is no limitation on the expressions.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". It is also possible to use the expression "a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

In addition, in this specification and the like, the term such as an "electrode" or a "wiring" does not limit a function of a component. For example, an "electrode" is used as part of a "wiring" in some cases, and vice versa. Further, the term "electrode" or "wiring" can also mean a combination of a plurality of "electrodes" and "wirings" formed in an integrated manner.

Note that a voltage refers to a difference between potentials of two points, and a potential refers to electrostatic energy (electric potential energy) of a unit charge at a given point in an electrostatic field. Note that in general, a difference between a potential of one point and a reference potential (e.g., a ground potential or a source potential) is merely called a potential or voltage, and "potential" and "voltage" are used as synonymous words.

Note that in general, potential and voltage are relative values. Therefore, ground potential is not always 0 V.

In the drawings, the size, the layer thickness, or the region is exaggerated for clarity in some cases. Therefore, embodiments of the present invention are not limited to such a scale. Note that drawings are schematic views of ideal examples, and the embodiments of the present invention are not limited to the shape or the value illustrated in the drawings. For example, variation in signal, voltage, or current due to noise or a difference in timing can be included.

In this specification and the like, the positional relationships of circuit blocks in diagrams are specified for description, and even in the case where different circuit blocks have different functions in the diagrams, the different circuit blocks might be provided in an actual circuit or region so that different functions are achieved in the same circuit or region. Further, the function of each circuit block in a drawing is specified for description. Thus, even when one circuit block is illustrated, an actual circuit or region may be configured so that processing which is illustrated as being performed in the one circuit block is performed in a plurality of circuit blocks.

In this specification and the like, for example, a display element, a display device which is a device including a display element, a light-emitting element, and a light-emitting device which is a device including a light-emitting element can employ a variety of modes or can include a variety of elements. Examples of a display element, a display device, a light-emitting element, or a light-emitting device include an EL (electroluminescent) element (e.g., an EL element including organic and inorganic materials, an organic EL element, or an inorganic EL element), an LED (e.g., a white LED, a red LED, a green LED, or a blue LED), a transistor (a transistor which emits light depending on current), an electron emitter, a liquid crystal element, electronic ink, an electrophoretic element, an electrowetting element, a grating light valve (GLV), a plasma display panel (PDP), a micro electro mechanical system (MEMS), a digital micromirror device (DMD), a digital micro shutter (DMS), MIRASOL (registered trademark) an interferometric modulator display (IMOD), a piezoelectric ceramic display, or a carbon nanotube, which are display media whose contrast, luminance, reflectivity, transmittance, or the like is changed by electromagnetic action. Note that examples of display devices having EL elements include an EL display. Display devices having electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). An example of a display device including electronic ink or electrophoretic elements is electronic paper.

There is no limitation on the type of transistors. For example, a transistor including a single-crystal silicon, or a transistor including a non-single-crystal semiconductor film typified by amorphous silicon, polycrystalline silicon, microcrystalline (also referred to as microcrystal, nanocrystal, or semi-amorphous) silicon, or the like can be used as a transistor. In the case of using the TFT, there are various advantages. For example, since the TFT can be formed at temperature lower than that of the case of using single-crystal silicon, manufacturing cost can be reduced or a manufacturing apparatus can be made larger. Since the manufacturing apparatus is made larger, the TFT can be formed using a large substrate. Therefore, many display devices can be formed at the same time at low cost. In addition, a substrate having low heat resistance can be used because of low manufacturing temperature. Therefore, the transistor can be formed using a light-transmitting substrate. Alternatively, transmission of light in a display element can be controlled by using the transistor formed using the light-transmitting substrate. Alternatively, part of a film included in the transistor can transmit light because the thickness of the transistor is small. Therefore, the aperture ratio can be improved.

Note that when a catalyst (e.g., nickel) is used in the case of forming polycrystalline silicon, crystallinity can be further improved and a transistor having excellent electric characteristics can be formed. Accordingly, a gate driver circuit (e.g., a scan line driver circuit), a source driver circuit (e.g., a signal line driver circuit), and a signal processing circuit (e.g., a signal generation circuit, a gamma correction circuit, or a DA converter circuit) can be formed using the same substrate as a pixel portion.

Note that when a catalyst (e.g., nickel) is used in the case of forming microcrystalline silicon, crystallinity can be further improved and a transistor having excellent electric characteristics can be formed. In this case, crystallinity can be improved by just performing heat treatment without performing laser irradiation. Accordingly, a gate driver circuit (e.g., a scan line driver circuit) and part of a source driver circuit (e.g., an analog switch) can be formed over the same substrate. Note that when laser irradiation for crystallization is not performed, unevenness in crystallinity of silicon can be suppressed. Therefore, high-quality images can be displayed. Note that it is possible to manufacture polycrystalline silicon or microcrystalline silicon without a catalyst (e.g., nickel).

Note that although preferably, crystallinity of silicon is improved to polycrystal, microcrystal, or the like in the whole panel, the present invention is not limited to this. Crystallinity of silicon may be improved only in part of the panel. Selective increase in crystallinity can be achieved by selective laser irradiation or the like. For example, only a peripheral driver circuit region excluding pixels may be irradiated with laser light. Alternatively, only a region of a gate driver circuit, a source driver circuit, or the like may be irradiated with laser light. Alternatively, only part of a source driver circuit (e.g., an analog switch) may be irradiated with laser light. Crystallinity of silicon can be thus improved only in a region in which a circuit needs to be operated at high speed. Since a pixel region is not particularly needed to be operated at high speed, even if crystallinity is not improved, the pixel circuit can be operated without problems. Thus, a region whose crystallinity is improved is small, so that manufacturing steps can be decreased, and throughput can be increased and manufacturing cost can be reduced. Since the number of necessary manufacturing apparatus is small, manufacturing cost can be reduced.

Note that for example, a transistor including a compound semiconductor (e.g., SiGe, GaAs, and the like), an oxide semiconductor (e.g., ZnO, InGaZnO, IZO (indium zinc oxide), ITO (indium tin oxide), SnO, TiO, and AlZnSnO (AZTO)), ITZO (In—Sn—Zn—O), or the like; a thin film transistor obtained by thinning such a compound semiconductor or an oxide semiconductor; or the like can be used as a transistor. Since manufacturing temperature can be lowered, such a transistor can be formed at room temperature, for example. The transistor can be then formed directly on a substrate having low heat resistance, such as a plastic substrate or a film substrate. Note that such a compound semiconductor or an oxide semiconductor can be used not only for a channel portion of the transistor but also for other applications. For example, such a compound semiconductor or an oxide semiconductor can be used for a wiring, a resistor, a pixel electrode, a light-transmitting electrode, or the like. Since such an element can be formed at the same time as the transistor, cost can be reduced.

Note that for example, a transistor or the like formed by an inkjet method or a printing method can be used as a transistor. Accordingly, a transistor can be formed at room temperature, can be formed at a low vacuum, or can be formed using a large substrate. The transistor can be thus formed without use of a mask (reticle), so that the layout of the transistor can be easily changed. Since the transistor can be formed without use of a resist, material cost is reduced and the number of steps can be reduced. Furthermore, since a film can be formed where needed, a material is not wasted as compared to a manufacturing method by which etching is performed after the film is formed over the entire surface; thus, costs can be reduced.

Note that for example, a transistor or the like including an organic semiconductor or a carbon nanotube can be used as a transistor, and such a transistor can be formed using a substrate which can be bent. A device including a transistor which includes an organic semiconductor or a carbon nanotube can resist a shock.

Note that transistors with a variety of different structures can be used as a transistor. For example, a MOS transistor, a junction transistor, a bipolar transistor, or the like can be used as a transistor. By using a MOS transistor as a transistor, the size of the transistor can be reduced, and large number of transistors can be mounted. Alternatively, the use of a bipolar transistor as the transistor allows a large amount of current to flow, and a circuit can be operated at high speed. Note that a MOS transistor and a bipolar transistor may be formed over one substrate, and reduction in power consumption, reduction in size, high speed operation, and the like can be realized.

Note that in this specification and the like, for example, a transistor with a multi-gate structure having two or more gate electrodes can be used as a transistor. With the multi-gate structure, a structure where a plurality of transistors are connected in series is provided because channel regions are connected in series. Thus, with the multi-gate structure, the amount of off-state current can be reduced and the withstand voltage of the transistor can be increased (the reliability can be improved). Alternatively, with the multi-gate structure, drain-source current does not change much even if drain-source voltage changes when the transistor operates in a saturation region, so that a flat slope of voltage-current characteristics can be obtained. By utilizing the flat slope of the voltage-current characteristics, an ideal current source circuit or an active load having an extremely large resistance can be realized. Accordingly, a differential circuit, a current mirror circuit, or the like having excellent properties can be realized.

Note that a transistor with a structure where gate electrodes are formed above and below a channel can be used, for example. With the structure where the gate electrodes are formed above and below the channel, a circuit structure where a plurality of transistors are connected parallel to one another is provided, and thus a channel region is increased, so that the amount of current can be increased. Alternatively, by using the structure where gate electrodes are formed above and below the channel, a depletion layer can be easily formed, so that subthreshold swing can be improved.

Note that as a transistor, for example, it is possible to use a transistor with a structure where a gate electrode is formed above a channel region, a structure where a gate electrode is formed below a channel region, a staggered structure, an inverted staggered structure, a structure where a channel region is divided into a plurality of regions, a structure where channel regions are connected parallel to each other or in series, or the like. A transistor with any of a variety of structures such as a planar type, a FIN-type, a Tri-Gate type, a top-gate type, a bottom-gate type, a double-gate type (with gates above and below a channel), and the like can be used.

Note that for example, a transistor with a structure where a source electrode or a drain electrode overlaps with a channel region (or part of it) can be used as a transistor. By using the structure where the source electrode or the drain electrode overlaps with the channel region (or part of it), unstable operation due to accumulation of electric charge in part of the channel region can be prevented.

Note that for example, a transistor with a structure where an LDD region is provided can be used as a transistor. By providing the LDD region, the amount of off-state current can be reduced or the withstand voltage of the transistor can be increased (reliability can be improved). Alternatively, by providing the LDD region, drain-source current does not fluctuate very much even when drain-source voltage fluctuates when the transistor operates in the saturation region, so that a flat slope of voltage-current characteristics can be obtained.

Note that in this specification and the like, a transistor can be formed using a variety of substrates. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of a flexible substrate include a flexible synthetic resin such as plastics typified by polyethylene terephthalate (PET), polyethylene naphthalate (PEN), and polyether sulfone (PES), and acrylic. Examples of the material for the bonding film include polypropylene, polyester, vinyl, polyvinyl fluoride, and polyvinyl chloride. Examples of the material for the base film include polyester, polyamide, polyimide, inorganic vapor deposition film, and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Note that a transistor may be formed using one substrate, and then the transistor may be transferred to another substrate. In addition to the above substrates over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, or the like can be used as a substrate to which the transistor is transferred. When such a substrate is used, a transistor with excellent properties or a transistor with low power consumption can be formed, a device with high durability, high heat resistance can be provided, or reduction in weight or thickness can be achieved.

Note that all the circuits needed to realize a predetermined function can be formed over the same substrate (e.g., a glass substrate, a plastic substrate, a single crystal substrate, or an SOI substrate). Thus, costs can be reduced by reduction in the number of components, or the reliability can be improved by reduction in the number of connections to circuit components.

Note that it is possible to form not all the circuits needed to realize the predetermined function over the same substrate. That is, a part of the circuits needed to realize the predetermined function can be formed over a substrate and another part of the circuits needed to realize the predetermined function can be formed over another substrate. For example, a part of the circuits needed to realize the predetermined function can be formed over a glass substrate and a part of the circuits needed to realize the predetermined function can be formed over a single crystal substrate (or an SOI substrate). Then, a single crystal substrate over which a part of the circuits needed to realize the predetermined function (such a substrate is also referred to as an IC chip) can be connected to a glass substrate by COG (chip on glass), and an IC chip can be provided over the glass substrate. Alternatively, an IC chip can be connected to a glass substrate using TAB (tape automated bonding), COF (chip on film), SMT (surface mount technology), a printed circuit board, or the like. When some of the circuits are formed using the same substrate as a pixel portion in this manner, cost can be reduced by reduction in the number of components or reliability can be improved by reduction in the number of connections to circuit components. In particular, a circuit with high driving voltage, a circuit with high driving frequency, or the like consumes a large amount of power in many cases. In order to deal with it, such a circuit is formed over a substrate (e.g., a single crystal substrate) which is different from a substrate where the pixel portion is formed, so that an IC chip is formed. By the use of this IC chip, an increase in power consumption can be prevented.

Embodiment 1

In this embodiment, a method for driving a light-emitting device which is one embodiment of the present invention is described.

The light-emitting device has a display function and a lighting function for illuminating a subject using a camera, for example. The display function is a function of displaying text and images, which is a common function of display devices. The lighting function is a function of illuminating a subject or the like with high-luminance illumination light. In this light-emitting device, these functions or operations can be switched. Note that a driving method and a state for performing the display function are different from those for performing the lighting function, for example.

Note that the purpose and function of the lighting function are not limited to the improvement of the illuminance of a subject. For example, the lighting function may be used only for brightening up a dark part, for anticrime measures, for traffic accident countermeasures, and the like. When a user is almost attacked by someone, he/she can shine the lighting into the attacker to blind the attacker's eyes. A user can also use the lighting while bicycling to announce the existence of his/her bicycle to cars driving nearby.

For example, the light-emitting device has two operation modes. In other words, the light-emitting device is operated by two different driving methods, for example.

First, a driving method in a first operation mode will be described. The driving method here is used when the display function is performed. As shown in FIG. 1A, a voltage based on a video signal input from outside (not illustrated) is held in a capacitor 110, and a switch 118 is off. Current is thus supplied from a wiring 104 to a load 106 via a transistor 108. The transistor 108 can control the amount of current flowing into the load 106 in accordance with the voltage held in the capacitor 110. A voltage based on images to be displayed is held in the capacitor 110, so that the image is displayed.

Next, a driving method in a second operation mode will be described. The driving method here is used when the lighting function is performed. As shown in FIG. 1B, the switch 118 is on, and the potential of a wiring 124 is supplied to a gate of the transistor 108. As well as a wiring 122 which is connected to the load 106, the wiring 124 has a low potential; thus, a voltage between the wiring 104 and the gate of the transistor 108, that is, an absolute value of a gate-source voltage of the transistor 108 is extremely large, and consequently an extremely large current can be supplied to the load 106. Here, in the case where the load 106 includes a light-emitting element, the luminance of the light-emitting element is extremely high, which allows the illuminance of a subject to be sufficiently high (high enough as the lighting function).

In the case of a self-emitting display, the luminance of each pixel can be freely increased as described above; thus, the display function using normal luminance and the lighting function using high luminance can be freely switched.

Figure 2B:
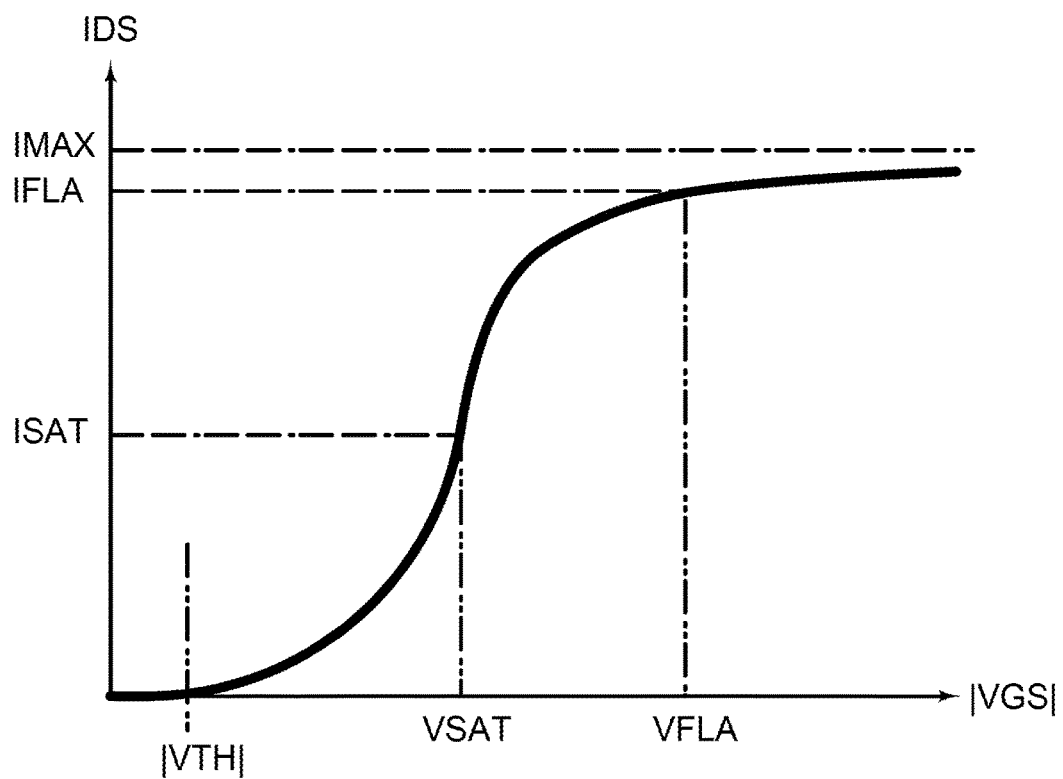

Here, the operation region of the transistor 108 will be described. FIG. 2A illustrates a circuit including the transistor 108 and a light-emitting element 106A. FIG. 2B is a graph whose horizontal axis represents an absolute value |VGS| of a voltage between the wiring 104 and the gate of the transistor 108, that is, a gate-source voltage of the transistor 108, and whose vertical axis represents a current IDS flowing into the transistor 108 and the light-emitting element 106A.

As the absolute value |VGS| of the gate-source voltage of the transistor 108 is increased and becomes larger than an absolute value |VTH| of a threshold voltage of the transistor 108, current starts flowing. When the absolute value |VGS| of the gate-source voltage of the transistor 108 is increased to reach a value VSAT, current having a value ISAT flows. So far, the transistor 108 operates in a saturation region while current flows, and a value of current flowing into the transistor 108 hardly changes even when a drain-source voltage of the transistor 108 changes. That is, the transistor 108 serves as a current source. Because the light-emitting element 106A is controlled by the current source, a value of current flowing into the light-emitting element does not change even when the voltage-current characteristics of the light-emitting element deteriorate. It can be thus said that the light-emitting element is driven by constant current drive, that is, with a current source. As a result, the influence of the deterioration of the light-emitting element is reduced and display unevenness, image burn-in, and the like can be reduced. In order to perform the display function, operation in this operation region (saturation region) is preferable while current flows.

Here, the current source supplies constant current even when the magnitude of voltage applied to both ends of the current source is changed, or the current source supplies constant current to an element connected to the current source even when the potential of the element is changed.

There is a voltage source as a power source other than a current source. The voltage source has a function of supplying constant voltage even when current flowing through a circuit connected to the voltage source is changed. The voltage source and the current source each have a function of supplying voltage and current, but the function of the voltage source and the function of the current source are different in what is supplied at a constant level even when one factor is changed. The current source has a function of supplying constant current event when voltage across both ends is changed. The voltage source has a function of supplying constant voltage even when current is changed.

Next, the absolute value |VGS| of the gate-source voltage of the transistor 108 is set to be larger than the value VSAT, for example, the absolute value |VGS| of the gate-source voltage of the transistor 108 is set to a value VFLA. At this time, current having a value IFLA which is larger than the value ISAT flows. In a region where the absolute value |VGS| of the gate-source voltage of the transistor 108 is larger than the value VSAT, the transistor 108 operates in a linear region while current flows. When the current value of the transistor 108 changes as the drain-source voltage of the transistor 108 changes. That is, the transistor 108 functions as a switch, and the current flowing into the light-emitting element 106A is controlled with voltage applied to the light-emitting element 106A, that is, the voltage between the wirings 104 and 122. When the voltage current characteristics of the light-emitting element deteriorate, the value of current flowing into the light-emitting element changes. It can be thus said that the light-emitting element is driven by constant voltage drive, that is, the light-emitting element is driven by a voltage source which is connected to the wiring 104. As a result, the influence of the deterioration of the light-emitting element is likely to be increased. However, a large current flows and the light-emitting element can have high luminance. Even if display unevenness or image burn-in occurs when display of images are performed, they are not a big problem in the case where the light-emitting device is simply used as a light source. In order to perform the lighting function, operation in this operation region (linear region) is preferable while current flows.

In order to perform the display function, the transistor 108 preferably operates in the saturation region while current flows and operates as a current source to drive the light-emitting element 106A by the constant current drive. In order to perform the lighting function, the transistor 108 preferably operates in the linear region while current flows and driven as a switch to drive the light-emitting element 106A by the constant voltage drive. Note that one aspect of one embodiment of the present invention is not limited to these.

The luminance in performing the lighting function is preferably 1.5 times or more, more preferably 2 times or more the luminance at the time of displaying with the highest grayscale by the display function. Alternatively, the absolute value |VGS| of the gate-source voltage of the transistor 108 for the lighting function is preferably 1.5 times or more, more preferably 2 times or more the absolute value |VGS| of the gate-source voltage of the transistor 108 at the time of displaying with the highest grayscale by the display function. Alternatively, the current value of the light-emitting element 106A for the lighting function is preferably 1.5 times or more, more preferably 2 times or more a current value at the time of displaying with the highest grayscale by the display function. Alternatively, the absolute value |VGS| of the gate-source voltage of the transistor 108 for the lighting function is preferably 0.6 times or more, more preferably 1 time or more a voltage between the wirings 104 and 122. Alternatively, the absolute value |VGS| of the gate-source voltage of the transistor 108 for the lighting function is preferably 2 times or less, more preferably 1.5 times or less a voltage between the wirings 104 and 122. Note that one aspect of one embodiment of the present invention is not limited to these.

Note that the wirings 124 and 122 may be connected to each other in order to obtain a large luminance when the lighting function is performed. In FIGS. 3A and 3B, the wirings 124 and 122 are combined together to be one wiring.

FIGS. 1A to 1D and the like show an example including the P-channel transistor 108, but one embodiment of the present invention is not limited to this. When the transistor 108 is an N-channel transistor, the transistor 108 can operate in the above-described manner by reversing the potential levels of the wirings 104, 122, 124, and the like and by reversing the light-emitting element 106A as shown in FIGS. 3C and 3D.

Note that in performing the lighting function, the switch 118 may be on while current flows in the transistor 108 (see FIG. 1B), so that the potential of the gate of the transistor 108 becomes stable. Note that one embodiment of the present invention is not limited to this. After the state in FIG. 1B, the switch 118 may be turned off (see FIG. 1A). Here, the voltage is held by the capacitor 110, and thus the transistor 108 can supply an appropriate current. Note that the parasitic capacitance of the transistor 108 may be utilized to omit the capacitor 110 (see FIG. 1C). Furthermore, one terminal of the capacitor 110 may be electrically connected to the gate of the transistor 108 and the other terminal may be in a floating state (see FIG. 1D). Also in this case, the transistor 108 can supply an appropriate current because the switch 118 is on.

The transistor 108 and the capacitor 110 are connected to the wiring 104 in FIGS. 1A, 1B, and 1C, but one aspect of one embodiment of the present invention is not limited to this. As shown in FIGS. 4A and 4B, the transistor 108 and the capacitor 110 may be connected to a wiring 104A and a wiring 104B, respectively.

This embodiment shows an example of operation by switching the display function and the lighting function, but one aspect of one embodiment of the present invention is not limited to this. Only one of the display function and the lighting function may be performed depending on the situation.

This embodiment shows an example of a basic principle. Thus, part or the whole of this embodiment can be freely combined with, applied to, or replaced with part or the whole of another embodiment.

Embodiment 2

In this embodiment, a specific example of a light-emitting device of one embodiment of the present invention and a driving method thereof will be described.

FIG. 5 shows a specific example of a circuit including the circuit shown in FIG. 1A. FIG. 5 corresponds to one pixel. The wiring 102 is connected to the gate of the transistor 108 through a switch 312.

The wiring 102 has a function of supplying or transmitting a video signal. A precharge signal or an initialization signal may be supplied to the wiring 102. The wiring 102 may have a function of supplying or transmitting a signal to the switch 312. The wiring 102 thus serves as at least one of a video signal wiring, a source signal wiring, an initialization signal wiring, and the like.

The wiring 104 has a function of supplying or transmitting voltage or current to the transistor 108. The wiring 104 may have a function of supplying or transmitting voltage or current to the load 106. The wiring 104 may have a function of supplying or transmitting a reverse bias voltage to the load 106. The wiring 104 may have a function of supplying or transmitting voltage or current to the capacitor 110. The wiring 104 thus serves as at least one of a current supply wiring, a power source wiring, a capacitor wiring, and the like. Although the potential of the wiring 104 is preferably constant, one aspect of an embodiment of the present invention is not limited to this and a pulse signal may be supplied.

The wiring 124 has a function of supplying or transmitting voltage to the gate of the transistor 108. The wiring 124 may have a function of supplying or transmitting a potential for controlling the operation region of the transistor 108. The wiring 124 may have a function of supplying or transmitting a potential for initializing the transistor 108. The wiring 124 may have a function of supplying or transmitting a potential for turning on the transistor 108. The wiring 124 may have a function of supplying or transmitting a potential for performing the lighting function. The wiring 124 may have a function of supplying or transmitting voltage or current to the capacitor 110. The wiring 124 may have a function of supplying or transmitting voltage or current to the switch 118. The wiring 124 thus serves as at least one of a power source wiring, an initialization wiring, a wiring for controlling the lighting function, a wiring for controlling an operation region, and the like. Although the potential of the wiring 124 is preferably constant, one aspect of an embodiment of the present invention is not limited to this and a pulse signal is supplied in some cases.

The transistor 108 has a function of controlling the amount of current flowing into the load 106. The transistor 108 thus serves as at least one of a driver transistor, a current control transistor, and the like.

The switch 312 has a function of controlling the conduction between the wiring 102 and the transistor 108. The switch 312 may have a function of selecting a pixel and controlling the supply of a video signal to a pixel. The switch 312 thus serves as at least one of a selection switch, a switching switch, and the like.

The switch 118 has a function of controlling the conduction between the wiring 124 and the gate of the transistor 108. The switch 118 may have a function of determining whether to perform the lighting function. The switch 118 may have a function of controlling the supply of a potential for driving the transistor 108 in a linear region to a pixel. The switch 118 may have a function of determining whether to initialize the transistor 108. The switch 118 may have a function of controlling the conduction of the transistor 108. The switch 118 may have a function of determining whether to perform the lighting function. The switch 118 may have a function of controlling the voltage supply to the gate of the transistor 108. The switch 118 thus serves as at least one of a control switch, an operation control switch, a function changing switch, an initialization switch, and the like.

Figure 6:
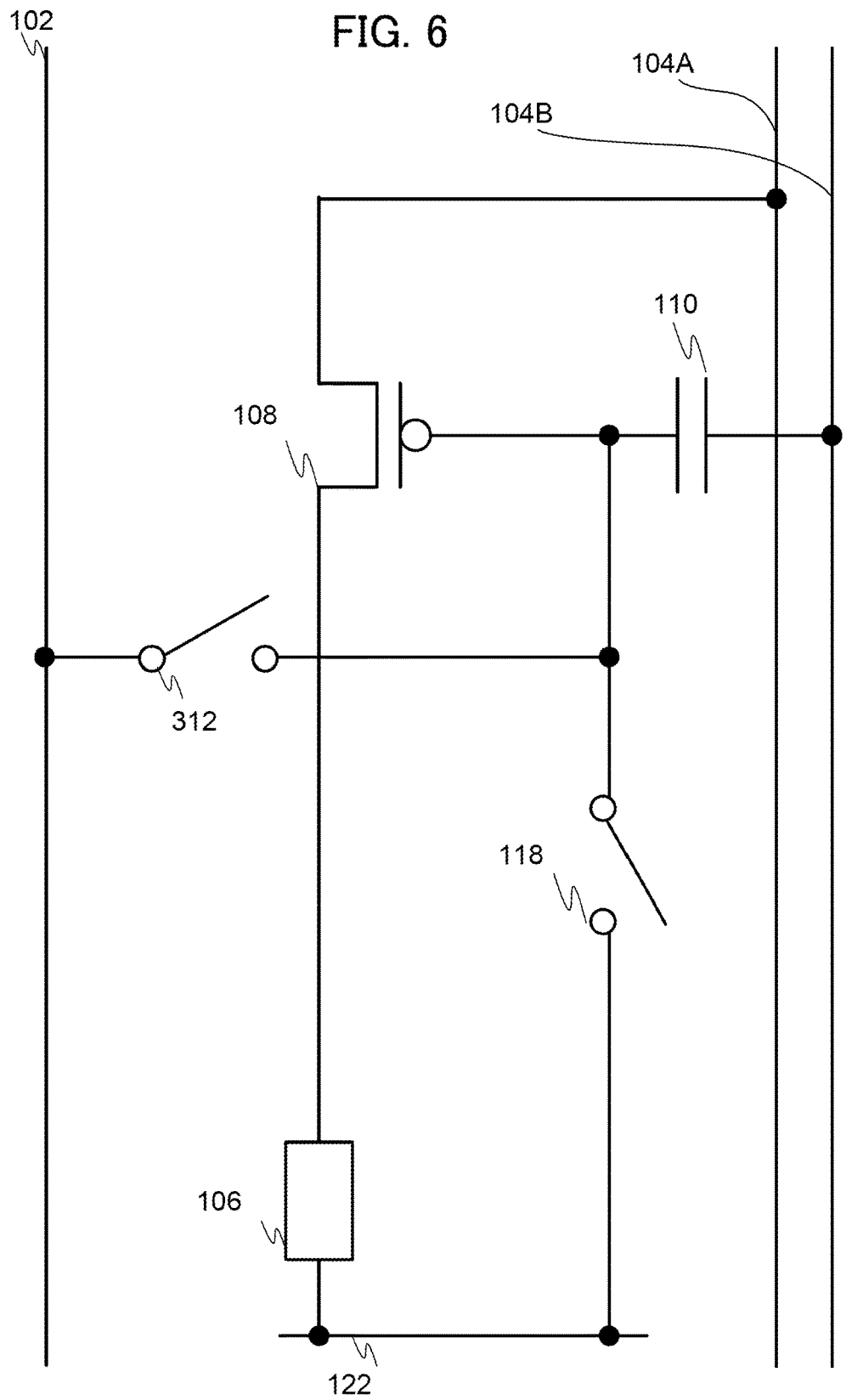
FIG. 6 illustrates a circuit configuration of a light-emitting device of one embodiment of the present invention.

Note that similarly to FIGS. 4A and 4B, the wiring 104 may be divided into a wiring 104A and a wiring 104B as shown in FIG. 6.

The wiring 104A has a function of supplying or transmitting voltage or current to the transistor 108. The wiring 104A may have a function of supplying or transmitting voltage or current to the load 106. The wiring 104A may have a function of supplying or transmitting a reverse bias voltage to the load 106. The wiring 104B may have a function of supplying or transmitting voltage or current to the capacitor 110. The wiring 104A thus serves as at least one of a current supply wiring, a power source wiring, and the like. The wiring 104B thus serves as at least one of a capacitor wiring, a power source wiring, and the like. Although the potentials of the wirings 104A and 104B are preferably constant, a pulse signal may be supplied without limitation thereto. The gate potential of the transistor 108 can be controlled with capacitive coupling by changing the potential of the wiring 104B.

Similarly to FIGS. 3A and 3B, the wiring 124 may be connected to the wiring 122 as shown in FIG. 6.

Figure 7A:
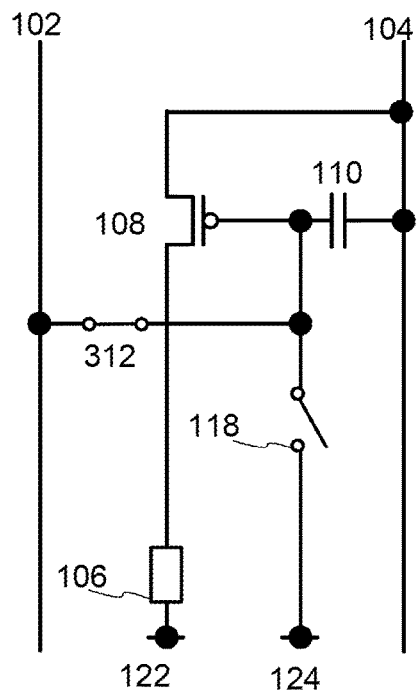
FIGS. 7A to 7C illustrate a method for driving a light-emitting device of one embodiment of the present invention.
Figure 7B:
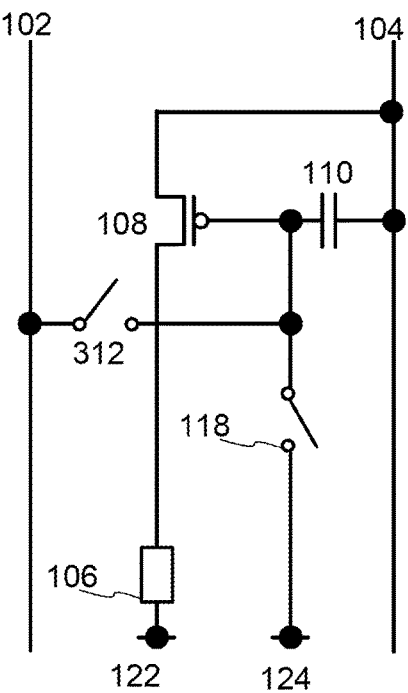

Driving methods will be described. First, a driving method in the first operation mode will be described. The driving method here is used when the display function is performed. As shown in FIG. 7A, a pixel is selected, the switch 312 is turned on, and a voltage based on a video signal is then supplied to the capacitor 110 through the wiring 102. Then, as shown in FIG. 7B, the pixel is not selected, the switch 312 is turned off, and the video signal is held in the capacitor 110. Current is supplied to the load 106 through the transistor 108. The amount of current depends on the size of the video signal.

Figure 7C:
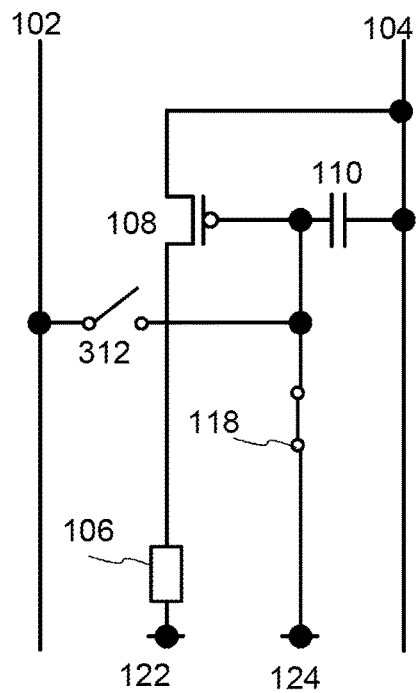

Next, a driving method in the second operation mode will be described. The driving method here is used when the lighting function is performed. As shown in FIG. 7C, the switch 118 is turned on and the potential of the wiring 124 is supplied to the transistor 108. Because the absolute value of the gate-source voltage of the transistor 108 is large, a large current flows into the load 106. Note that the switch 118 may be then turned off as shown in FIG. 7B. In this case, the potential of the wiring 124 is held in the capacitor 110 and current based on the potential is supplied from the transistor 108 to the load 106.

Figure 8:
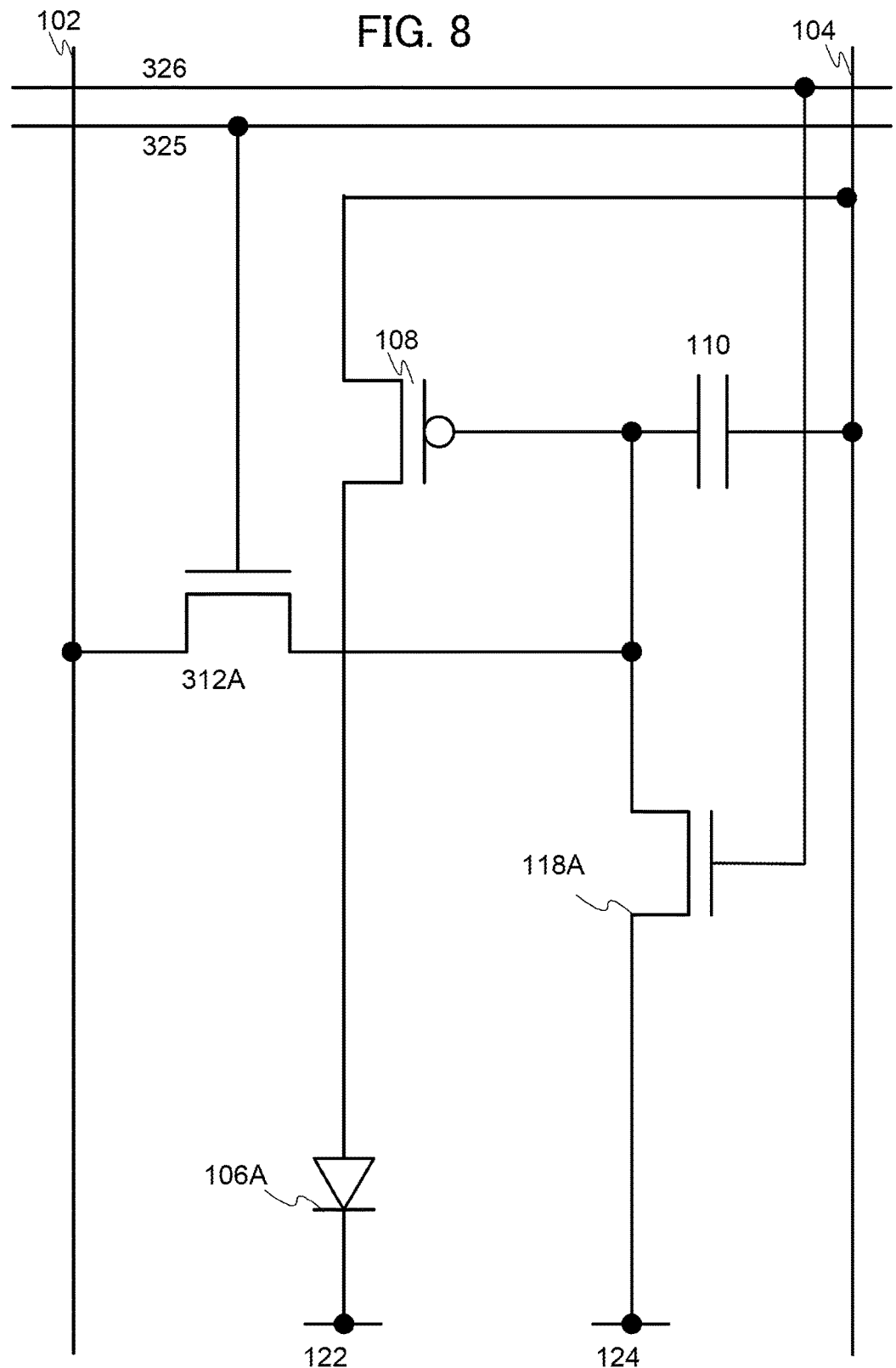
FIG. 8 illustrates a circuit configuration of a light-emitting device of one embodiment of the present invention.

FIG. 8 shows a circuit example in which a transistor is used as the switch in FIG. 5.

A variety of modes can be used as the switch in this specification and the like. The switch has a function of controlling the current supply by switching on/off states, that is, the switch is turned on to supply current and is turned off to stop the supply of current. The switch may have a function of choosing a current path and changing to the path. For example, the switch chooses path 1 or path 2 and changing to the path. An electrical switch, a mechanical switch, or the like can be used as a switch. That is, any element can be used as a switch as long as it can control current, without limitation to a certain element. For example, a transistor (e.g., a bipolar transistor or a MOS transistor), a diode (e.g., a PN diode, a PIN diode, a Schottky diode, an MIM (metal insulator metal) diode, an MIS (metal insulator semiconductor) diode, or a diode-connected transistor), a logic circuit in which such elements are combined, or the like can be used as a switch. An example of a mechanical switch is a switch formed using a MEMS (micro electro mechanical system) technology, such as a digital micromirror device (DMD), including an electrode which moves mechanically, and conduction and non-conduction is switched in accordance with movement of the electrode.

In the case where a transistor is used as a switch, the polarity (conductivity type) of the transistor is not particularly limited to a certain type because it operates just as a switch. However, a transistor of polarity with smaller off-current is preferably used when off-current is to be suppressed. Examples of a transistor with smaller off-state current are a transistor provided with an LDD region, a transistor with a multi-gate structure, and the like.

Note that in the case of using a transistor as a switch, an n-channel transistor is preferably used as the switch when a potential of a source of the transistor which operates as the switch is close to a potential of a low-potential-side power supply (e.g., Vss, GND, or 0 V). On the other hand, a p-channel transistor is preferably used as the switch when the potential of the source is close to a potential of a high-potential-side power supply (e.g., Vdd). This is because the absolute value of the gate-source voltage can be increased when the potential of a source of the n-channel transistor is close to the potential of a low-potential-side power supply and when the potential of a source of the p-channel transistor is close to the potential of a high-potential-side power supply, so that the transistor can more accurately operate as a switch. This is also because the transistor does not often perform source follower operation, so that the decrease in output voltage does not often occur.

Note that a CMOS switch may be used as a switch with the use of both an n-channel transistor and a p-channel transistor. By using a CMOS switch, the switch can more accurately operate as a switch because current can flow when either the p-channel transistor or the n-channel transistor is turned on. Therefore, voltage can be appropriately output regardless of whether voltage of a signal input to the switch is high or low. Furthermore, the voltage amplitude value of a signal for changing the switch can be made small, and power consumption can be reduced.

Note that when a transistor is used as a switch, the switch includes an input terminal (one of a source and a drain), an output terminal (the other of the source and the drain), and a terminal for controlling conduction (a gate) in some cases. When a diode is used as a switch, the switch does not have a terminal for controlling conduction in some cases. Thus, when a diode is used as a switch, the number of wirings for controlling terminals can be reduced as compared to the case where a transistor is used.

FIG. 8 shows an example in which an N-channel transistor is used as the switch. Note that one aspect of one embodiment of the present invention is not limited to the example. A transistor 312A and a transistor 118A are used as the switch 312 and the switch 118, respectively. A wiring 325 and a wiring 326 are connected to a gate of the transistor 312A and a gate of the transistor 118A, respectively.

The transistor 312A has a function of controlling the conduction between the wiring 102 and the gate of the transistor 108. The transistor 312A may have a function of selecting a pixel and controlling the supply of a video signal to a pixel. The transistor 312A thus serves as at least one of a selection transistor, a switching transistor, and the like.

The wiring 325 has a function of supplying or transmitting a signal for controlling the conduction between the wiring 102 and the gate of the transistor 108. The wiring 325 may have a function of supplying or transmitting a signal for selecting a pixel. The wiring 325 may have a function of supplying or transmitting a signal for controlling the supply of a video signal to a pixel. The wiring 325 thus serves as at least one of a selection wiring, a selection gate wiring, a switching wiring, a switching gate wiring, and the like.

The transistor 118A has a function of controlling the conduction between the wiring 124 and the gate of the transistor 108. The transistor 118A may have a function of determining whether to perform the lighting function. The transistor 118A may have a function of controlling the supply of a potential for driving the transistor 108 in a linear region to a pixel. The transistor 118A may have a function of determining whether to initialize the transistor 108. The transistor 118A may have a function of determining whether to perform the lighting function. The transistor 118A may have a function of controlling the voltage supply to the gate of the transistor 108. The transistor 118A thus serves as at least one of a control transistor, an operation control transistor, a function changing transistor, an initialization transistor, and the like.

The wiring 326 has a function of supplying or transmitting a signal for controlling the conduction between the wiring 124 and the gate of the transistor 108. The wiring 326 may have a function of supplying or transmitting a signal for determining whether to perform the lighting function. The wiring 326 may have a function of supplying or transmitting a signal for controlling the supply of a potential for driving the transistor 108 in a linear region to a pixel. The wiring 326 may have a function of supplying or transmitting a signal for determining whether to initialize the transistor 108. The wiring 326 may have a function of supplying or transmitting a signal for determining whether to perform the lighting function. The wiring 326 may have a function of supplying or transmitting a signal for controlling the voltage supply to the gate of the transistor 108. The wiring 326 thus serves as at least one of a control wiring, a control gate wiring, an operation control wiring, an operation control gate wiring, a function changing wiring, a function changing gate wiring, an initialization wiring, an initialization gate wiring, and the like.

Figure 9:
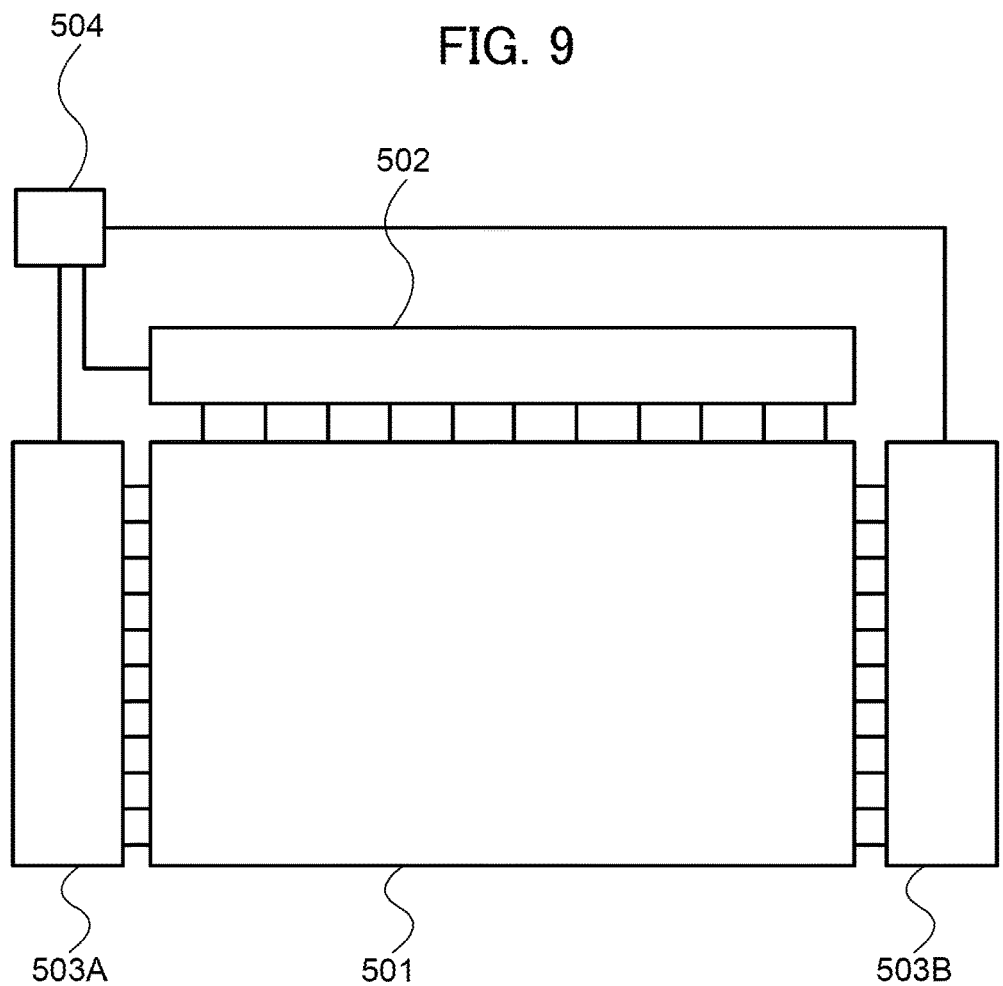
FIG. 9 is a block diagram of a light-emitting device of one embodiment of the present invention.

FIG. 8 is a circuit diagram of one pixel. FIG. 9 is a block diagram of the whole light-emitting device. A plurality of pixels are arranged in matrix in the pixel portion 501. For example, the pixels shown in FIG. 8 are arranged in matrix. Driver circuits are provided around the pixel portion 501. A gate line driver circuit 503A and a gate line driver circuit 503B are provided, for example. Note that the number of gate line driver circuits may be just one or three or more. In FIG. 8, one of the wirings 325 and 326 is connected to the gate line driver circuit 503A, and the other is connected to the gate line driver circuit 503B. Alternatively, the wiring 326 is connected to all pixels and is not connected to a gate line driver circuit. In that case, the wiring 326 is connected to a circuit having a function of outputting a pulse signal, for example. In FIG. 9, a video line driver circuit 502 is provided over the pixel portion 501, for example. In FIG. 8, the wiring 102 is connected to the video line driver circuit 502.

Figure 10A:
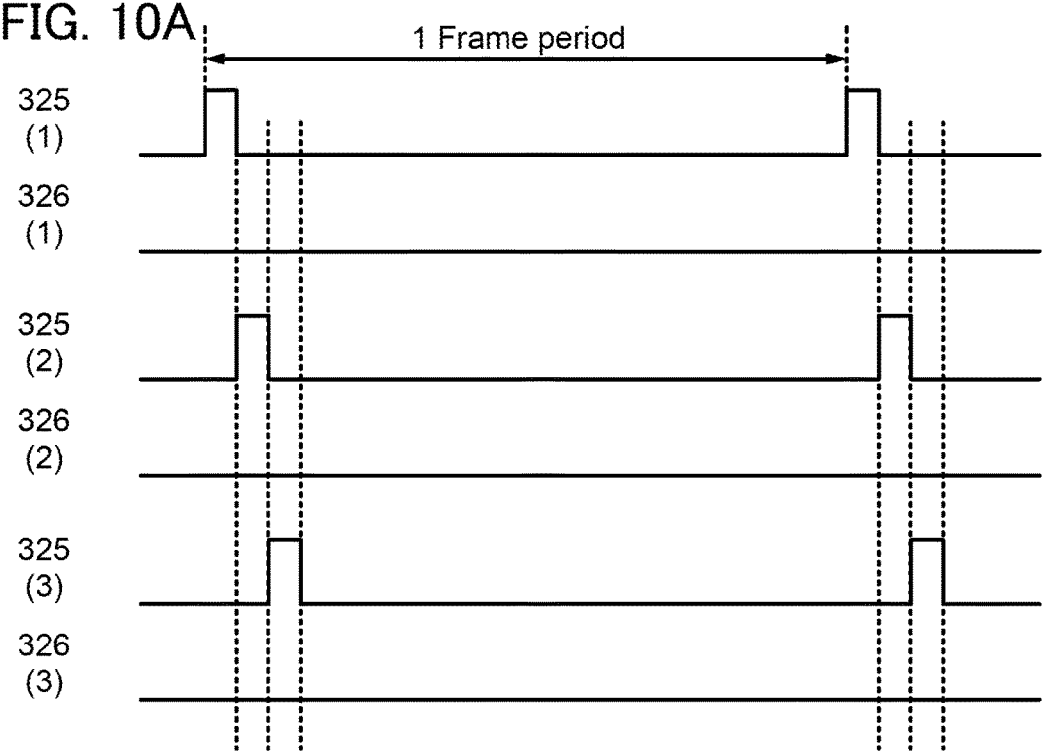
FIGS. 10A and 10B are timing charts of a light-emitting device of one embodiment of the present invention.

Next, a timing chart of the wirings 325 and 326 in each row in the first operation mode will be described. The timing chart is used when the display function is performed. Note that the timing chart shows only the first to third rows for simplicity. As shown in FIG. 10A, a wiring 325(1) in the first row, a wiring 325(2) in the second row, and a wiring 325(3) in the third row are selected row by row, that is, selecting signals are input to the wirings row by row, whereas a wiring 326(1) in the first row, a wiring 326(2) in the second row, and a wiring 326(3) in the third row are not selected and in a non-selected state.

Figure 10B:
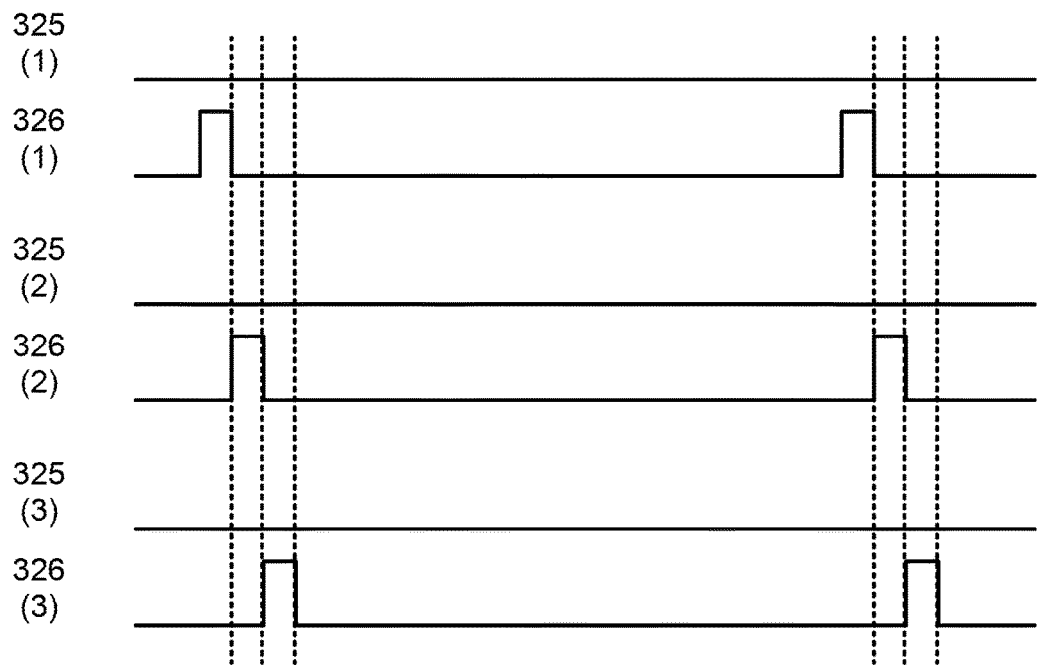

A timing chart in the second operation mode will be described. The timing chart is used when the lighting function is performed. As shown in FIG. 10B, the wiring 326(1) in the first row, the wiring 326(2) in the second row, and the wiring 326(3) in the third row are selected row by row, that is, selecting signals are input to the wirings row by row, whereas the wiring 325(1) in the first row, the wiring 325(2) in the second row, and the wiring 325(3) in the third row are not selected and in the non-selected state.

In this manner, the display function and the lighting function are switched and operated.

Note that the wirings 326 are not necessarily scanned row by row because display of image is not needed when the lighting function is performed. The wirings 326 in all rows may be therefore selected at the same time. Alternatively, scanning the wirings 326 is not necessary soon after scanning the wirings 326 once. FIGS. 11A and 11B are timing charts in the second operation mode in such cases. FIG. 11A is a timing chart of the case where the wirings 326 are not scanned immediately after scanning the wiring 326 once in the second operation mode. FIG. 11B is a timing chart of in the case where the wirings 326 in all rows are selected at the same time in the second operation mode. As shown in FIG. 11B, in the second operation mode, wirings 326 in all rows may be connected to one another because the wirings 326 are not necessarily scanned row by row in this case.

Although the wirings 326 in all rows remain in the selected state in FIG. 11B, the wirings 326 in all rows may be selected in every frame period as shown in FIG. 12A or may be selected only once as in FIG. 12B. Rewriting of signal is not needed in the case of performing the lighting function because displaying of image is not needed. Thus, it is possible that the wirings 326 in all rows are selected once and after that, is not selected any more. Note that in the case where the signal in each pixel is rewritten to perform the display function and then the lighting function is performed again, the wirings 326 need to be selected again.

Figure 13:
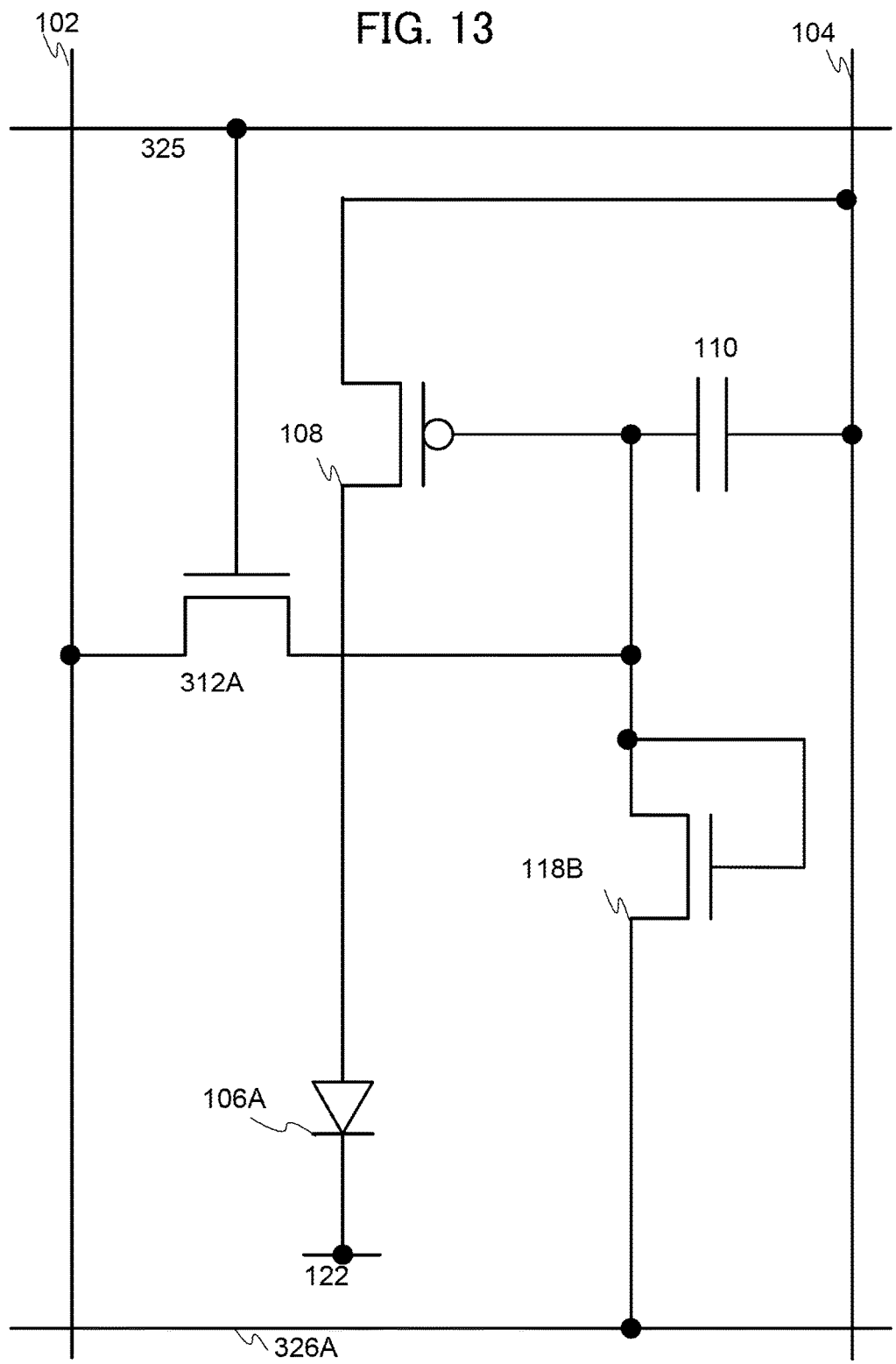
FIG. 13 illustrates a circuit configuration of a light-emitting device of one embodiment of the present invention.

Although the transistor 118A is used as a switch in FIG. 8, one aspect of one embodiment of the present invention is not limited to this example. A diode may be used as the switch 118, for example, a diode-connected transistor 118B and a wiring 326A may be used as shown in FIG. 13. The wiring 326A can be driven as the wiring 326.

Figure 14:
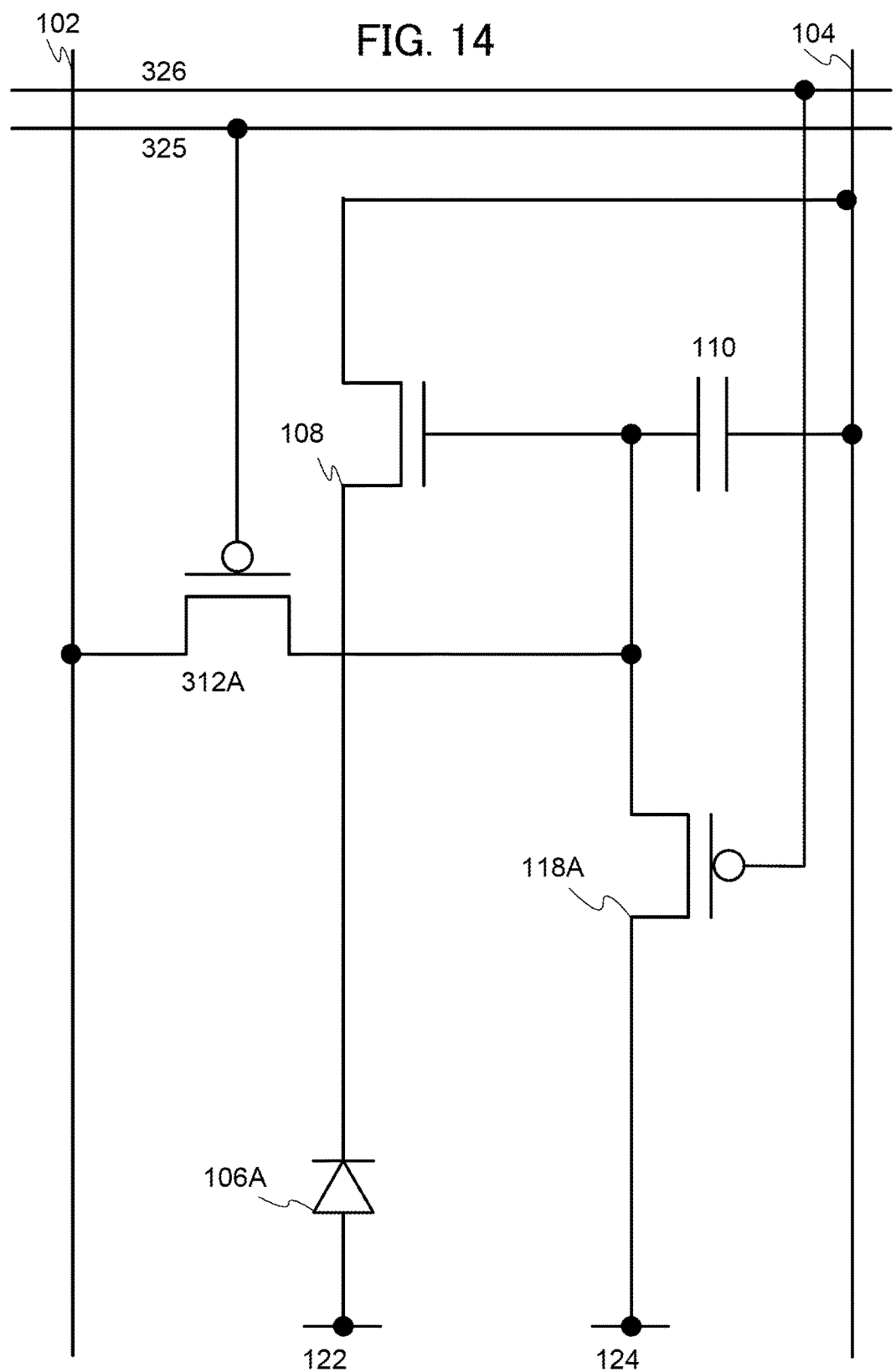
FIG. 14 illustrates a circuit configuration of a light-emitting device of one embodiment of the present invention.

FIG. 8 shows an example including the P-channel transistor 108, but one embodiment of the present invention is not limited to this. When the transistor 108 is an N-channel transistor, the transistor 108 can operate in the above-described manner by reversing the potential levels of the wirings and by reversing the light-emitting element 106A as shown in FIGS. 3C and 3D. FIG. 14 is a circuit example in that case.

This embodiment is obtained by performing change, addition, modification, removal, application, superordinate conceptualization, or subordinate conceptualization on part or the whole of another embodiment. Thus, part of or the whole of this embodiment can be freely combined with, applied to, or replaced with part of or the whole of another embodiment.

Embodiment 3

In this embodiment, another specific example of a light-emitting device of one embodiment of the present invention and a driving method thereof will be described.

Figure 15:
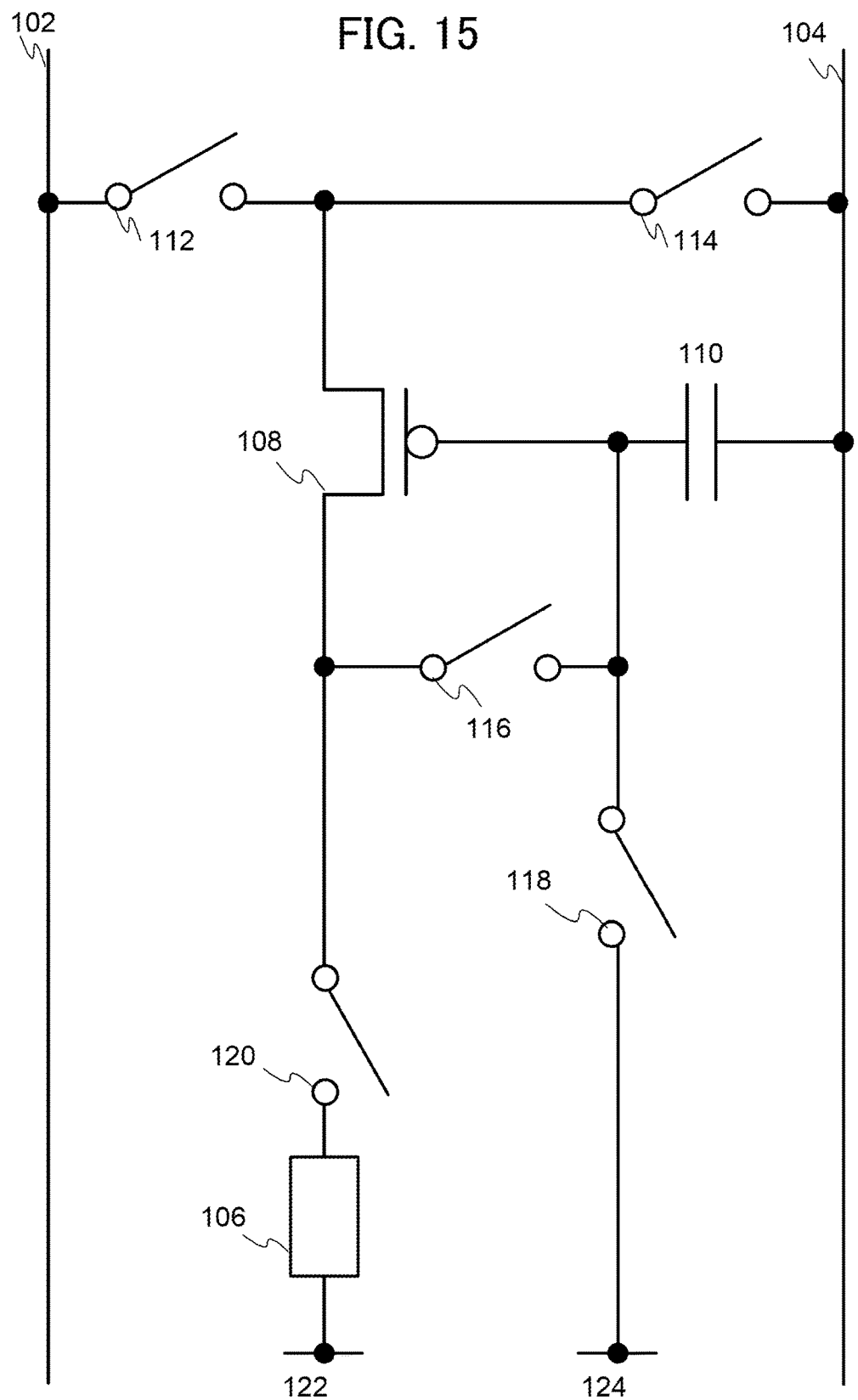
FIG. 15 illustrates a circuit configuration of a light-emitting device of one embodiment of the present invention.

FIG. 15 shows a specific example of a circuit including the circuit shown in FIG. 1A. FIG. 15 corresponds to one pixel. The wiring 102 is connected to the source of the transistor 108 through a switch 112. The switch 114 is connected between the source of the transistor 108 and the wiring 104. The switch 116 is connected between the gate and the drain of the transistor 108. The switch 120 is connected between the drain of the transistor 108 and the load 106.

The wiring 102 has a function of supplying or transmitting a video signal. A precharge signal or an initialization signal may be supplied to the wiring 102. The wiring 102 may have a function of supplying or transmitting a signal to the switch 112. The wiring 102 thus serves as at least one of a video signal wiring, a source signal wiring, an initialization signal wiring, and the like.

The wiring 104 has a function of supplying or transmitting voltage or current to the transistor 108. The wiring 104 may have a function of supplying or transmitting voltage or current to the load 106. The wiring 104 may have a function of supplying or transmitting a reverse bias voltage to the load 106. The wiring 104 may have a function of supplying or transmitting voltage or current to the switch 114. The wiring 104 may have a function of supplying or transmitting voltage or current to the capacitor 110. The wiring 104 thus serves as at least one of a current supply wiring, a power source wiring, a capacitor wiring, and the like. Although the potential of the wiring 104 is preferably constant, one aspect of an embodiment of the present invention is not limited to this and a pulse signal may be supplied to the wiring 104.

The wiring 124 has a function of supplying or transmitting voltage to the gate of the transistor 108. The wiring 124 may have a function of supplying or transmitting a potential for controlling the operation region of the transistor 108. The wiring 124 may have a function of supplying or transmitting a potential for initializing the transistor 108. The wiring 124 may have a function of supplying or transmitting a potential for turning on the transistor 108. The wiring 124 may have a function of supplying or transmitting a potential for performing the lighting function. The wiring 124 may have a function of supplying or transmitting voltage or current to the capacitor 110. The wiring 124 may have a function of supplying or transmitting voltage or current to the switch 118. The wiring 124 thus serves as at least one of a power source wiring, an initialization wiring, a wiring for controlling the lighting function, a wiring for controlling the operation region, and the like. Although the potential of the wiring 124 is preferably constant, a pulse signal may be supplied without limitation thereto.

The transistor 108 has a function of controlling the amount of current flowing into the load 106. The transistor 108 thus serves as at least one of a driver transistor, a current control transistor, and the like.

The switch 112 has a function of controlling the conduction between the wiring 102 and the source of the transistor 108. The switch 112 may have a function of selecting a pixel and controlling the supply of a video signal to a pixel. The switch 112 thus serves as at least one of a selection switch, a switching switch, and the like.

The switch 118 has a function of controlling the conduction between the wiring 124 and the gate of the transistor 108. The switch 118 may have a function of determining whether to perform the lighting function. The switch 118 may have a function of controlling the supply of a potential for operating the transistor 108 in a linear region to a pixel. The switch 118 may have a function of determining whether to initialize the transistor 108. The switch 118 may have a function of controlling the conduction of the transistor 108. The switch 118 may have a function of determining whether to perform the lighting function. The switch 118 may have a function of controlling the supply of voltage to the gate of the transistor 108. The switch 118 may have a function of determining whether to bring the terminal of the capacitor 110 into a floating state. The switch 118 thus serves as at least one of a control switch, an operation control switch, a function changing switch, an initialization switch, and the like.

The switch 120 has a function of controlling the conduction between the load 106 and a drain of the transistor 108. The switch 120 may have a function of controlling the supply of current to the load 106. The switch 120 thus serves as at least one of a control switch, an emission control switch, and the like.

The switch 114 has a function of controlling the conduction between the wiring 104 and the source of the transistor 108. The switch 114 may have a function of controlling the supply of current to the load 106. The switch 114 thus serves as at least one of a control switch, an emission control switch, and the like.

The switch 116 has a function of controlling the conduction between the gate of the transistor 108 and the drain of the transistor 108. The switch 116 may have a function of controlling the conduction between the terminal of the capacitor 110 and the drain of the transistor 108. The switch 116 may have a function of determining whether to bring the terminal of the capacitor 110 into a floating state. The switch 116 may have a function of controlling the operation for obtaining the threshold voltage of the transistor 108. The switch 116 thus serves as at least one of a control switch, a switch for obtaining a threshold voltage, a capacitor control switch, and the like.

Note that similarly to FIGS. 4A and 4B, the wiring 104 may be divided into a wiring 104A and a wiring 104B as shown in FIG. 16.

The wiring 104A has a function of supplying or transmitting voltage or current to the transistor 108. The wiring 104A may have a function of supplying or transmitting voltage or current to the load 106. The wiring 104A may have a function of supplying or transmitting voltage or current to the switch 114. The wiring 104A may have a function of supplying or transmitting a reverse bias voltage to the load 106. The wiring 104B may have a function of supplying or transmitting voltage or current to the capacitor 110. The wiring 104A thus serves as at least one of a current supply wiring, a power source wiring, and the like. The wiring 104B thus serves as at least one of a capacitor wiring, a power source wiring, and the like. Although the potentials of the wirings 104A and 104B are preferably constant, a pulse signal may be supplied without limitation thereto. The gate potential of the transistor 108 can be controlled with capacitive coupling by changing the potential of the wiring 104B.

Similarly to FIGS. 3A and 3B, the wiring 124 may be connected to the wiring 122 as shown in FIG. 16.

Figure 17A:
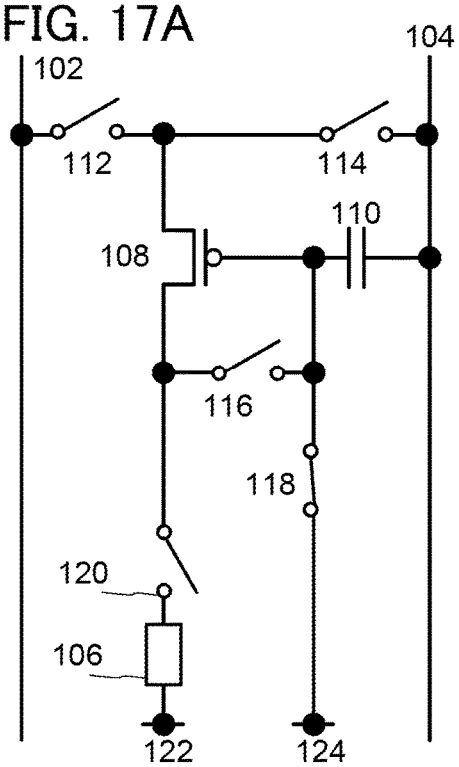
FIGS. 17A to 17D illustrate a method for driving a light-emitting device of one embodiment of the present invention.
Figure 17B:
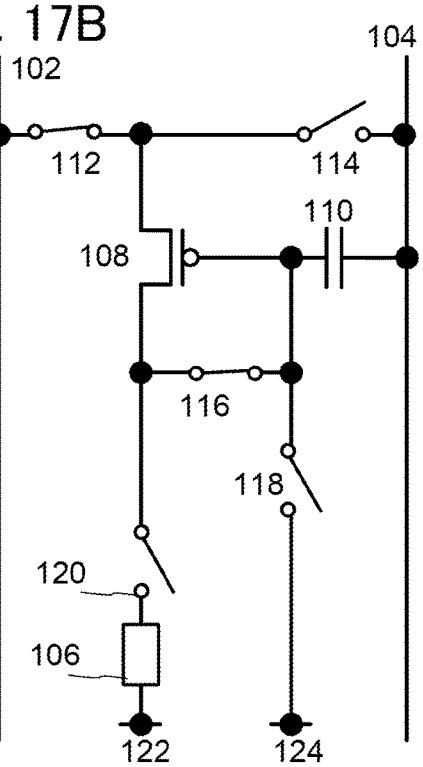
Figure 17C:
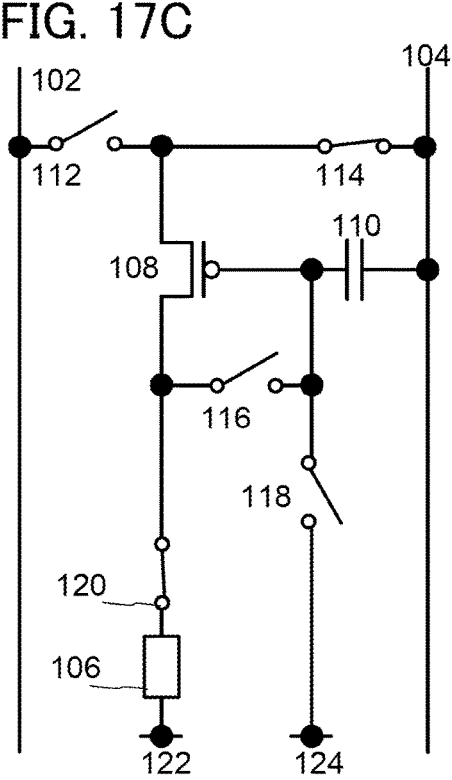

Driving methods will be described. First, a driving method in the first operation mode will be described. The driving method here is used when the display function is performed. First, the switch 118 is turned on and the transistor 108 is initialized as shown in FIG. 17A. The potential of the wiring 124 is thus input to the gate of the transistor 108 and the capacitor 110. As a result, the transistor 108 is turned on. This operation is initialization for obtaining the threshold voltage of the transistor 108. Then, as shown in FIG. 17B, the pixel is selected, the switch 112 is turned on, and the video signal is supplied from the wiring 102 to the source of the transistor 108. Because the switch 116 is on and the switch 118 is off, the electric charge in the capacitor 110 is discharged through the transistor 108. When the discharge is stopped or the amount of discharge is reduced, that is, the transistor 108 is off or almost off, the threshold voltage of the transistor 108 is obtained. In this state, the gate-source voltage of the transistor 108 has a value close to the threshold voltage of the transistor 108. Then, as shown in FIG. 17C, the pixel is not selected, the switch 112 and the switch 116 are turned off, and the voltage based on the video signal and the like is held in the capacitor 110. Because the switch 112 is turned off and the switch 114 is turned on, a portion to which the source of the transistor 108 is connected is changed from the wiring 102 to the wiring 104. Therefore, the potential of the source of the transistor 108 is changed. On the other hand, since the potential of the gate of the transistor 108 is held in the capacitor 110, the potential of the gate of the transistor 108 is not changed. As a result, the gate-source voltage of the transistor 108 is changed to have a value of the sum of the voltage of the video signal and the threshold voltage of the transistor 108. Because the switch 114 and the switch 120 are turned on, current is supplied to the load 106 through the transistor 108. The amount of current depends on the size of the video signal. The current value at this time is one such that variation in the threshold voltage of the transistor 108 is small.

Figure 17D:
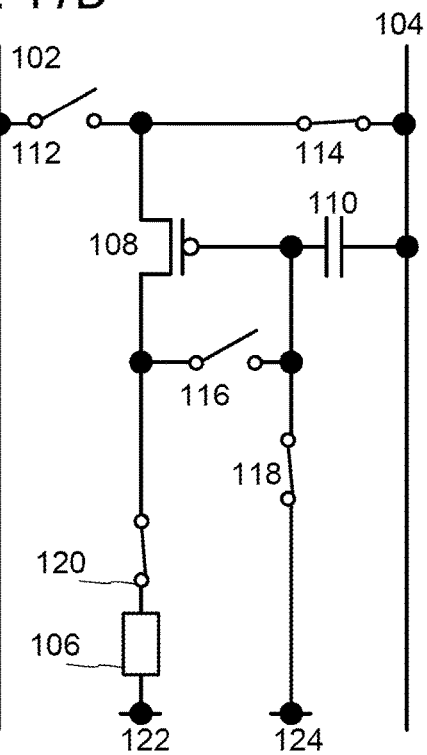

Next, a driving method in the second operation mode will be described. The driving method here is used when the lighting function is performed. As shown in FIG. 17D, the switch 118 is turned on and the potential of the wiring 124 is supplied to the transistor 108. Because the absolute value of the gate-source voltage of the transistor 108 is large, a large current flows into the load 106. Note that the switch 118 may be then turned off as shown in FIG. 17C. In this case, the potential of the wiring 124 is held in the capacitor 110 and current based on the potential is supplied from the transistor 108 to the load 106.

Figure 18:
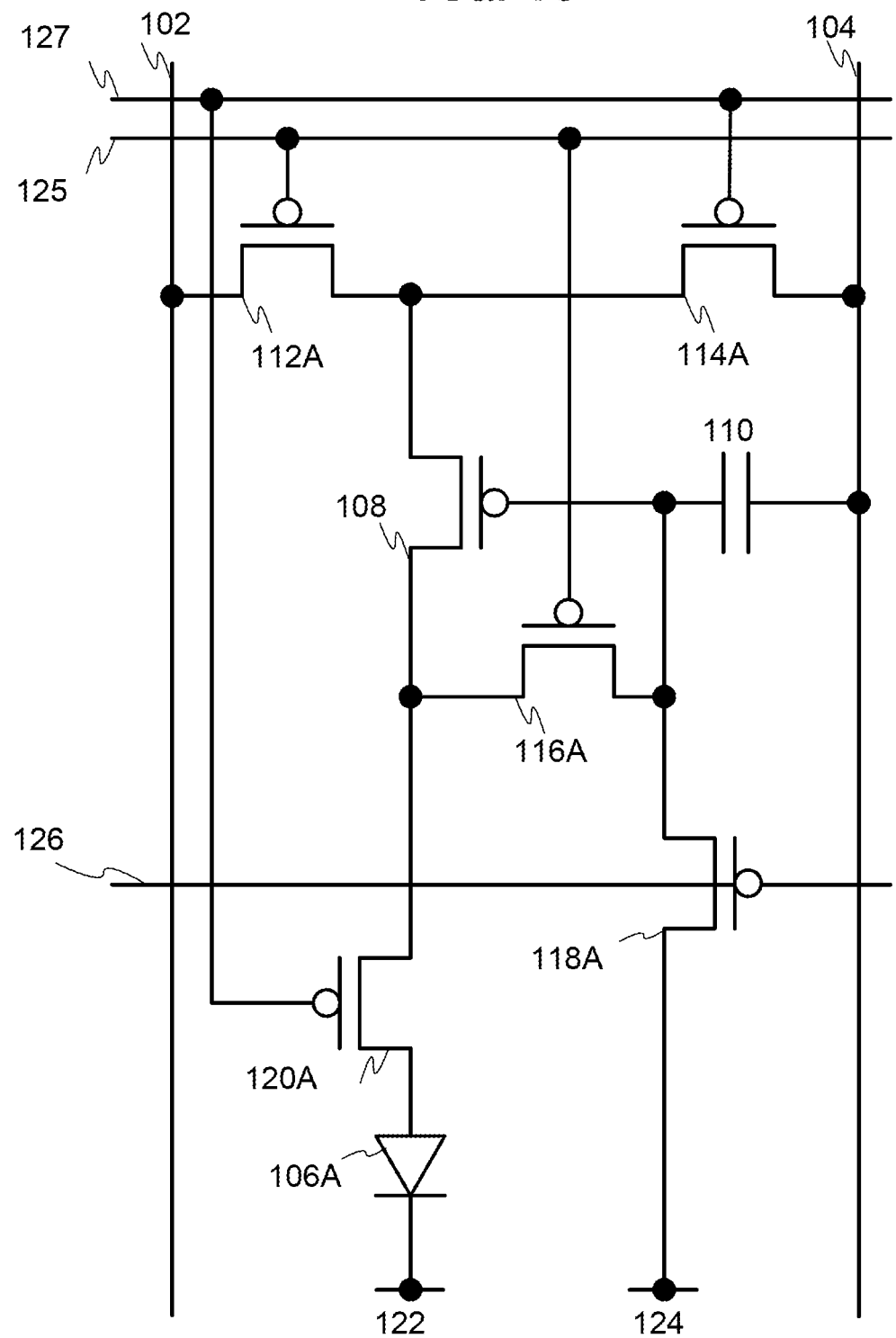
FIG. 18 illustrates a circuit configuration of a light-emitting device of one embodiment of the present invention.

FIG. 18 shows a circuit example in which a transistor is used as the switch in FIG. 15.

FIG. 18 shows an example in which an P-channel transistor is used as the switch. Note that one aspect of one embodiment of the present invention is not limited to this example, and some of or all the switches may be an N-channel transistor. A transistor 112A, a transistor 118A, a transistor 114A, a transistor 116A, and a transistor 120A are used as the switch 112, the switch 118, the switch 114, the switch 116, and the switch 120, respectively. A wiring 125 is connected to a gate of the transistor 112A and the gate of the transistor 116A. A wiring 126 is connected to the gate of the transistor 118A. A wiring 127 is connected to a gate of the transistor 114A and a gate of the transistor 120A.

Although the gate of the transistor 112A and the gate of the transistor 116A are connected to the same wiring, one aspect of one embodiment of the present invention is not limited to this and they may be connected to different wirings. Note that the gate of the transistor 114A and the gate of the transistor 120A are connected to the same wiring, but one embodiment of the present invention is not limited to this and they may be connected to different wirings.

The wiring 102 has a function of supplying or transmitting a video signal. A precharge signal or an initialization signal may be supplied to the wiring 102. The wiring 102 may have a function of supplying or transmitting a signal to the transistor 112A. The wiring 102 thus serves as at least one of a video signal wiring, a source signal wiring, an initialization signal wiring, and the like.

The wiring 104 has a function of supplying or transmitting voltage or current to the transistor 108. The wiring 104 may have a function of supplying or transmitting voltage or current to the light-emitting element 106A. The wiring 104 may have a function of supplying or transmitting a reverse bias voltage to the light-emitting element 106A. The wiring 104 may have a function of supplying or transmitting voltage or current to the transistor 114A. The wiring 104 may have a function of supplying or transmitting voltage or current to the capacitor 110. The wiring 104 thus serves as at least one of a current supply wiring, a power source wiring, a capacitor wiring, and the like. Although the potential of the wiring 104 is preferably constant, one aspect of an embodiment of the present invention is not limited to this and a pulse signal may be supplied to the wiring 104.

The wiring 124 has a function of supplying or transmitting voltage to the gate of the transistor 108. The wiring 124 may have a function of supplying or transmitting a potential for controlling the operation region of the transistor 108. The wiring 124 may have a function of supplying or transmitting a potential for initializing the transistor 108. The wiring 124 may have a function of supplying or transmitting a potential for turning on the transistor 108. The wiring 124 may have a function of supplying or transmitting a potential for performing the lighting function. The wiring 124 may have a function of supplying or transmitting voltage or current to the capacitor 110. The wiring 124 may have a function of supplying or transmitting voltage or current to the transistor 118A. The wiring 124 thus serves as at least one of a power source wiring, an initialization wiring, a wiring for controlling the lighting function, a wiring for controlling the operation region, and the like. Although the potential of the wiring 124 is preferably constant, a pulse signal may be supplied without limitation thereto.

The transistor 108 has a function capable of controlling the amount of current flowing into the light-emitting element 106A. The transistor 108 thus serves as at least one of a driver transistor, a current control transistor, and the like.

The transistor 112A has a function of controlling the conduction between the wiring 102 and the source of the transistor 108. The transistor 112A may have a function of selecting a pixel and controlling the supply of a video signal to a pixel. The transistor 112A thus serves as at least one of a selection transistor, a switching transistor, and the like.

The transistor 118A has a function of controlling the conduction between the wiring 124 and the gate of the transistor 108. The transistor 118A may have a function of determining whether to perform the lighting function. The transistor 118A may have a function of controlling the supply of a potential for operating the transistor 108 in a linear region to a pixel. The transistor 118A may have a function of determining whether to initialize the transistor 108. The transistor 118A may have a function of controlling the conduction of the transistor 108. The transistor 118A may have a function of determining whether to perform the lighting function. The transistor 118A may have a function of determining whether to supply voltage to the gate of the transistor 108. The transistor 118A may have a function of determining whether to bring the terminal of the capacitor 110 into a floating state. The transistor 118A thus serves as at least one of a control transistor, an operation control transistor, a function changing transistor, an initialization transistor, and the like.

The transistor 120A has a function of controlling the conduction between the light-emitting element 106A and the drain of the transistor 108. The transistor 120A may have a function of controlling the current supply to the light-emitting element 106A. The transistor 120A thus serves as at least one of a control transistor, an emission control transistor, and the like.

The transistor 114A has a function of controlling the conduction between the wiring 104 and the source of the transistor 108. The transistor 114A may have a function of controlling the supply of current to the light-emitting element 106A. The transistor 114A thus serves as at least one of a control transistor, an emission control transistor, and the like.

The transistor 116A has a function of controlling the conduction between the gate of the transistor 108 and the drain of the transistor 108. The transistor 116A may have a function of controlling the conduction between the terminal of the capacitor 110 and the drain of the transistor 108. The transistor 116A may have a function of determining whether to bring the terminal of the capacitor 110 into a floating state. The transistor 116A may have a function of controlling the operation for obtaining the threshold voltage of the transistor 108. The transistor 116A thus serves as at least one of a control transistor, a transistor for obtaining a threshold voltage, a capacitor control transistor, and the like.

The wiring 125 has a function of supplying or transmitting a signal for controlling the conduction between the wiring 102 and the source of the transistor 108. The wiring 125 may have a function of supplying or transmitting a signal for selecting a pixel. The wiring 125 may have a function of supplying or transmitting a signal for controlling the supply of a video signal to a pixel. The wiring 125 may have a function of supplying or transmitting a signal for controlling the conduction between the gate of the transistor 108 and the drain of the transistor 108. The wiring 125 may have a function of supplying or transmitting a signal for controlling the conduction between the terminal of the capacitor 110 and the drain of the transistor 108. The wiring 125 may have a function of supplying or transmitting a signal for determining whether to bring the terminal of the capacitor 110 into a floating state. The wiring 125 may have a function of supplying or transmitting a signal for controlling the operation for obtaining the threshold voltage of the transistor 108. The wiring 125 thus serves as at least one of a control wiring, a wiring for obtaining a threshold voltage, a capacitor control wiring, a selection wiring, a switching wiring, a control gate wiring, a gate wiring for obtaining a threshold voltage, a capacitor control gate wiring, a selection gate wiring, a switching gate wiring, and the like.

The wiring 126 has a function of supplying or transmitting a signal for controlling the conduction between the wiring 124 and the gate of the transistor 108. The wiring 126 may have a function of supplying or transmitting a signal for determining whether to perform the lighting function. The wiring 126 may have a function of supplying or transmitting a signal for controlling the supply of a potential for driving the transistor 108 in a linear region to a pixel. The wiring 126 may have a function of supplying or transmitting a signal for determining whether to initialize the transistor 108. The wiring 126 may have a function of supplying or transmitting a signal for controlling the conduction of the transistor 108. The wiring 126 may have a function of supplying or transmitting a signal for determining whether to perform the lighting function. The wiring 126 may have a function of supplying or transmitting a signal for determining whether to bring the terminal of the capacitor 110 into a floating state. The wiring 126 may have a function of supplying or transmitting a signal for controlling the voltage supply to the gate of the transistor 108. The wiring 126 thus serves as at least one of a control wiring, an operation control wiring, a function changing wiring, an initialization wiring, a control gate wiring, an operation control wiring, a function changing gate wiring, an initialization gate wiring, and the like.

The wiring 127 has a function of supplying or transmitting a signal for controlling the conduction between the light-emitting element 106A and the drain of the transistor 108. The wiring 127 may have a function of supplying or transmitting a signal for controlling the current supply to the light-emitting element 106A. The wiring 127 thus serves as at least one of a control wiring, an emission control wiring, a control gate wiring, an emission control gate wiring, and the like.

FIG. 18 is a circuit diagram of one pixel. In FIG. 9 which shows the block diagram of the whole light-emitting device, a plurality of pixels are arranged in matrix in the pixel portion 501. For example, the pixels shown in FIG. 18 are arranged in matrix. In FIG. 18, the wirings 125 and 126 are connected to the gate line driver circuit 503A, and the wiring 127 is connected to the gate line driver circuit 503B.

Figure 19:
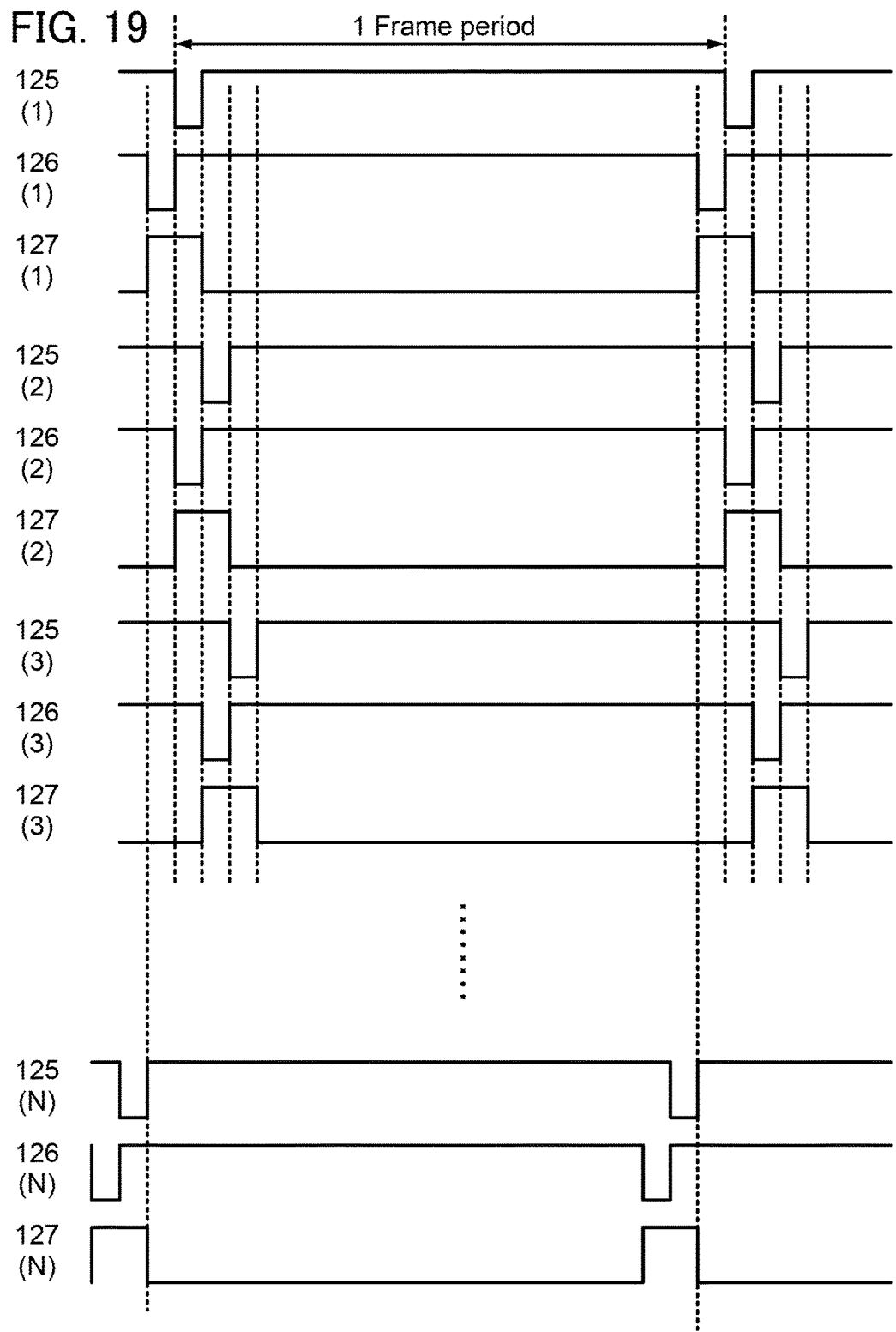
FIG. 19 is a timing chart of a light-emitting device of one embodiment of the present invention.

Next, a timing chart of the wirings 125, 126, and 127 in each line in the first operation mode will be described. The timing chart is used when the display function is performed. As shown in FIG. 19, wirings 125(1) to 125(N) in the first to N-th rows are selected row by row, that is, selecting signals are input to the wirings row by row. Similarly, wirings 125(1) to 126(N) in the first to N-th rows are selected row by row, that is, selecting signals are input to the wirings row by row. Similarly, wirings 127(1) to 127(N) in the first to N-th rows are selected row by row, that is, selecting signals are input to the wirings row by row.

Figure 20:
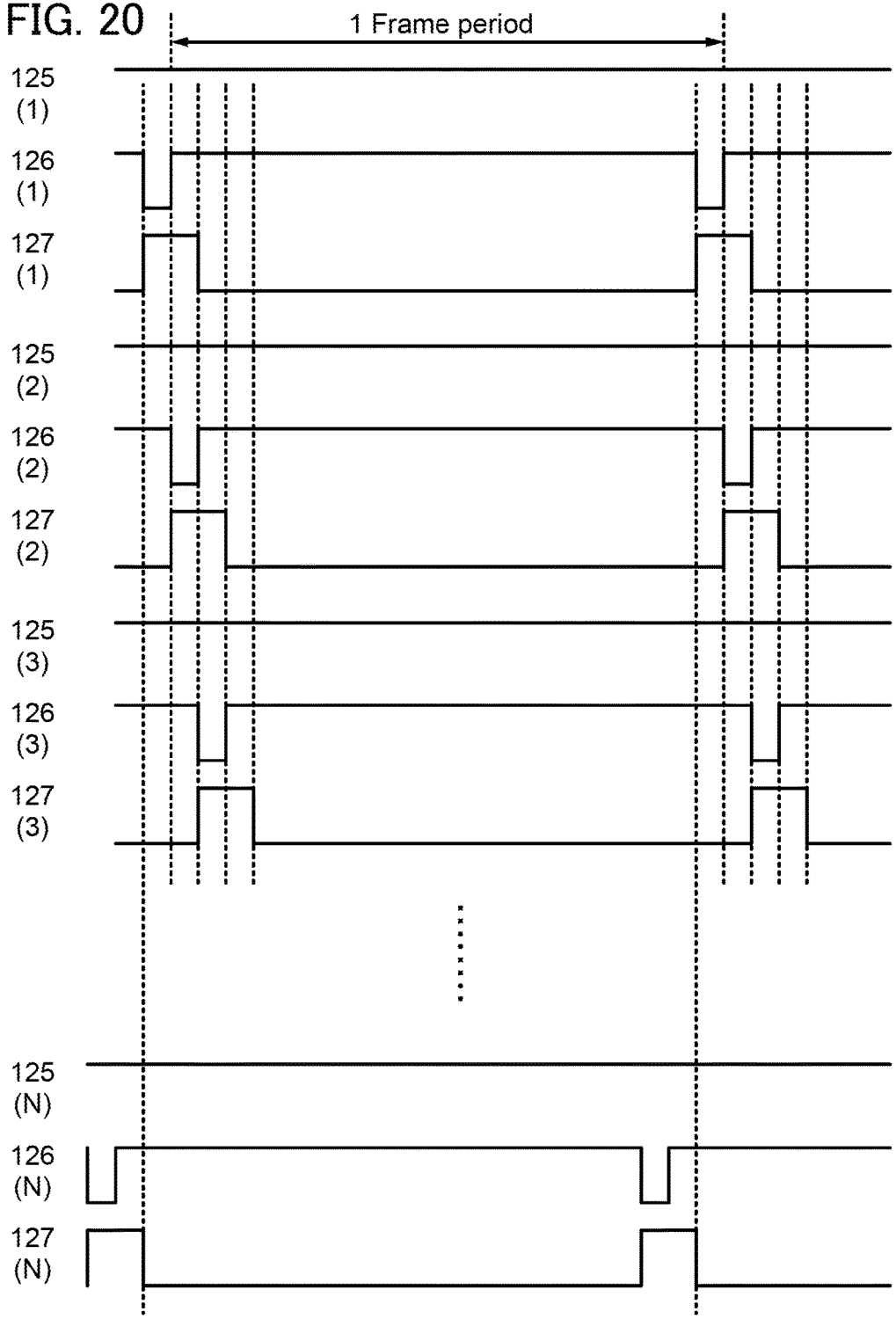
FIG. 20 is a timing chart of a light-emitting device of one embodiment of the present invention.

A timing chart in the second operation mode will be described. The timing chart is used when the lighting function is performed. As shown in FIG. 20, wirings 126(1) to 126(N) in the first to N-th rows are selected row by row, that is, selecting signals are input to the wirings row by row.

Similarly, wirings 127(1) to the wiring 127(N) in the first to N-th rows are selected row by row, that is, selecting signals are input to the wirings row by row. In contrast, the wirings 125(1) to 125(N) in the first to N-th rows are not selected and in the non-selected state.

In this manner, the display function and the lighting function are switched and operated.

Figure 21:
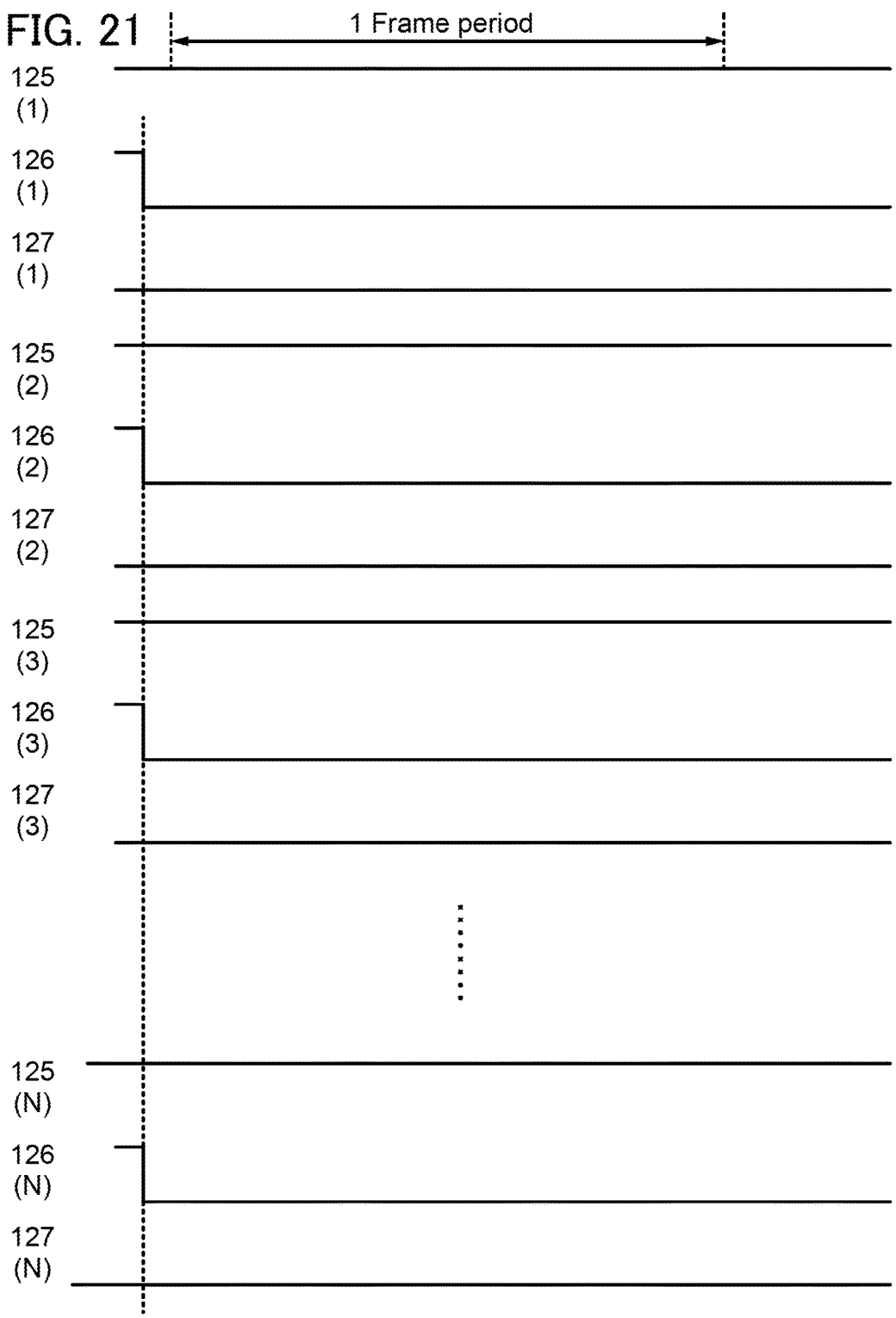
FIG. 21 is a timing chart of a light-emitting device of one embodiment of the present invention.

Note that the wirings 126 are not necessarily scanned row by row because image displaying is not needed when the lighting function is performed. Scanning the wirings 126 is not necessary soon after scanning the wirings 126 once. The wirings 126 in all rows may be therefore selected at the same time. In that case, the wirings 125 in all rows are preferably in the non-selected state and the wirings 127 in all rows are preferably in the selected state. FIG. 21 is a timing chart for performing the lighting function in that manner.

Figure 22:
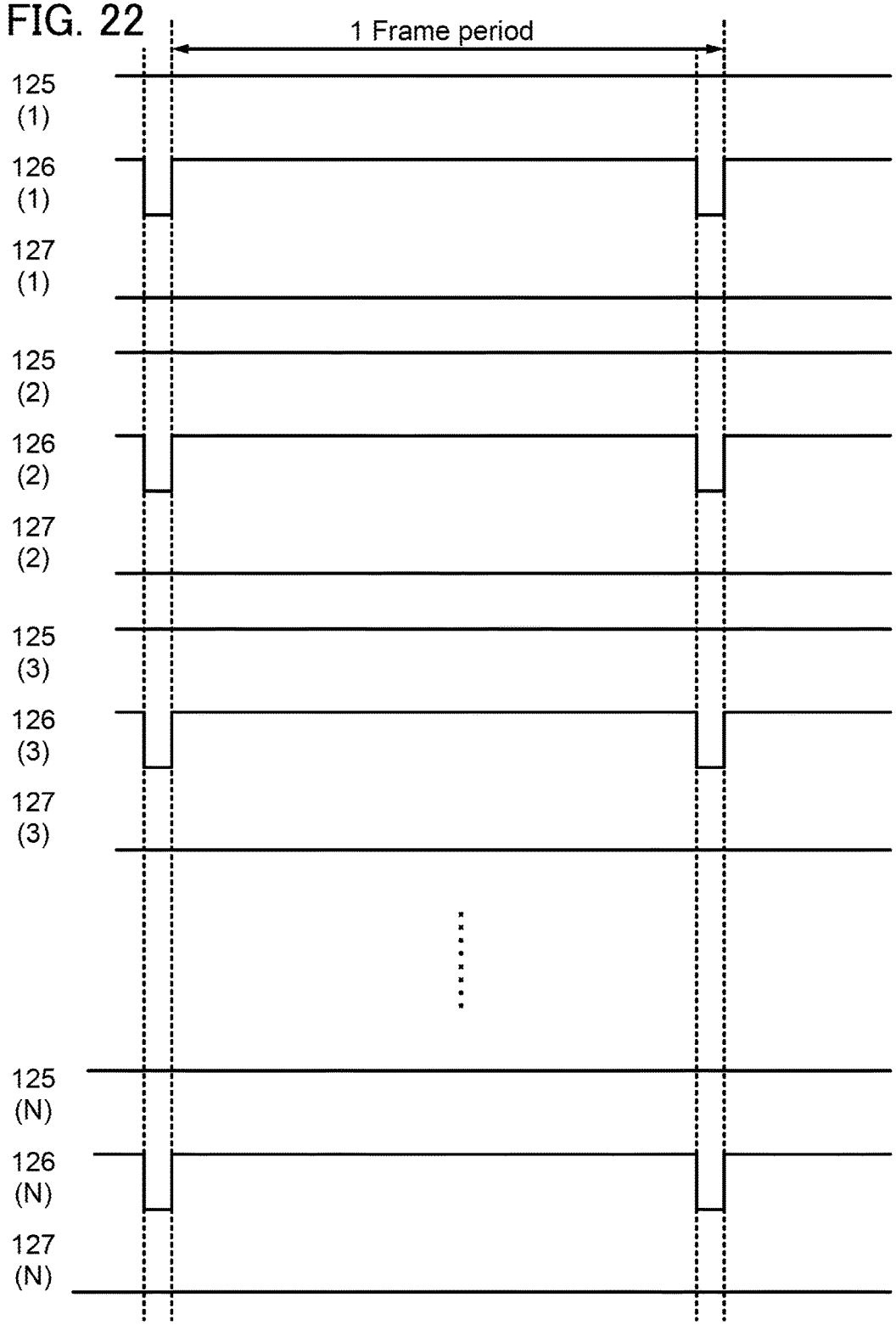
FIG. 22 is a timing chart of a light-emitting device of one embodiment of the present invention.
Figure 23:
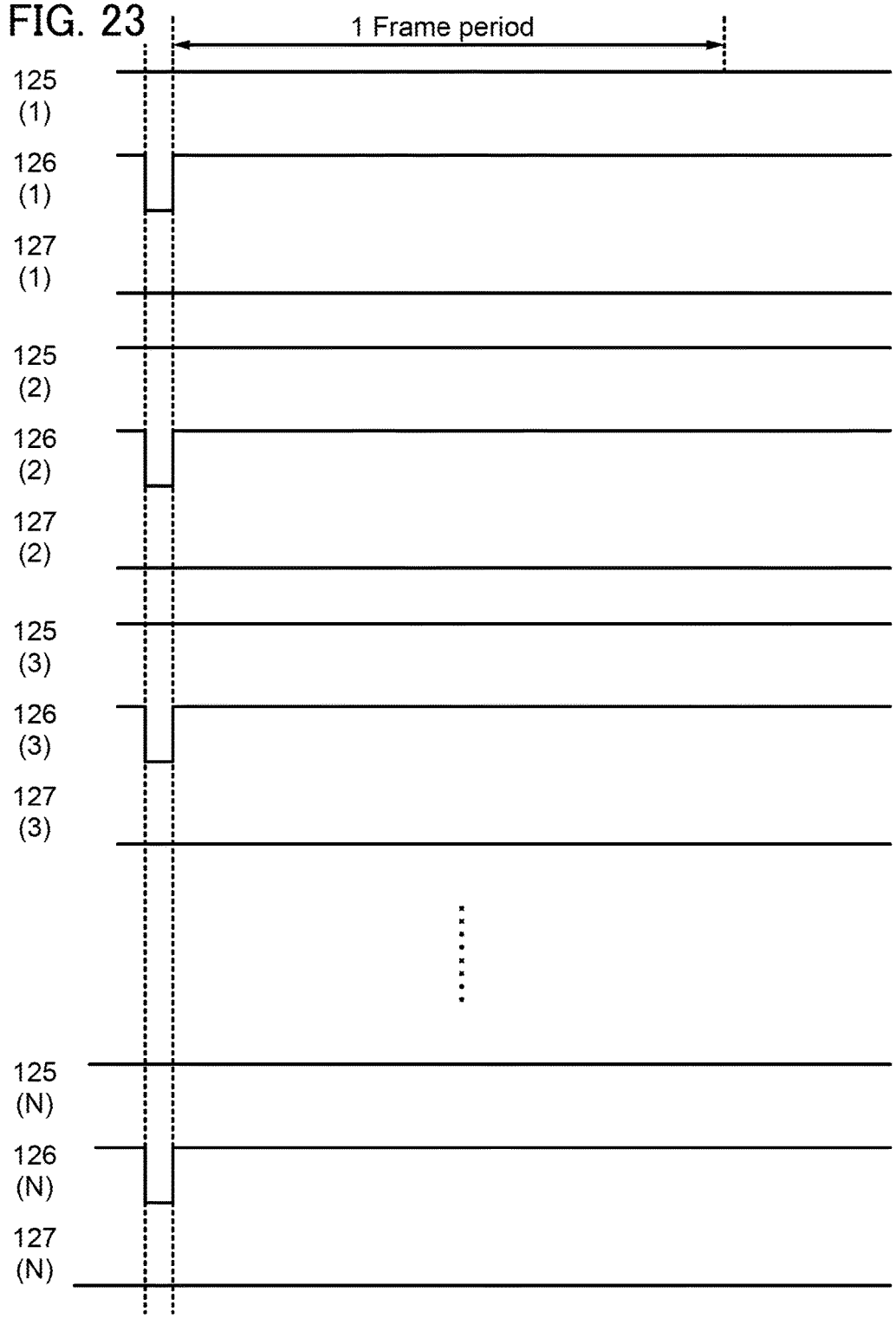
FIG. 23 is a timing chart of a light-emitting device of one embodiment of the present invention.

Although the wirings 126 in all rows remain in the selected state in FIG. 21, the wirings 126 in all rows may be selected in every frame period as shown in FIG. 22 or may be selected only once as in FIG. 23. Rewriting of signal is not needed in the case of performing the lighting function because displaying of image is not needed. Thus, it is possible that the wirings 126 in all rows are selected once and after that, is not selected any more. Note that in the case where the signal in each pixel is rewritten to perform the display function and then the lighting function is performed again, the wirings 126 need to be selected again.

Figure 24:
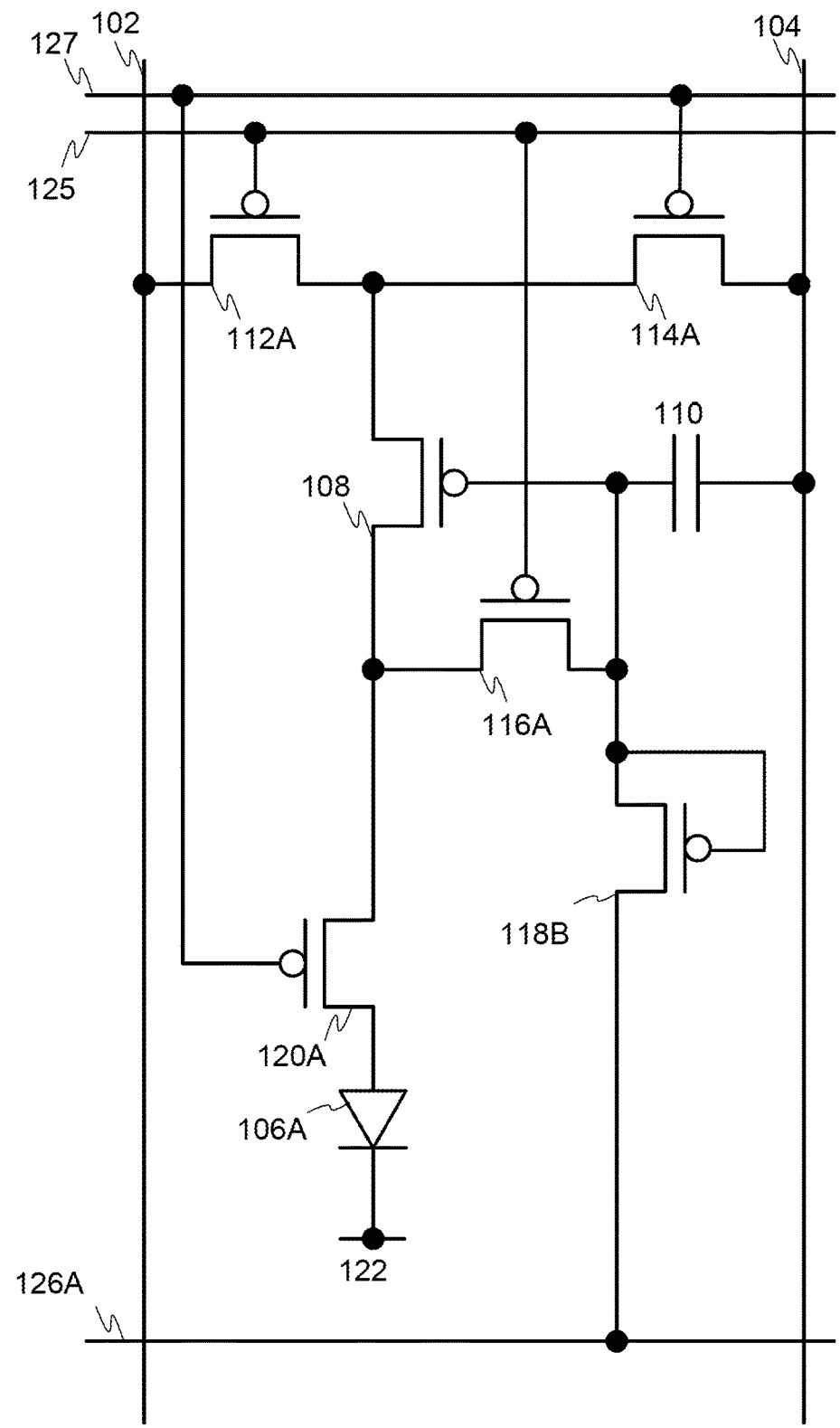
FIG. 24 illustrates a circuit configuration of a light-emitting device of one embodiment of the present invention.

Although the transistor 118A is used as a switch in FIG. 18, one aspect of one embodiment of the present invention is not limited to this example. A diode may be used as the switch 118, for example, a diode-connected transistor 118B and a wiring 126A may be used as shown in FIG. 24. The wiring 126A can be driven as the wiring 126.

Figure 25:
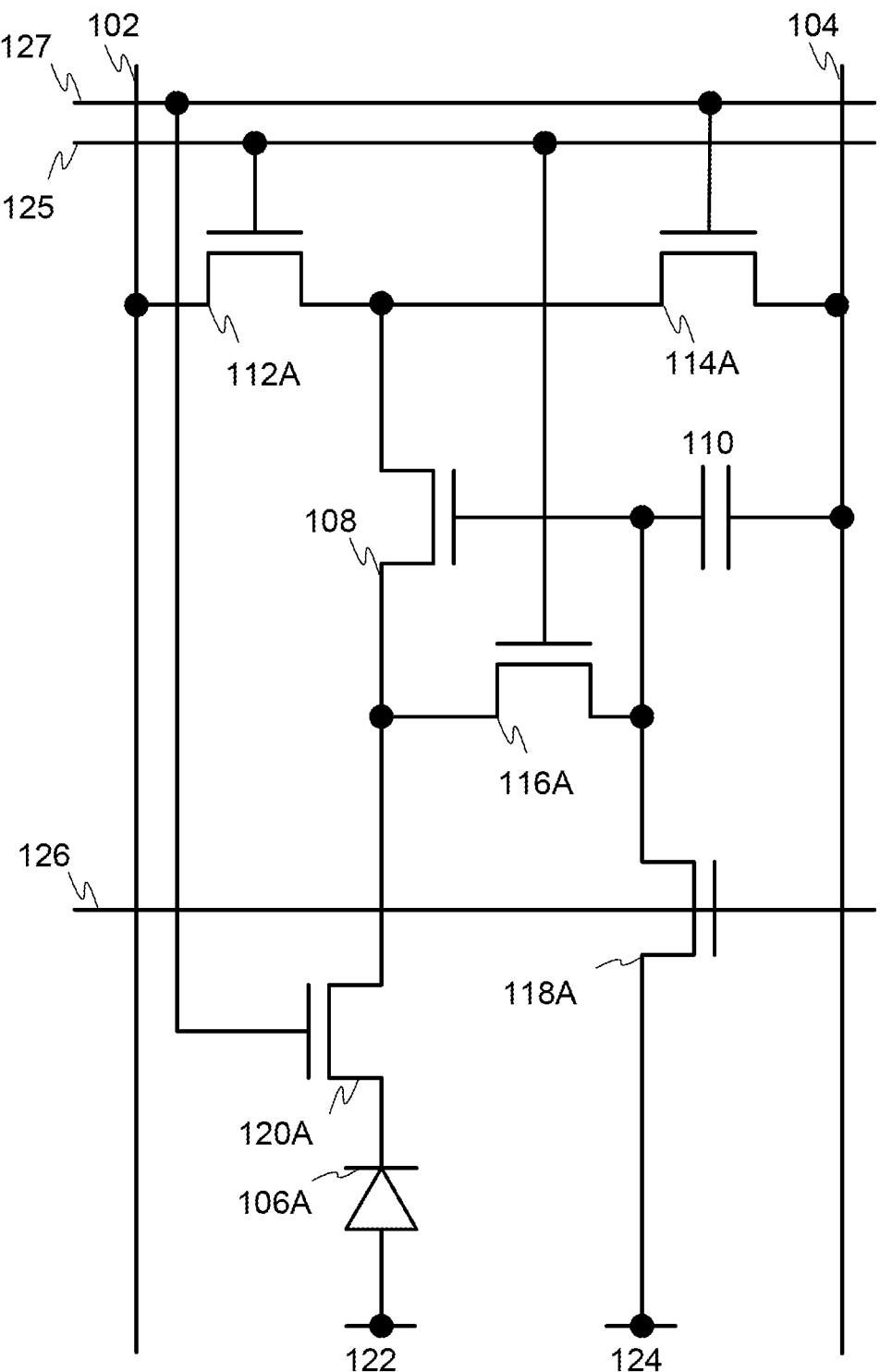
FIG. 25 illustrates a circuit configuration of a light-emitting device of one embodiment of the present invention.

FIG. 18 shows an example including the P-channel transistor 108, but one embodiment of the present invention is not limited to this. When the transistor 108 is an N-channel transistor, the transistor 108 can operate in the above manner by reversing the potential levels of the wirings and by reversing the light-emitting element 106A as shown in FIGS. 3C and 3D. FIG. 25 is a circuit example in that case.

Figure 26:
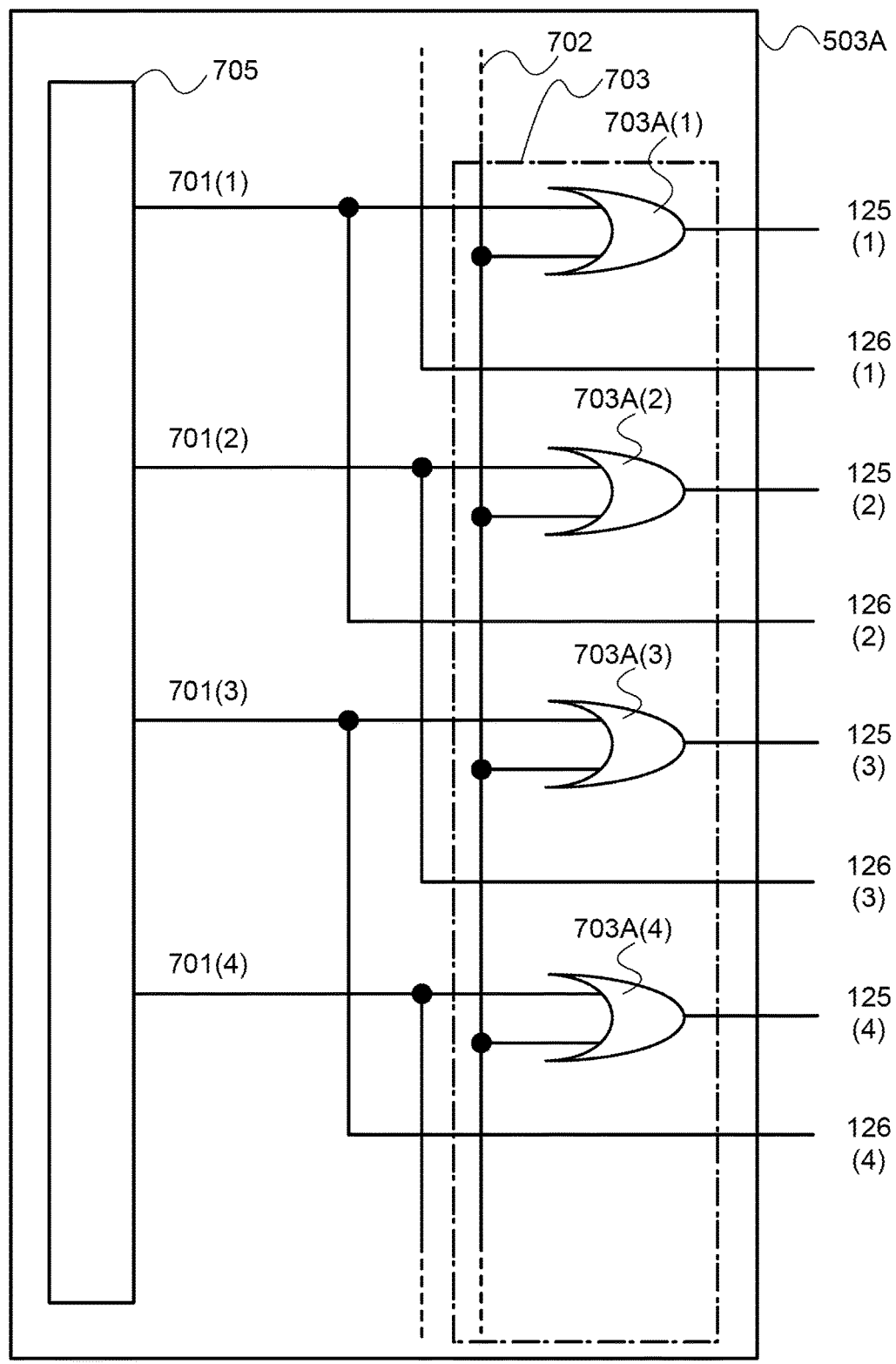
FIG. 26 illustrates a circuit configuration of a light-emitting device of one embodiment of the present invention.
Figure 27:
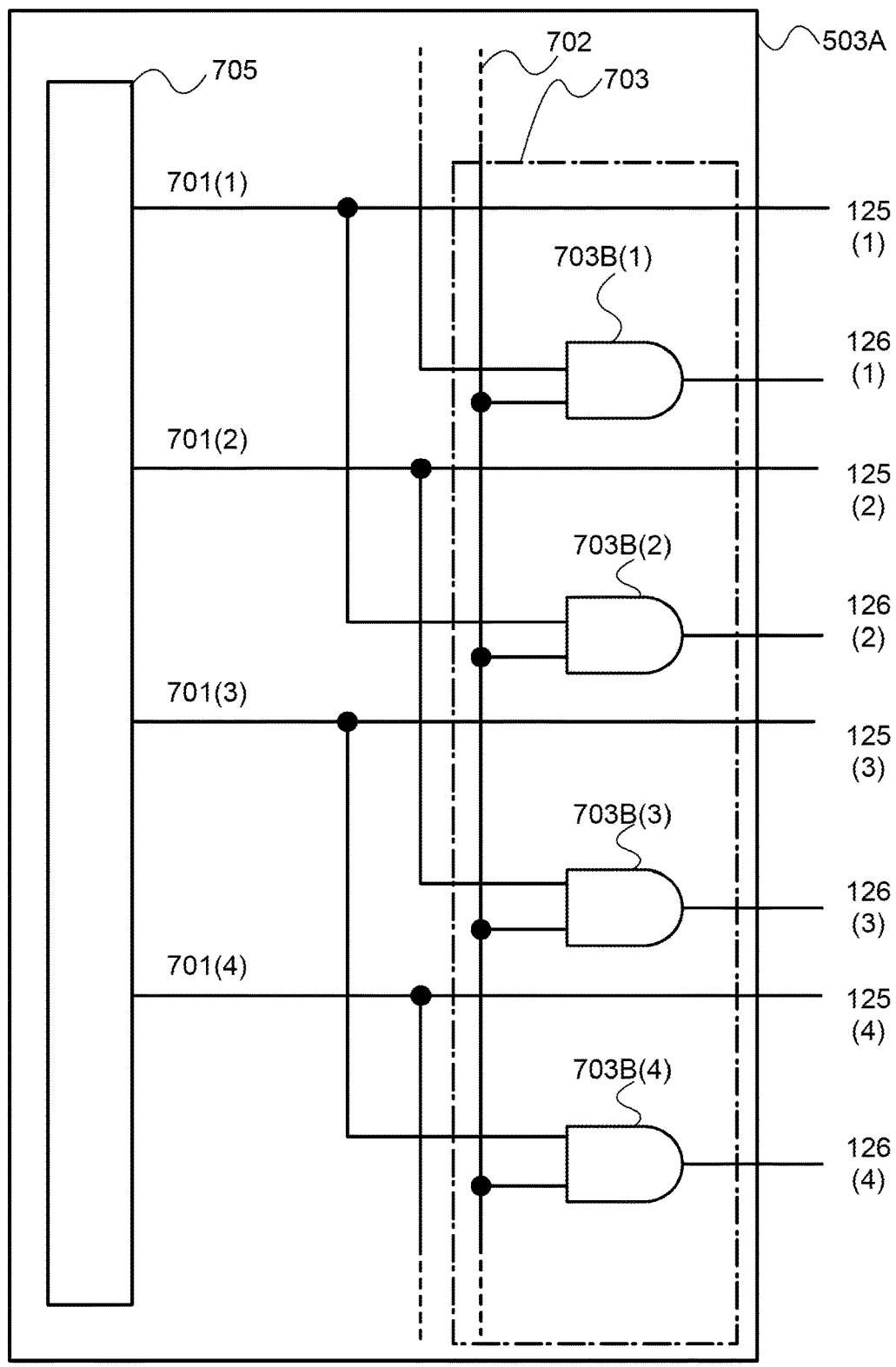
FIG. 27 illustrates a circuit configuration of a light-emitting device of one embodiment of the present invention.

Next, an example of the gate line driver circuit 503A according to the timing charts shown in FIGS. 19 to 23 will be shown in FIGS. 26 and 27. Note that, as an example, the circuit configuration of the gate line driver circuit 503B may be similar to that of the gate line driver circuit 503A.

The gate line driver circuit 503A in FIG. 26 includes a circuit 705 and a circuit 703. The circuit 705 includes a shift register circuit or a decoder circuit, for example, and has a function of outputting pulse signals for selecting wirings row by row. The pulse signals are sequentially output from a wiring 701(1) in the first row, a wiring 701(2) in the second row, a wiring 701(3) in the third row, a wiring 701(4) in the fourth row, and the like. Some of the pulse signals are input to the circuit 703. A wiring 702 is connected to the circuit 703. The signals of the wirings 125 of each row depend on the signal of the wiring 702. The wirings 125 of each row are connected to a circuit 703A(1), a circuit 703A(2), a circuit 703A(3), a circuit 703A(4), and the like. These circuits each include an OR circuit, for example. Note that at least one of an AND circuit, a NOR circuit, a NAND circuit, a NOT circuit, and the like can be used instead of the OR circuit.

In FIG. 27, the wiring 126(1), the wiring 126(2), the wiring 126(3), and the wiring 126(4) are respectively connected to a circuit 703B(1), a circuit 703B(2), a circuit 703B(3), a circuit 703B(4). These circuits each include an AND circuit, for example. Note that at least one of an OR circuit, a NOR circuit, a NAND circuit, a NOT circuit, and the like can be used instead of the AND circuit.

Although FIG. 15 shows the case where the switch 118 is connected to the gate of the transistor 108, one embodiment of the present invention is not limited to this. The switch 118 may be connected to the drain of the transistor 108, and FIGS. 28A to 28D is an example of a circuit and an operation method in this case.

Figure 28A:
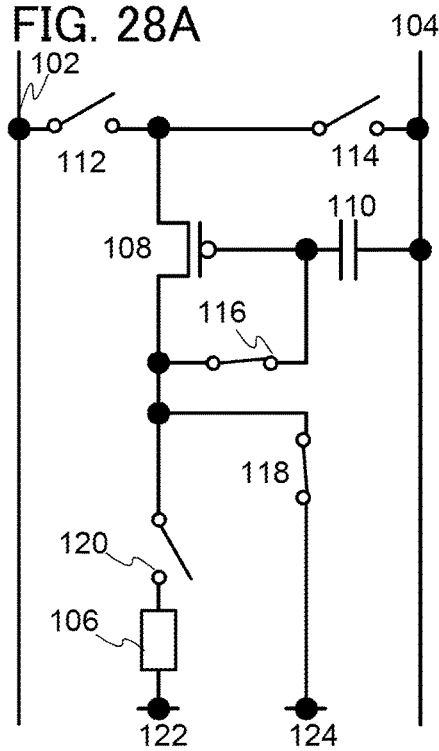
FIGS. 28A to 28D illustrate a method for driving a light-emitting device of one embodiment of the present invention.
Figure 28B:
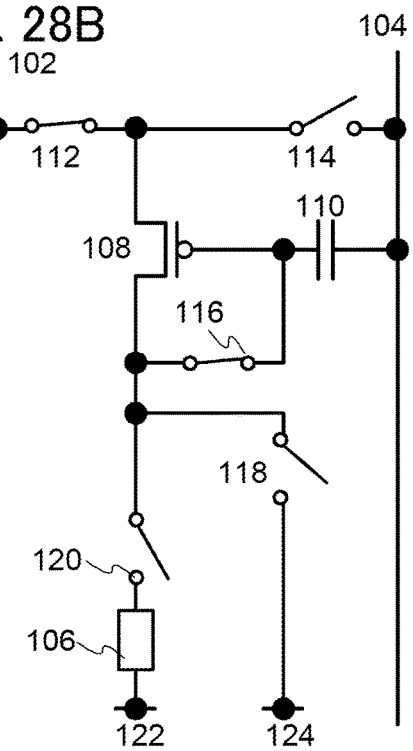
Figure 28C:
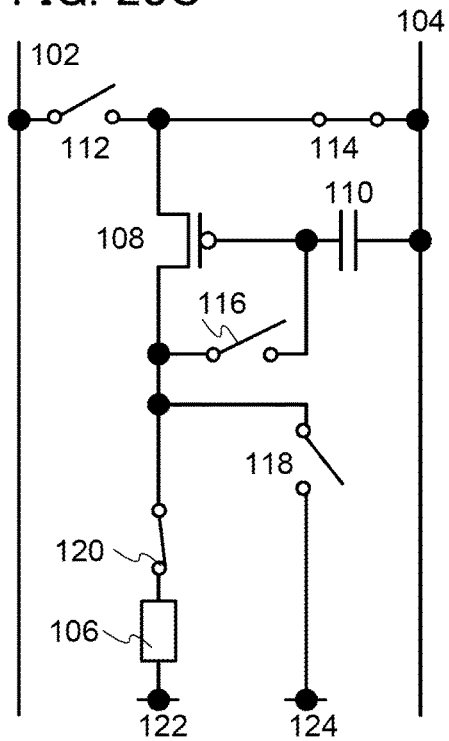

First, a driving method in the first operation mode will be described. The driving method here is used when the display function is performed. First, the switches 118 and 116 are turned on and the transistor 108 is initialized as shown in FIG. 28A. The potential of the wiring 124 is thus input to the gate and the drain of the transistor 108 and the capacitor 110. As a result, the transistor 108 is turned on. This operation is initialization for obtaining the threshold voltage of the transistor 108. Then, as shown in FIG. 28B, the pixel is selected, the switch 112 is turned on, and the video signal is supplied from the wiring 102 to the source of the transistor 108. Because the switch 116 is on and the switch 118 is off, the electric charge in the capacitor 110 is discharged. When the discharge is stopped or the amount of discharge is reduced, the threshold voltage of the transistor 108 is obtained. Then, as shown in FIG. 28C, the pixel is not selected, the switch 112 and the switch 116 are turned off, and the voltage based on the video signal is held in the capacitor 110. Because the switch 114 and the switch 120 are turned on, current is supplied to the load 106 through the transistor 108. The amount of current depends on the size of the video signal. The current value at this time is one such that variation in threshold voltages of the transistor 108 is small.

Figure 28D:
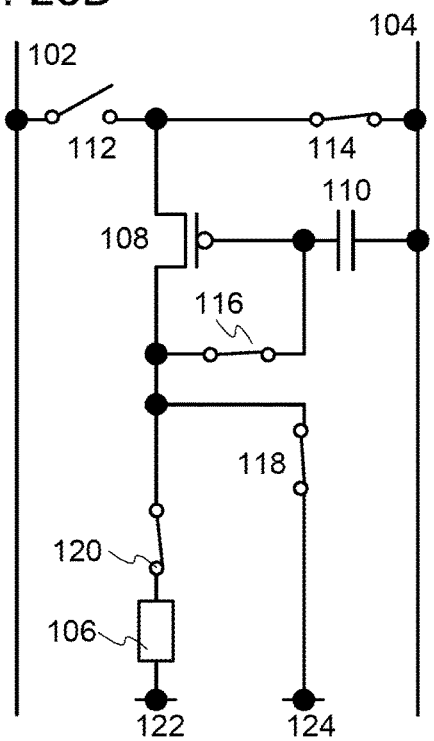

Next, a driving method in the second operation mode will be described. The driving method here is used when the lighting function is performed. As shown in FIG. 28D, the switches 118 and 116 are turned on and the potential of the wiring 124 is supplied to the gate and the drain of the transistor 108 and the capacitor 110. Because the switch 114 is on and the absolute value of the gate-source voltage of the transistor 108 is large, a large current flows into the load 106. Note that the switches 118 and 116 may be then turned off as shown in FIG. 28C. In this case, the potential of the wiring 124 is held in the capacitor 110 and current based on the potential is supplied from the transistor 108 to the load 106.

This embodiment is obtained by performing change, addition, modification, removal, application, superordinate conceptualization, or subordinate conceptualization on part or the whole of another embodiment. Thus, part of or the whole of this embodiment can be freely combined with, applied to, or replaced with part of or the whole of another embodiment.

Embodiment 4

In this embodiment, another specific example of the method for driving the light-emitting device according to one embodiment of the present invention is described.

In Embodiment 3, the potential of the gate of the transistor 108 is controlled by turning on the switch 118 in performing the lighting function. In this embodiment, an example of a driving method in which the potential of the wiring 102 is controlled will be described.

The example will be described with reference to FIGS. 17A to 17C.

First, a driving method in the first operation mode will be described. The driving method here is used when the display function is performed. First, the switch 118 is turned on and the transistor 108 is initialized as shown in FIG. 17A. The potential of the wiring 124 is thus input to the gate of the transistor 108 and the capacitor 110. As a result, the transistor 108 is turned on. This operation is initialization for obtaining the threshold voltage of the transistor 108. Then, as shown in FIG. 17B, the pixel is selected, the switch 112 is turned on, and the video signal is supplied from the wiring 102 to the source of the transistor 108. Because the switch 116 is on and the switch 118 is off, the electric charge in the capacitor 110 is discharged. When the discharge is stopped or the amount of discharge is reduced, the threshold voltage of the transistor 108 is obtained.

The potential of the wiring 102 at this time varies depending on an image. A value of a potential at the time when a grayscale level is the lowest is referred to as SIGMIN and a value of a potential when a grayscale level is the highest is referred to as SIGMAX. The absolute value of gate-source voltage of the transistor 108 when a grayscale is the lowest is referred to as VGSMIN, and the absolute value of gate-source voltage of the transistor 108 when a grayscale is the highest is referred to as VGSMAX. When the transistor 108 is a P-channel transistor, the value of the potential SIGMIN is higher than the value of the potential SIGMAX. The value of the potential of the wiring 102 is therefore higher than or equal to SIGMAX and lower than or equal to SIGMIN. The absolute value of gate-source voltage of the transistor 108 is larger than or equal to VGSMIN and smaller than or equal to VGSMAX.

Then, as shown in FIG. 17C, the pixel is not selected, the switch 112 and the switch 116 are turned off, and the voltage of the video signal is held in the capacitor 110. Because the switch 114 and the switch 120 are turned on, current is supplied to the load 106 through the transistor 108. The amount of current depends on the size of the video signal. The current value at this time is one such that variation in threshold voltages of the transistor 108 is small.

Next, a driving method in the second operation mode will be described. The driving method here is used when the lighting function is performed. First, the switch 118 is turned on and the transistor 108 is initialized as shown in FIG. 17A. The potential of the wiring 124 is thus input to the gate of the transistor 108 and the capacitor 110. As a result, the transistor 108 is turned on. Then, as shown in FIG. 17B, the pixel is selected, the switch 112 is turned on, and a predetermined signal is supplied from the wiring 102 to the source of the transistor 108. Because the switch 116 is on and the switch 118 is off, the electric charge in the capacitor 110 is discharged. When the discharge is stopped or the amount of discharge is reduced, the threshold voltage of the transistor 108 is obtained.

The value of the potential of the wiring 102 at this time is lower than the value of the potential SIGMAX at the time when the grayscale level is the highest, and thus is in a range lower than the value of the potential SIGMAX. The absolute value of gate-source voltage of the transistor 108 is larger than VGSMAX.

Then, as shown in FIG. 17C, the pixel is not selected, the switch 112 and the switch 116 are turned off, and the voltage based on the predetermined signal is held in the capacitor 110. Because the switch 114 and the switch 120 are turned on, current is supplied to the load 106 through the transistor 108. The amount of current is very large. The current at this time is so large that a light-emitting element deteriorates. That is, the transistor 108 is driven at a constant voltage.

By this driving method, the potentials of the wirings 102 can be controlled independently; thus, the potential of the wiring 102 in one column is one for driving at a constant voltage and the potential of the wiring 102 in another column is one at which a light-emitting element is brought into a non-emission state. Alternatively, the potential of the wiring 102 in another column can be one for driving by the constant current drive. That is, the state can vary by pixels in the same row.

In this manner, the display function and the lighting function are switched and operated.

Another example will be described with reference to FIGS. 7A to 7B. Note that in FIGS. 7A to 7B, the switch 118 and the wiring 124 are not necessarily provided.

First, a driving method in the first operation mode will be described. The driving method here is used when the display function is performed. First, as shown in FIG. 7A, the pixel is selected, the switch 312 is turned on, and the video signal is supplied from the wiring 102 to the gate of the transistor 108.

The potential of the wiring 102 at this time varies depending on an image. A value of a potential at the time when a grayscale level is the lowest is referred to as SIGMIN and a value of a potential when a grayscale level is the highest is referred to as SIGMAX. The absolute value of gate-source voltage of the transistor 108 when a grayscale is the lowest is referred to as VGSMIN, and the absolute value of gate-source voltage of the transistor 108 when a grayscale is the highest is referred to as VGSMAX. When the transistor 108 is a P-channel transistor, the value of the potential SIGMIN is higher than the value of the potential SIGMAX. The value of the potential of the wiring 102 is therefore higher than or equal to SIGMAX and lower than or equal to SIGMIN. The absolute value of gate-source voltage of the transistor 108 is larger than or equal to VGSMIN and smaller than or equal to VGSMAX.

Then, as shown in FIG. 7B, the pixel is not selected, the switch 312 is turned off, and the voltage based on the video signal is held in the capacitor 110. Current is then supplied to the load 106 through the transistor 108. The amount of current depends on the size of the video signal.

Next, a driving method in the second operation mode will be described. The driving method here is used when the lighting function is performed. First, as shown in FIG. 7A, the pixel is selected, the switch 312 is turned on, and the predetermined signal is supplied from the wiring 102 to the gate of the transistor 108.

The value of the potential of the wiring 102 at this time is lower than the value of the potential SIGMAX at the time when the grayscale level is the highest, and thus is in a range lower than the potential SIGMAX. The absolute value of gate-source voltage of the transistor 108 is larger than VGSMAX.

Then, as shown in FIG. 7B, the pixel is not selected, the switch 312 is turned off, and the voltage based on the signal is held in the capacitor 110. Current is then supplied to the load 106 through the transistor 108. The amount of current is very large. The current at this time is so large that a light-emitting element deteriorates. That is, the transistor 108 is driven at a constant voltage.

By this driving method, the potentials of the wirings 102 can be controlled independently; thus, the potential of the wiring 102 in one column is one for driving at a constant voltage and the potential of the wiring 102 in another column is one at which a light-emitting element is brought into a non-emission state. Alternatively, the potential of the wiring 102 in another column can be one for driving by the constant current drive. That is, the state can vary by pixels in the same row.

In this manner, the display function and the lighting function are switched and operated.

By controlling the sizes of signals supplied from the wiring 102 as described above, the operation region of the transistor 108 can be controlled, and the display function and the lighting function can be switched and operated in any pixel circuits.

This embodiment is obtained by performing change, addition, modification, removal, application, superordinate conceptualization, or subordinate conceptualization on part or the whole of another embodiment. Thus, part of or the whole of this embodiment can be freely combined with, applied to, or replaced with part of or the whole of another embodiment.

Embodiment 5

In this embodiment, specific examples of electronic devices which have the light-emitting device of one embodiment of the present invention and an imaging element will be described.

FIGS. 29A and 29B show an example of an electronic device 601. FIG. 29A is a top view of the front of the electronic device 601 and FIG. 29B is a cross-sectional view of the electronic device 601. FIG. 30A is a top view of the back of the electronic device 601 and FIG. 30B is a cross-sectional view of the electronic device 601. Examples of the electronic device 601 include a tablet terminal, a smartphone, a mobile phone, a mobile computer, a mobile information terminal, a mobile electronic book reader, a mobile camera, and the like.

As shown in FIG. 29A, a display device 602 and a camera portion 603 are provided on the front of the electronic device 601.

As shown in FIG. 30A, a camera portion 604 is provided on the back of the electronic device 601.

The light-emitting device described in the above embodiments for example, can be used as the display device 602. The display device 602 is used in general to view the display and input text and the like. When imaging is performed using the camera portion 603 or 604, that status of the imaging or an image of an intended party is displayed on the display device 602, and the display device 602 can also function as lighting, that is, can also be used as a flash or a strobe for illuminating a subject. To switch the display function and the lighting function, the driving method in the above embodiments can be employed, and a subject can be illuminated with high luminance and a high quality image can be taken. The display function and the lighting function can be switched and operated appropriately as a result.

This embodiment is obtained by performing change, addition, modification, removal, application, superordinate conceptualization, or subordinate conceptualization on part or the whole of another embodiment. Thus, part of or the whole of this embodiment can be freely combined with, applied to, or replaced with part of or the whole of another embodiment.

Embodiment 6

In this embodiment, examples of structures of transistors are described with reference to FIGS. 31A, 31B, and 31C.

Figure 31A:
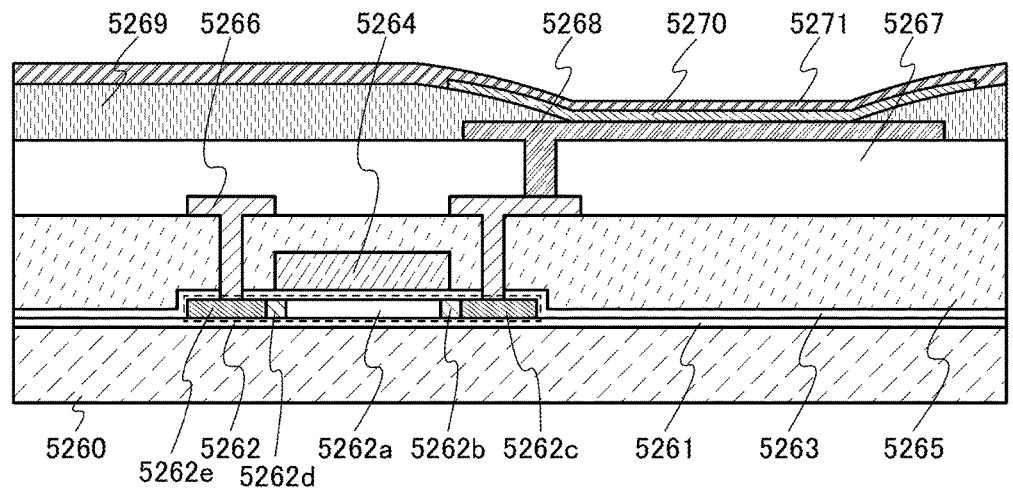
FIGS. 31A to 31C are cross-sectional views of a display device of one embodiment of the present invention.

FIG. 31A illustrates an example of a structure of a top-gate transistor. FIG. 31B illustrates an example of a structure of a bottom-gate transistor. FIG. 31C illustrates an example of a structure of a transistor formed using a semiconductor substrate.

FIG. 31A illustrates a substrate 5260; an insulating layer 5261 formed over the substrate 5260; a semiconductor layer 5262 which is formed over the insulating layer 5261 and includes a region 5262a, a region 5262b, a region 5262c, a region 5262d, and a region 5262e; an insulating layer 5263 formed so as to cover the semiconductor layer 5262; a conductive layer 5264 formed over the semiconductor layer 5262 and the insulating layer 5263; an insulating layer 5265 which is formed over the insulating layer 5263 and the conductive layer 5264 and is provided with opening portions; a conductive layer 5266 which is formed over the insulating layer 5265 and in the opening portions formed in the insulating layer 5265; an insulating layer 5267 which is formed over the conductive layer 5266 and the insulating layer 5265 and is provided with an opening portion; a conductive layer 5268 which is formed over the insulating layer 5267 and in the opening portion formed in the insulating layer 5267; an insulating layer 5269 which is formed over the insulating layer 5267 and the conductive layer 5268 and is provided with an opening portion; a light-emitting layer 5270 formed over the insulating layer 5269 and in the opening portion formed in the insulating layer 5269; and a conductive layer 5271 formed over the insulating layer 5269 and the light-emitting layer 5270.

Figure 31B:
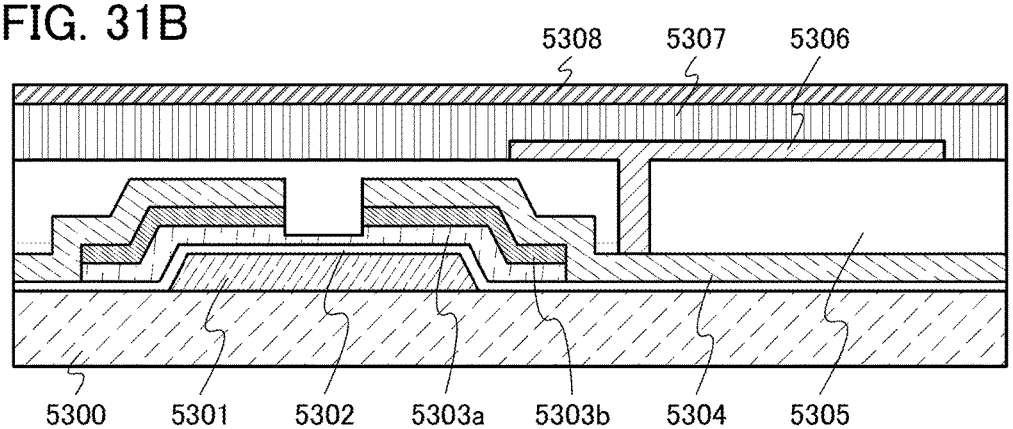

FIG. 31B illustrates a substrate 5300; a conductive layer 5301 formed over the substrate 5300; an insulating layer 5302 formed so as to cover the conductive layer 5301; a semiconductor layer 5303a formed over the conductive layer 5301 and the insulating layer 5302; a semiconductor layer 5303b formed over the semiconductor layer 5303a; a conductive layer 5304 formed over the semiconductor layer 5303b and the insulating layer 5302; an insulating layer 5305 which is formed over the insulating layer 5302 and the conductive layer 5304 and is provided with an opening; a conductive layer 5306 which is formed over the insulating layer 5305 and in the opening formed in the insulating layer 5305; a liquid crystal layer 5307 formed over the insulating layer 5305 and the conductive layer 5306; and a conductive layer 5308 formed over the liquid crystal layer 5307.

Figure 31C:
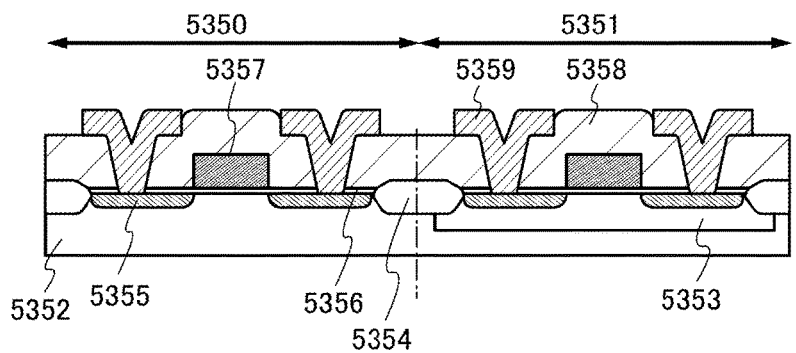

FIG. 31C illustrates a semiconductor substrate 5352 including a region 5353 and a region 5355; an insulating layer 5356 formed over the semiconductor substrate 5352; an insulating layer 5354 formed over the semiconductor substrate 5352; a conductive layer 5357 formed over the insulating layer 5356; an insulating layer 5358 which is formed over the insulating layer 5354, the insulating layer 5356, and the conductive layer 5357 and is provided with openings; and a conductive layer 5359 which is formed over the insulating layer 5358 and in the openings formed in the insulating layer 5358. Thus, a transistor is formed in each of a region 5350 and a region 5351.

The insulating layer 5261 can serve as a base film. The insulating layer 5354 serves as an element isolation layer (e.g., a field oxide film). Each of the insulating layer 5263, the insulating layer 5302, and the insulating layer 5356 can serve as a gate insulating film. Each of the conductive layer 5264, the conductive layer 5301, and the conductive layer 5357 can serve as a gate electrode. Each of the insulating layer 5265, the insulating layer 5267, the insulating layer 5305, and the insulating layer 5358 can serve as an interlayer film or a planarization film. Each of the conductive layer 5266, the conductive layer 5304, and the conductive layer 5359 can serve as a wiring, an electrode of a transistor, an electrode of a capacitor, or the like. Each of the conductive layer 5268 and the conductive layer 5306 can serve as a pixel electrode, a reflective electrode, or the like. The insulating layer 5269 can serve as a partition wall. Each of the conductive layer 5271 and the conductive layer 5308 can serve as a counter electrode, a common electrode, or the like.

As each of the substrate 5260 and the substrate 5300, a glass substrate, a quartz substrate, a silicon substrate, a metal substrate, a stainless steel substrate, a flexible substrate, or the like can be used, for example. As a glass substrate, a barium borosilicate glass substrate, an aluminoborosilicate glass substrate, or the like can be used, for example. Examples of a flexible substrate include a flexible synthetic resin such as plastics typified by polyethylene terephthalate (PET), polyethylene naphthalate (PEN), and polyether sulfone (PES), and acrylic. Alternatively, an attachment film (formed using polypropylene, polyester, vinyl, polyvinyl fluoride, polyvinyl chloride, or the like), paper of a fibrous material, a base material film (formed using polyester, polyamide, an inorganic vapor deposition film, paper, or the like), or the like can be used.

As the semiconductor substrate 5352, for example, a single crystal silicon substrate having n-type or p-type conductivity can be used. Note that this embodiment is not limited to this, and a substrate which is similar to the substrate 5260 can be used. For example, the region 5353 is a region where an impurity is added to the semiconductor substrate 5352 and serves as a well. For example, in the case where the semiconductor substrate 5352 has p-type conductivity, the region 5353 has n-type conductivity and serves as an n-well. On the other hand, in the case where the semiconductor substrate 5352 has n-type conductivity, the region 5353 has p-type conductivity and serves as a p-well. For example, the region 5355 is a region where an impurity is added to the semiconductor substrate 5352 and serves as a source region or a drain region. Note that an LDD region can be formed in the semiconductor substrate 5352.

For the insulating layer 5261, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example. In an example in the case where the insulating film 5261 has a two-layer structure, a silicon nitride film and a silicon oxide film can be formed as a first insulating film and a second insulating film, respectively. In an example in the case where the insulating film 5261 has a three-layer structure, a silicon oxide film, a silicon nitride film, and a silicon oxide film can be formed as a first insulating film, a second insulating film, and a third insulating film, respectively.

For each of the semiconductor layer 5262, the semiconductor layer 5303*a*, and the semiconductor layer 5303*b*, for example, a non-single-crystal semiconductor (e.g., amorphous silicon, polycrystalline silicon, or microcrystalline silicon), a single crystal semiconductor, a compound semiconductor or an oxide semiconductor (e.g., ZnO, InGaZnO, SiGe, GaAs, IZO, ITO, or SnO), an organic semiconductor, a carbon nanotube, or the like can be used.

Note that for example, the region 5262*a* is an intrinsic region where an impurity is not added to the semiconductor layer 5262 and serves as a channel region. However, a slight amount of impurities can be added to the region 5262*a*. The concentration of the impurity added to the region 5262*a* is preferably lower than the concentration of an impurity added to the region 5262*b*, the region 5262*c*, the region 5262*d*, or the region 5262*e*. Each of the region 5262*b* and the region 5262*d* is a region to which an impurity is added at low concentration and serves as an LDD (lightly doped drain) region. Note that the region 5262*b* and the region 5262*d* can be eliminated. Each of the region 5262*c* and the region 5262*e* is a region to which an impurity is added at high concentration and serves as a source region or a drain region.

Note that the semiconductor layer 5303*b* is a semiconductor layer to which phosphorus or the like is added as an impurity element and has n-type conductivity.

Note that in the case where an oxide semiconductor or a compound semiconductor is used for the semiconductor layer 5303*a*, the semiconductor layer 5303*b* can be eliminated.

For each of the insulating layer 5263, the insulating layer 5302, and the insulating layer 5356, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example.

As each of the conductive layer 5264, the conductive layer 5266, the conductive layer 5268, the conductive layer 5271, the conductive layer 5301, the conductive layer 5304, the conductive layer 5306, the conductive layer 5308, the conductive layer 5357, and the conductive layer 5359, a conductive film having a single-layer structure or a layered structure can be used, for example. For example, for the conductive film, a single-layer film containing one element selected from the group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), manganese (Mn), cobalt (Co), niobium (Nb), silicon (Si), iron (Fe), palladium (Pd), carbon (C), scandium (Sc), zinc (Zn), phosphorus (P), boron (B), arsenic (As), gallium (Ga), indium (In), tin (Sn), and oxygen (O); a compound containing one or more elements selected from the above group; or the like can be used. For example, the compound is an alloy containing one or more elements selected from the above group (e.g., an alloy material such as indium tin oxide (ITO), indium zinc oxide (IZO), indium tin oxide containing silicon oxide (ITSO), zinc oxide (ZnO), tin oxide (SnO), cadmium tin oxide (CTO), aluminum-neodymium (Al—Nd), magnesium-silver (Mg—Ag), molybdenum-niobium (Mo—Nb), molybdenum-tungsten (Mo—W), or molybdenum-tantalum (Mo—Ta)); a compound containing nitrogen and one or more elements selected from the above group (e.g., a nitride film containing titanium nitride, tantalum nitride, molybdenum nitride, or the like); or a compound containing silicon and one or more elements selected from the above group (e.g., a silicide film containing tungsten silicide, titanium silicide, nickel silicide, aluminum silicon, or molybdenum silicon); or the like. Alternatively, a nanotube material such as a carbon nanotube, an organic nanotube, an inorganic nanotube, or a metal nanotube can be used.

Note that silicon (Si) can contain an n-type impurity (e.g., phosphorus) or a p-type impurity (e.g., boron).

In the case where copper is used for the conductive layer, a layered structure is preferably used in order to improve adhesion.

Note that for a conductive layer which is in contact with an oxide semiconductor or silicon, molybdenum or titanium is preferably used.

Note that by using an alloy material containing neodymium and aluminum for the conductive layer, aluminum does not easily cause hillocks.

In the case where a semiconductor material such as silicon is used for the conductive layer, the semiconductor material such as silicon can be formed at the same time as a semiconductor layer of a transistor.

Since ITO, IZO, ITSO, ZnO, Si, SnO, CTO, a carbon nanotube, or the like has light-transmitting properties, such a material can be used for a portion through which light passes, such as a pixel electrode, a counter electrode, or a common electrode.

Note that by using a layered structure containing a low-resistance material (e.g., aluminum), wiring resistance can be lowered.

Note that by using a layered structure where a low heat-resistance material (e.g., aluminum) is interposed between high heat-resistance materials (e.g., molybdenum, titanium, or neodymium), advantages of the low heat-resistance material can be effectively utilized and heat resistance of a wiring, an electrode, or the like can be increased.

Note that a material whose properties are changed by reaction with a different material can be interposed between or covered with materials which do not easily react with the different material. For example, in the case where ITO and aluminum are connected to each other, titanium, molybdenum, or an alloy of neodymium can be interposed between ITO and aluminum. For example, in the case where silicon and aluminum are connected to each other, titanium, molybdenum, or an alloy of neodymium can be interposed between silicon and aluminum. Note that such a material can be used for a wiring, an electrode, a conductive layer, a conductive film, a terminal, a via, a plug, or the like.

For each of the insulating layer 5265, the insulating layer 5267, the insulating layer 5269, the insulating layer 5305, and the insulating layer 5358, an insulating film having a single-layer structure or a layered structure, or the like can be used, for example. For example, as the insulating film, an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as diamond-like carbon (DLC); an organic material such as a siloxane resin, epoxy, polyimide, polyamide, polyvinyl phenol, benzocyclobutene, or acrylic; or the like can be used.

For the light-emitting layer 5270, an organic EL element, an inorganic EL element, or the like can be used, for example. For the organic EL element, for example, a single-layer structure or a layered structure of a hole injection layer formed using a hole injection material, a hole transport layer formed using a hole transport material, a light-emitting layer formed using a light-emitting material, an electron transport layer formed using an electron transport material, an electron injection layer formed using an electron injection material, or a layer in which a plurality of these materials are mixed can be used.

For example, the following can be used for the liquid crystal layer 5307: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a plasma addressed liquid crystal (PALC), a banana-shaped liquid crystal, and the like. In addition, the following can be used as a driving method of a liquid crystal: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, a blue phase mode, and the like.

Note that an insulating layer which serves as an alignment film, an insulating layer which serves as a protrusion portion, or the like can be formed over the insulating layer 5305 and the conductive layer 5306.

Note that an insulating layer or the like which serves as a color filter, a black matrix, or a protrusion portion can be formed over the conductive layer 5308. An insulating layer which serves as an alignment film can be formed below the conductive layer 5308.

Note that in the cross-sectional structure in FIG. 31A, the insulating layer 5269, the light-emitting layer 5270, and the conductive layer 5271 can be eliminated, and the liquid crystal layer 5307 and the conductive layer 5308 which are illustrated in FIG. 31B can be formed over the insulating layer 5267 and the conductive layer 5268.

Note that the liquid crystal layer 5307 and the conductive layer 5308 can be eliminated in the cross-sectional structure in FIG. 31B, and the insulating layer 5269, the light-emitting layer 5270, and the conductive layer 5271 which are illustrated in FIG. 31A can be formed over the insulating layer 5305 and the conductive layer 5306.

Note that in the cross-sectional structure in FIG. 31C, the insulating layer 5269, the light-emitting layer 5270, and the conductive layer 5271 which are illustrated in FIG. 31A can be formed over the insulating layer 5358 and the conductive layer 5359. Alternatively, the liquid crystal layer 5307 and the conductive layer 5308 which are illustrated in FIG. 31B can be formed over the insulating layer 5267 and the conductive layer 5268.

This embodiment is obtained by performing change, addition, modification, removal, application, superordinate conceptualization, or subordinate conceptualization on part or the whole of another embodiment. Thus, part of or the whole of this embodiment can be freely combined with, applied to, or replaced with part of or the whole of another embodiment.

Embodiment 7

In this embodiment, a display module that can be formed using the semiconductor device of one embodiment of the present invention will be described with reference to FIG. 32.

Figure 32:
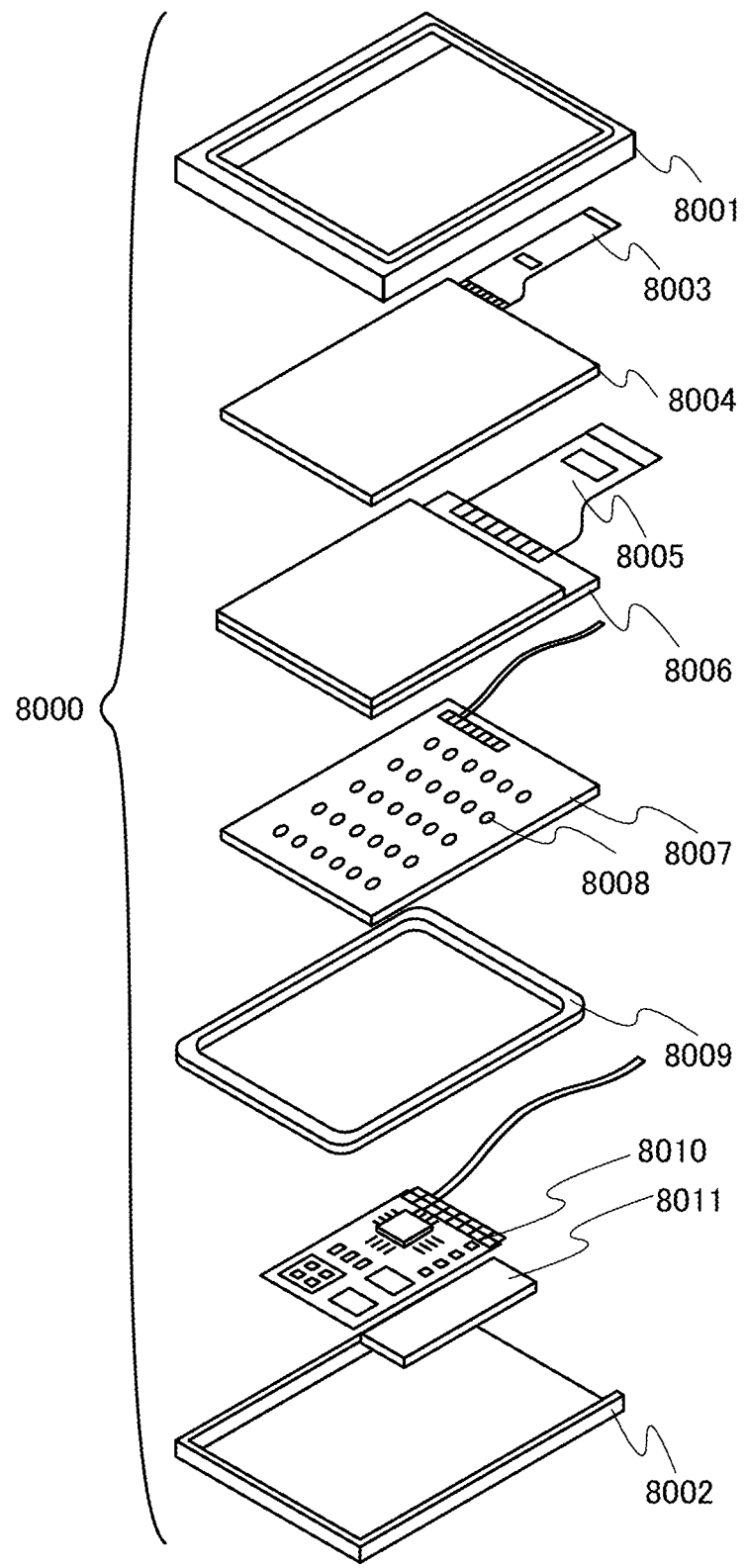
FIG. 32 is a perspective view of a module of a light-emitting device of one embodiment of the present invention.

In a display module 8000 in FIG. 32, a touch panel 8004 connected to an FPC 8003, a display panel cell 8006 connected to an FPC 8005, a backlight unit 8007, a frame 8009, a printed board 8010, and a battery 8011 are provided between an upper cover 8001 and a lower cover 8002. Note that the backlight unit 8007, the battery 8011, the touch panel 8004, and the like are not provided in some cases.

The semiconductor device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel cell 8006.

The touch panel 8004 can be a resistive touch panel cell or a capacitive touch panel cell and can be used overlapping with the display panel cell 8006. It is also possible to provide a touch panel function for a counter substrate (sealing substrate) of the display panel cell 8006. A photosensor may be provided in each pixel of the display panel cell 8006 to make an optical touch panel. An electrode for a touch sensor may be provided in each pixel of the display panel 8006 so that a capacitive touch panel is obtained.

The backlight unit 8007 includes a light source 8008. The light source 8008 may be provided at an end portion of the backlight unit 8007 and a light diffusing plate may be used.

The frame 8009 protects the display panel cell 8006 and also functions as an electromagnetic shield for blocking electromagnetic waves generated by the operation of the printed board 8010. The frame 8009 can function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

Note that a camera portion may be provided on a display surface side.

The structure described in this embodiment can be used in appropriate combination with the structure described in any of the other embodiments.

Embodiment 8

This embodiment will describe examples of electronic devices. A camera portion can be provided on a display surface side.

FIGS. 33A to 33H and FIGS. 34A to 34D illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 33A:
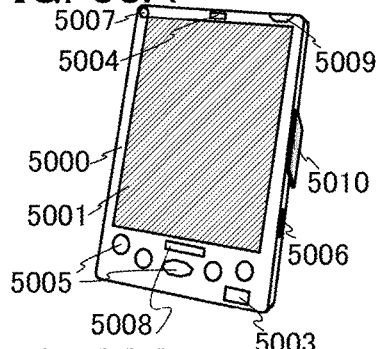
FIGS. 33A to 33H illustrate electronic devices of one embodiment of the present invention.
Figure 33B:
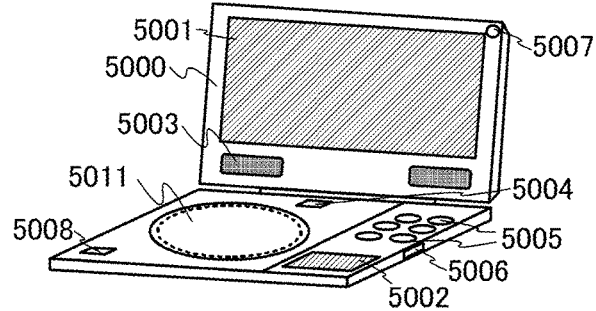
Figure 33C:
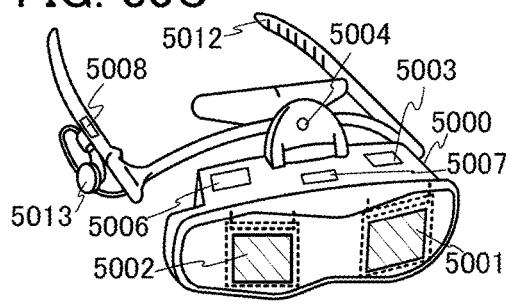
Figure 33D:
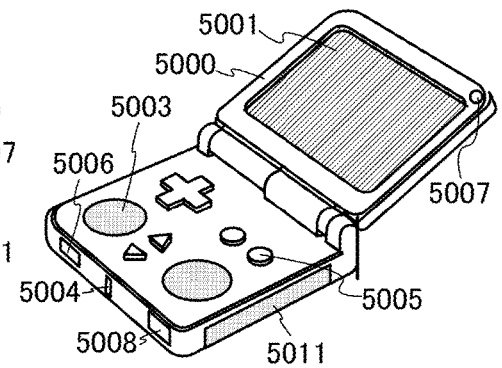
Figure 33E:
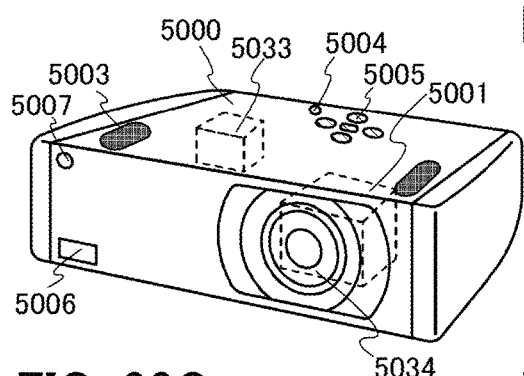
Figure 33F:
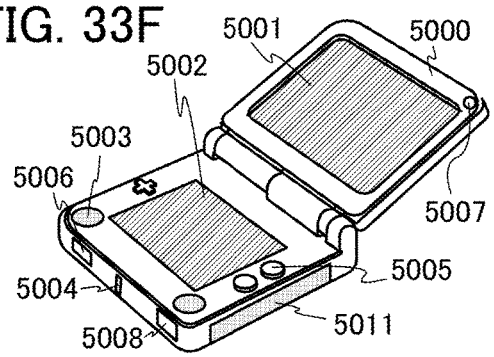
Figure 33G:
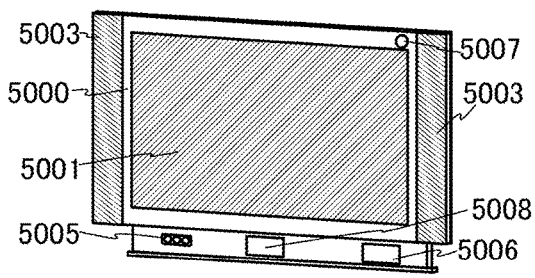
Figure 33H:
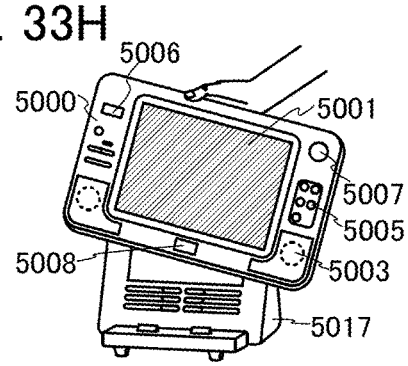
Figure 34A:
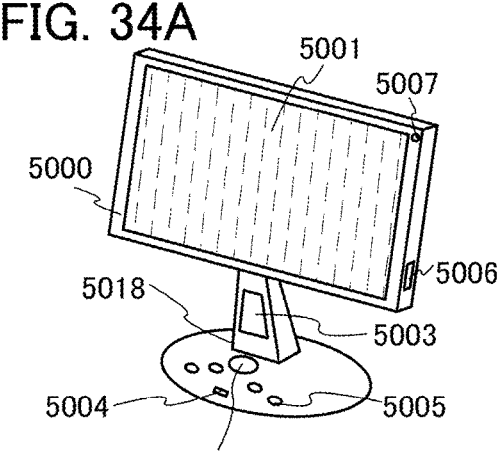
FIGS. 34A to 34H illustrate electronic devices of one embodiment of the present invention.
Figure 34B:
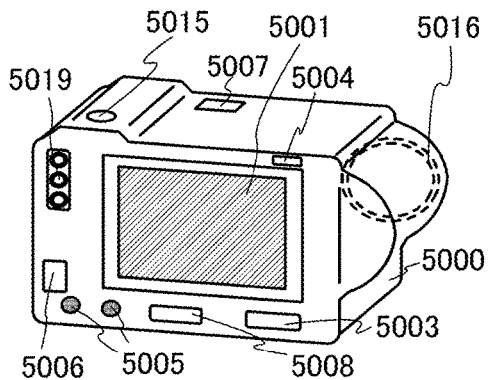
Figure 34C:
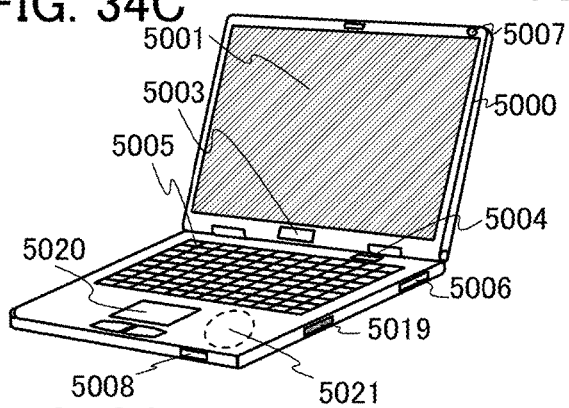
Figure 34D:
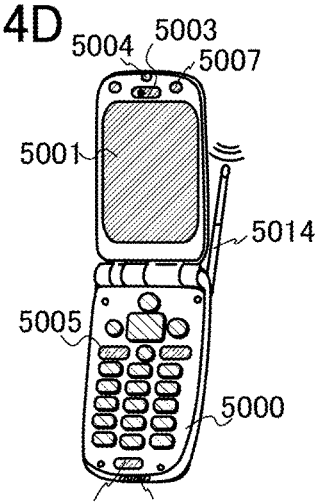

FIG. 33A illustrates a mobile computer, which can include a switch 5009, an infrared port 5010, and the like in addition to the above objects. FIG. 33B illustrates a portable image reproducing device provided with a memory medium (e.g., a DVD regenerating device), which can include a second display portion 5002, a memory medium reading portion 5011, and the like in addition to the above objects. FIG. 33C illustrates a goggle-type display, which can include the second display portion 5002, a support portion 5012, an earphone 5013, and the like in addition to the above objects. FIG. 33D illustrates a portable game machine, which can include the memory medium reading portion 5011 and the like in addition to the above objects. FIG. 33E illustrates a projector, which can include a light source 5033, a projector lens 5034, and the like in addition to the above objects. FIG. 33F illustrates a portable game machine, which can include the second display portion 5002, the memory medium reading portion 5011, and the like in addition to the above objects. FIG. 33G illustrates a television receiver, which can include a tuner, an image processing portion, and the like in addition to the above objects. FIG. 33H illustrates a portable television receiver, which can include a charger 5017 capable of transmitting and receiving signals and the like in addition to the above objects. FIG. 34A illustrates a display, which can include a support base 5018 and the like in addition to the above objects. FIG. 34B illustrates a camera, which can include an external connecting port 5019, a shutter button 5015, an image receiving portion 5016, and the like in addition to the above objects. FIG. 34C illustrates a computer, which can include a pointing device 5020, the external connecting port 5019, a reader/writer 5021, and the like in addition to the above objects. FIG. 34D illustrates a mobile phone, which can include an antenna 5014, a tuner of one-segment partial reception service for mobile phones and mobile terminals, and the like in addition to the above objects.

The electronic devices shown in FIGS. 33A to 33H and FIGS. 34A to 34D can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a recording medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a memory medium (an external memory medium or a memory medium incorporated in the camera), a function of displaying a photographed image on the display portion, or the like. Note that functions which can be provided for the electronic devices illustrated in FIGS. 33A to 33H and FIGS. 34A to 34D are not limited to them, and the electronic devices can have a variety of functions.

Electronic devices described in this embodiment are characterized by having a display portion for displaying some sort of information.

Next, applications of semiconductor devices are described.

Figure 34E:
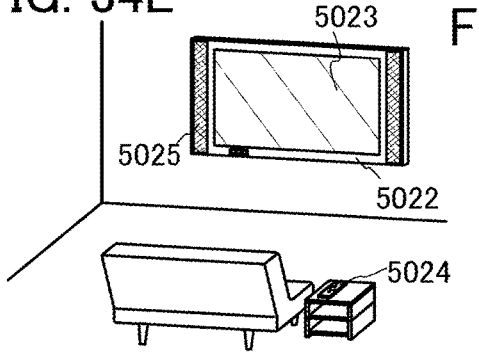

FIG. 34E illustrates an example in which a semiconductor device is incorporated in a building structure. FIG. 34E illustrates a housing 5022, a display portion 5023, a remote controller 5024 which is an operation portion, a speaker 5025, and the like. The semiconductor device is integrated with the building as a hung-on-wall type and can be provided without a large space for provision.

Figure 34F:
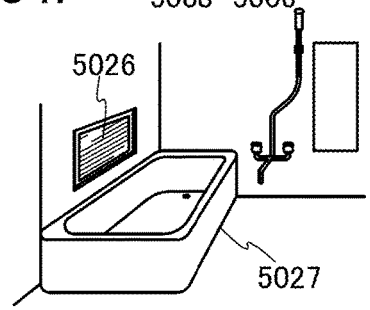

FIG. 34F illustrates another example in which a semiconductor device is incorporated in a building structure. A display panel 5026 is incorporated in a prefabricated bath unit 5027, so that a bather can view the display panel 5026.

Note that although this embodiment describes the wall and the prefabricated bath are given as examples of the building structures, this embodiment is not limited to them. The semiconductor devices can be provided in a variety of building structures.

Next, examples in which semiconductor devices are incorporated in moving objects are described.

Figure 34G:
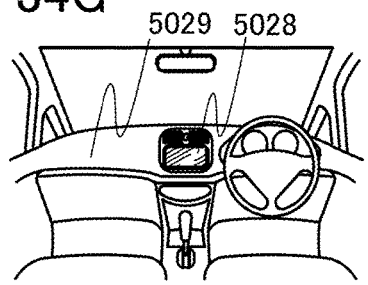

FIG. 34G illustrates an example in which a semiconductor device is incorporated in a car. A display panel 5028 is incorporated in a car body 5029 of the car and can display information related to the operation of the car or information input from inside or outside of the car on demand. Note that a navigation function may be provided.

Figure 34H:
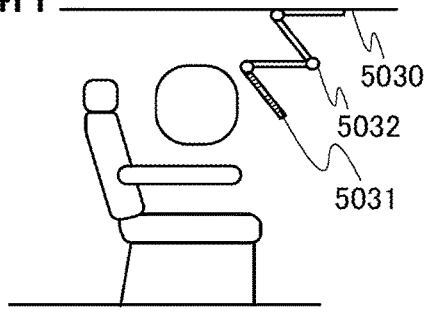

FIG. 34H illustrates an example in which a semiconductor device is incorporated in a passenger airplane. FIG. 34H illustrates a usage pattern when a display panel 5031 is provided for a ceiling 5030 above a seat of the passenger airplane. The display panel 5031 is incorporated in the ceiling 5030 through a hinge portion 5032, and a passenger can view the display panel 5031 by stretching of the hinge portion 5032. The display panel 5031 has a function of displaying information by the operation of the passenger.

Note that although this embodiment gives the body of the vehicle and the body of the plane as examples of the moving body, this embodiment is not limited thereto. The display device can be provided to a variety of moving bodies such as a two-wheel motor vehicle, a four-wheel vehicle (including a car, bus, and the like), a train (including a monorail, a railway, and the like), and a ship.

This application is based on Japanese Patent Application serial no. 2013-193723 filed with Japan Patent Office on Sep. 19, 2013, the entire contents of which are hereby incorporated by reference.

What is claimed is:

1. A light-emitting device comprising:
   a pixel portion comprising pixels, each of the pixels comprising:
     a first transistor;
     a first switch;
     a second switch;
     a capacitor; and
     a light-emitting element,
   wherein one of a source and a drain of the first transistor is electrically connected to the light-emitting element,
   wherein the first transistor is configured to operate in a saturation region in a first period for displaying one of text and an image,
   wherein the first transistor is configured to operate in a linear region in a second period for emitting illumination light to a subject,
   wherein a first terminal of the first switch is directly connected to a gate of the first transistor and a terminal of the capacitor,
   wherein a first terminal of the second switch is directly connected to the gate of the first transistor and the terminal of the capacitor,
   wherein the first switch is turned ON and the second switch is turned OFF in the first period, and
   wherein the first switch is turned OFF and the second switch is turned ON in the second period.

2. The light-emitting device according to claim 1,
   wherein a second terminal of the first switch is electrically connected to a first wiring,
   wherein the other of the source and the drain of the first transistor is electrically connected to a second wiring, and
   wherein a second terminal of the second switch is electrically connected to a third wiring.

3. The light-emitting device according to claim 1,
   wherein the first switch is a second transistor,
   wherein the second switch is a third transistor,
   wherein a gate of the second transistor in a first row is electrically connected to a fourth wiring and a gate of the second transistor in a second row is electrically connected to a fifth wiring, and
   wherein gates of the third transistors of the pixels in the first row are electrically connected to gates of the third transistors of the pixels in the second row.

4. The light-emitting device according to claim 1,
   wherein each of the pixels further comprising:
     a third switch;
     a fourth switch; and
     a fifth switch,
   wherein a first terminal of the third switch is electrically connected to a first wiring,
   wherein a second terminal of the third switch is electrically connected to the other of the source and the drain of the first transistor,
   wherein a first terminal of the fourth switch is electrically connected to a second wiring,
   wherein a second terminal of the fourth switch is electrically connected to the other of the source and the drain of the first transistor,
   wherein a second terminal of the second switch is electrically connected to a third wiring,
   wherein a second terminal of the first switch is electrically connected to the one of the source and the drain of the first transistor,
   wherein a first terminal of the fifth switch is electrically connected to the one of the source and the drain of the first transistor, and
   wherein a second terminal of the fifth switch is electrically connected to the light-emitting element.

5. An electronic device comprising:
   a light-emitting device comprising:
     a pixel portion comprising pixels, each of the pixels comprising:
       a first transistor;
       a first switch;
       a second switch;
       a capacitor; and
       a light-emitting element; and
   a camera portion,
   wherein one of a source and a drain of the first transistor is electrically connected to the light-emitting element,
   wherein the first transistor is configured to operate in a saturation region in a first period for displaying one of text and an image,
   wherein the first transistor is configured to operate in a linear region in a second period for emitting illumination light to a subject,
   wherein the camera portion is configured to take an image of the subject, and
   wherein a first terminal of the first switch is directly connected to a gate of the first transistor and a terminal of the capacitor,
   wherein a first terminal of the second switch is directly connected to the gate of the first transistor and the terminal of the capacitor,
   wherein the first switch is turned ON and the second switch is turned OFF in the first period, and
   wherein the first switch is turned OFF and the second switch is turned ON in the second period.

6. The electronic device according to claim 5, wherein the camera portion is configured to take the image of the subject in the second period.

7. The electronic device according to claim 5,
   wherein a second terminal of the first switch is electrically connected to a first wiring, wherein the other of the source and the drain of the first transistor is electrically connected to a second wiring, and wherein a second terminal of the second switch is electrically connected to a third wiring.

8. The electronic device according to claim 5,
wherein the first switch is a second transistor,
wherein the second switch is a third transistor,
wherein a gate of the second transistor in a first row is electrically connected to a fourth wiring and a gate of the second transistor in a second row is electrically connected to a fifth wiring, and
wherein gates of the third transistors of the pixels in the first row are electrically connected to gates of the third transistors of the pixels in the second row.

9. The electronic device according to claim 5,
wherein each of the pixels further comprising:
a third switch;
a fourth switch; and
a fifth switch,
wherein a first terminal of the third switch is electrically connected to a first wiring,
wherein a second terminal of the third switch is electrically connected to the other of the source and the drain of the first transistor,
wherein a first terminal of the fourth switch is electrically connected to a second wiring,
wherein a second terminal of the fourth switch is electrically connected to the other of the source and the drain of the first transistor,
wherein a second terminal of the second switch is electrically connected to a third wiring,
wherein a second terminal of the first switch is electrically connected to the one of the source and the drain of the first transistor,
wherein a first terminal of the fifth switch is electrically connected to the one of the source and the drain of the first transistor, and
wherein a second terminal of the fifth switch is electrically connected to the light-emitting element.

10. A driving method of a light-emitting device comprising:
displaying one of text and an image in a first period;
emitting illumination light to a subject in a second period;
turning ON a first switch in the first period;
turning OFF a second switch in the first period;
turning OFF the first switch in the second period; and
turning ON the second switch in the second period,
wherein the light-emitting device comprises a pixel portion comprising pixels,
wherein each of the pixels comprises a transistor, a light-emitting element electrically connected to one of a source and a drain of the transistor, the first switch directly connected to a gate of the transistor, and the second switch directly connected to the gate of the transistor,
wherein the transistor is configured to operate in a saturation region in the first period, and
wherein the transistor is configured to operate in a linear region in the second period.

11. The driving method according to claim 10, wherein the pixels in a first row and the pixels in a second row are selected simultaneously in the second period.

12. The driving method according to claim 10, wherein the pixels in a first row is selected after the pixels in a second row is selected in the second period.

13. The driving method according to claim 10, wherein in the second period, the pixels are selected in a frame period and selected in a next frame period.

14. The driving method according to claim 10, wherein in the second period, the pixels are selected in a frame period and not selected in a next frame period.

15. A driving method of an electronic device comprising a light-emitting device and a camera portion, comprising:
displaying one of text and an image in a first period;
emitting illumination light to a subject in a second period;
turning ON a first switch in the first period;
turning OFF a second switch in the first period;
turning OFF the first switch in the second period; and
turning ON the second switch in the second period,
wherein the light-emitting device comprises a pixel portion comprising pixels,
wherein each of the pixels comprises a transistor, a light-emitting element electrically connected to one of a source and a drain of the transistor, the first switch directly connected to a gate of the transistor, and the second switch directly connected to the gate of the transistor,
wherein the transistor is configured to operate in a saturation region in the first period,
wherein the transistor is configured to operate in a linear region in the second period, and
wherein the camera portion is configured to take an image of the subject.

16. The driving method according to claim 15, further comprising the step of taking the image of the subject with the camera portion in the second period.

17. The driving method according to claim 15, wherein the pixels in a first row and the pixels in a second row are selected simultaneously in the second period.

18. The driving method according to claim 15, wherein the pixels in a first row is selected after the pixels in a second row is selected in the second period.

19. The driving method according to claim 15, wherein in the second period, the pixels are selected in a frame period and selected in a next frame period.

20. The driving method according to claim 15, wherein in the second period, the pixels are selected in a frame period and not selected in a next frame period.

21. The light-emitting device according to claim 1, wherein the one of the text and the image is the text.

22. The light-emitting device according to claim 1, wherein the text and the image are displayed in the first period.

23. The light-emitting device according to claim 1, wherein a luminance of the light-emitting element in the second period is 1.5 times or more of a luminance of the light-emitting element with a highest grayscale in the first period.

24. The electronic device according to claim 5, wherein a luminance of the light-emitting element in the second period is 1.5 times or more of a luminance of the light-emitting element with a highest grayscale in the first period.

25. The driving method according to claim 10, wherein a luminance of the light-emitting element in the second period is 1.5 times or more of a luminance of the light-emitting element with a highest grayscale in the first period.

26. The driving method according to claim 15, wherein a luminance of the light-emitting element in the second period is 1.5 times or more of a luminance of the light-emitting element with a highest grayscale in the first period.

* * * * *